(12) United States Patent
Park

(10) Patent No.: US 10,365,821 B2
(45) Date of Patent: *Jul. 30, 2019

(54) MOBILE TERMINAL AND CONTROL METHOD FOR THE MOBILE TERMINAL

(71) Applicant: LG ELECTRONICS INC., Seoul (KR)

(72) Inventor: Daemyeong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 277 days.

This patent is subject to a terminal disclaimer.

(21) Appl. No.: 15/181,335

(22) Filed: Jun. 13, 2016

(65) Prior Publication Data
US 2017/0017390 A1  Jan. 19, 2017

Related U.S. Application Data

(63) Continuation of application No. 14/465,746, filed on Aug. 21, 2014, now Pat. No. 9,392,095.

(30) Foreign Application Priority Data

Apr. 3, 2014  (KR) .......................... 10-2014-0040153
Jul. 16, 2014  (KR) .......................... 10-2014-0089958

(51) Int. Cl.
*H04B 1/38* (2015.01)
*H04M 1/00* (2006.01)
(Continued)

(52) U.S. Cl.
CPC ........ *G06F 3/04883* (2013.01); *G06F 3/0412* (2013.01); *G06F 3/0416* (2013.01);
(Continued)

(58) Field of Classification Search
CPC . G06F 3/0485; G06F 3/01; G06F 3/14; G06F 3/041; G06F 3/048; G06F 3/03;
(Continued)

(56) References Cited

U.S. PATENT DOCUMENTS 7,656,393 B2 * 2/2010 King .................... G06F 1/1626
                                                      345/156
8,203,640 B2   6/2012 Kim et al.
(Continued)

FOREIGN PATENT DOCUMENTS

CN        102902454          1/2013
KR     10-2008-0086196        9/2008
(Continued)

OTHER PUBLICATIONS

State Intellectual Property Office of the People's Republic of China Application Serial No. 201410646275.2, Office Action dated Aug. 9, 2017, 14 pages.
(Continued)

*Primary Examiner* — Pablo N Tran
(74) *Attorney, Agent, or Firm* — Lee, Hong, Degerman, Kang & Waimey

(57) ABSTRACT

Disclosed is a mobile terminal, having a body which includes a front side and a rear side; a display including a first region disposed on the front side and a second region extending from the first region, wherein the second region forms at least a portion of a first edge of the mobile terminal and the first edge is between the front side and the rear side; a touch sensor; and a controller configured to cause the display to display content on the first region wherein the content is not displayed on the second region, and to capture a region of the displayed content in response to receiving at least one touch input at the second region detected by the touch sensor.

19 Claims, 55 Drawing Sheets

(51) Int. Cl.
*G06F 3/0488* (2013.01)
*H04M 1/02* (2006.01)
*H04M 1/725* (2006.01)
*G06F 3/0485* (2013.01)
*G06F 3/041* (2006.01)
*G06F 3/0484* (2013.01)
*H04L 12/26* (2006.01)
*G06F 3/0481* (2013.01)
*G06F 3/0482* (2013.01)
*H04W 88/02* (2009.01)

(52) U.S. Cl.
CPC ........ *G06F 3/0485* (2013.01); *G06F 3/04842* (2013.01); *G06F 3/04886* (2013.01); *H04L 43/16* (2013.01); *H04M 1/0266* (2013.01); *H04M 1/72522* (2013.01); *G06F 3/0482* (2013.01); *G06F 3/04817* (2013.01); *G06F 2203/0339* (2013.01); *G06F 2203/04104* (2013.01); *G06F 2203/04804* (2013.01); *H04W 88/02* (2013.01)

(58) Field of Classification Search
CPC .. G06F 3/04883; G06F 3/0412; G06F 3/0416; G06F 3/04842; G06F 3/04886; H04B 1/40; H04B 1/38; G09G 5/00; H04M 1/0266; H04M 1/72522
See application file for complete search history.

(56) References Cited

U.S. PATENT DOCUMENTS

| | | | |
|---|---|---|---|
| 8,373,666 B2 | 2/2013 | Jung | |
| 8,565,829 B2 * | 10/2013 | Kim | G06F 1/1616 345/173 |
| 8,776,087 B2 * | 7/2014 | Chun | H04M 1/72522 719/318 |
| 2009/0019401 A1 * | 1/2009 | Park | G06F 3/04883 715/841 |
| 2010/0173678 A1 | 7/2010 | Kim et al. | |
| 2012/0188271 A1 | 7/2012 | Kim | |
| 2012/0302167 A1 | 11/2012 | Yun et al. | |
| 2013/0104032 A1 | 4/2013 | Lee et al. | |
| 2013/0300697 A1 * | 11/2013 | Kim | G06F 1/1626 345/173 |
| 2014/0132535 A1 | 5/2014 | Kim | |

FOREIGN PATENT DOCUMENTS

| | | |
|---|---|---|
| KR | 20080086196 A * | 9/2008 |
| KR | 10-2011-0068666 | 6/2011 |
| KR | 10-1060175 | 8/2011 |
| KR | 10-2013-0127050 | 11/2013 |
| KR | 101339483 | 12/2013 |
| WO | 2012097759 | 7/2012 |

OTHER PUBLICATIONS

U.S. Appl. No. 14/465,746 Office Action dated Oct. 21, 2014, 13 pages.
Korean Intellectual Property Office Application Serial No. 10-2014-0040153 Notice of Allowance dated Mar. 13, 2015, 2 pages.
Intellectual Property Office of India Application Serial No. 361/KOL/2015, Office Action dated Nov. 7, 2018, 7 page.
European Patent Office Application Serial No. 14003111.3, Search Report dated Jun. 11, 2015, 6 pages.

* cited by examiner

MOBILE TERMINAL AND CONTROL METHOD FOR THE MOBILE TERMINAL

CROSS-REFERENCE TO RELATED APPLICATIONS

This application is a continuation of U.S. patent application Ser. No. 14/465,746, filed on Aug. 21, 2014, now U.S. Pat. No. 9,392,095, which claims the benefit of earlier filing date and right of priority to Korean Application No. 10-2014-0040153, filed on Apr. 3, 2014, and Korean Application No. 10-2014-0089958, filed on Jul. 16, 2014 the contents of which is incorporated by reference herein in its entirety.

BACKGROUND OF THE DISCLOSURE

1. Field of the Disclosure

The present disclosure relates to a mobile terminal, and particularly, to a mobile terminal having a side display unit.

2. Background of the Disclosure

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components. For instance, a user interface for allowing a user to easily and conveniently search for or select a function is being provided.

As the mobile terminal is regarded as a personal belonging to express a user's personality, various designs are required. The designs include structural changes and improvements for allowing a user to more conveniently use the mobile terminal. As one of such structural changes and improvements, a side display unit and a user interface using the same may be considered.

SUMMARY OF THE DISCLOSURE

Therefore, an aspect of the detailed description is to provide a mobile terminal capable of receiving a user's input using a side display unit.

Another aspect of the detailed description is to provide a mobile terminal capable of executing a specific function, in correspondence to a user's input to a side display unit.

Another aspect of the detailed description is to provide a mobile terminal capable of providing a capturing function, in correspondence to a user's gesture with respect to a side display unit.

To achieve these and other advantages and in accordance with the purpose of this specification, as embodied and broadly described herein, there is provided a mobile terminal, comprising: a body having a front surface, side surfaces and a rear surface; a display unit having a first region disposed on the front surface, and a second region extending from the first region, the second region disposed on the side surface; a touch sensing unit configured to sense a touch input applied to the display unit; and a controller configured to; sense, via the touch sensing unit, at least one touch input applied to one or more points on the second region in a state where screen information has been output to the first region, and process the least one touch input applied to the one or more points on the second region as a storing command for storing at least part of the screen information output to the first region, when the at least one touch input applied to the one or more points on the second region corresponds to a predetermined touch type.

In an embodiment, if a first touch input applied to a first point on the second region and a second touch input applied to a second point on the second region are sensed, the controller is configured to set at least part of the screen information output to the first region, as a storing region.

In an embodiment, the storing region including the at least part of the screen information is determined based on at least one of a position of the first point and the second point, and a distance between the first point and the second point.

In an embodiment, the storing region is positioned on at least part of the first region horizontally corresponding to the first point and the second point on the second region. The storing region has a vertical length corresponding to the distance between the first point and the second point.

In an embodiment, if at least one drag touch extending from at least one of the first touch input and the second touch input satisfies a preset condition, after the storing region has been set, the controller is configured to store screen information included in the storing region.

In an embodiment, the controller is configured to store the screen information included in the storing region, in response to input of said at least one drag touch starting from one of the first point and the second point, toward another thereof.

In an embodiment, the controller is configured to set at least part of the first region as a storing region, based on a first type of touch among the predetermined touch type of touch applied to the second region. The controller is configured to output, to the storing region, a guide image indicating that the storing region has been set. The guide image is overlapped with the screen information included in the storing region, such that the screen information included in the storing region is recognizable by a user.

In an embodiment, the guide image has an output size thereof changed, based on a second type of touch different from the first type of touch, among the predetermined touch type of touch applied to the second region. The output size of the guide image is gradually decreased based on the second type of touch.

In a state where the output size of the guide image has become smaller than a reference size according to the second type of touch, the storing region is captured.

In an embodiment, even if the output size of the guide image is changed according to the second type of touch, an output of a boundary image indicating the storing region is maintained on edges of the storing region.

In an embodiment, the guide image has a size corresponding to a size of the storing region. In a state where the guide image has been output, if a third type of touch different from the first type of touch is applied to the second region, the guide image is moved according to the third type of touch. The storing region is reset to a region to which the guide image has been moved.

In an embodiment, in a state where the guide image has been output to the first region, if a drag touch is applied to the guide image, the controller is configured to move the guide image to an input direction of the drag touch. The controller is configured to reset a region to which the guide image has been moved, as the storing region.

In an embodiment, in a state where the guide image has been output to the first region, if a touch input is sensed on a part of the first region where the guide image has not been output, the controller is configured to end the output of the guide image. The controller is configured to process the touch input sensed on the part of the first region where the guide image has not been output, as a control command for cancelling the storing command.

In an embodiment, in a state where the guide image has been output to the first region, if a pinch-in touch input or a pinch-out touch input applied to the second region is sensed, the controller is configured to change a vertical size of the storing region, based on the sensed pinch-in touch or pinch-out touch. The controller is configured to change the output size of the guide image in correspondence to the changed vertical size.

In an embodiment, the display unit further comprises a third region disposed on an opposite side surface to the second region. In a state where the guide image has been output to the first region, if a pinch-in touch or a pinch-out touch input applied to the third region is sensed, the controller is configured to change a horizontal size of the storing region, based on the sensed pinch-in touch input or pinch-out touch input. The controller is configured to change the output size of the guide image in correspondence to the changed horizontal size.

In an embodiment, if said at least part of the screen information forms a text, the controller is configured to output a GUI screen related to selection for a storage type, such that a storage format with respect to said at least part of the screen information is selectable by a user. Said at least part of the screen information is stored as at least one of an image file format and a text file format, based on a user's selection.

In an embodiment, the controller is configured to store said at least part of the screen information in a memory, in response to the storing command. The controller is configured to search an application for performing a function using said at least part of the screen information, and to output an icon related to the searched application.

In an embodiment, the predetermined touch type of touch comprises a first touch input applied to the second region, and a second touch input consecutive to the first touch. If the first touch input is sensed, the controller is configured to execute a storing mode for storing said at least part of the screen information. If the second touch input consecutive to the first touch is sensed, the controller is configured to store said at least part of the screen information. If the first touch input applied to the second region is released, before the second touch input is sensed after the first touch input has been sensed, the controller is configured to end the storing mode.

In an embodiment, wherein in a case where the screen information output to the display unit corresponds to a preset application, even if the predetermined touch type of touch applied to the second region is sensed, the controller is configured to do not process the sensed touch input as a storing command for storing at least part of screen information output to the first region. The controller is configured to process the sensed touch input as a control command for performing a function related to the preset application.

To achieve these and other advantages and in accordance with the purpose of this specification, as embodied and broadly described herein, there is also provided a method of controlling a mobile terminal having a front surface, side surface and a rear surface, the method comprising: outputting screen information to a first region disposed on the front surface; sensing a touch on a second region extending from the first region and disposed on the side surface, in a state where the screen information has been output to the first region; processing the sensed touch, as a control command for storing at least part of the screen information output to the first region; and storing said at least part of the screen information in a memory.

In an embodiment, a storing region may be set based on a touch point sensed on the second region. And said at least part of the screen information may be included in the storing region.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
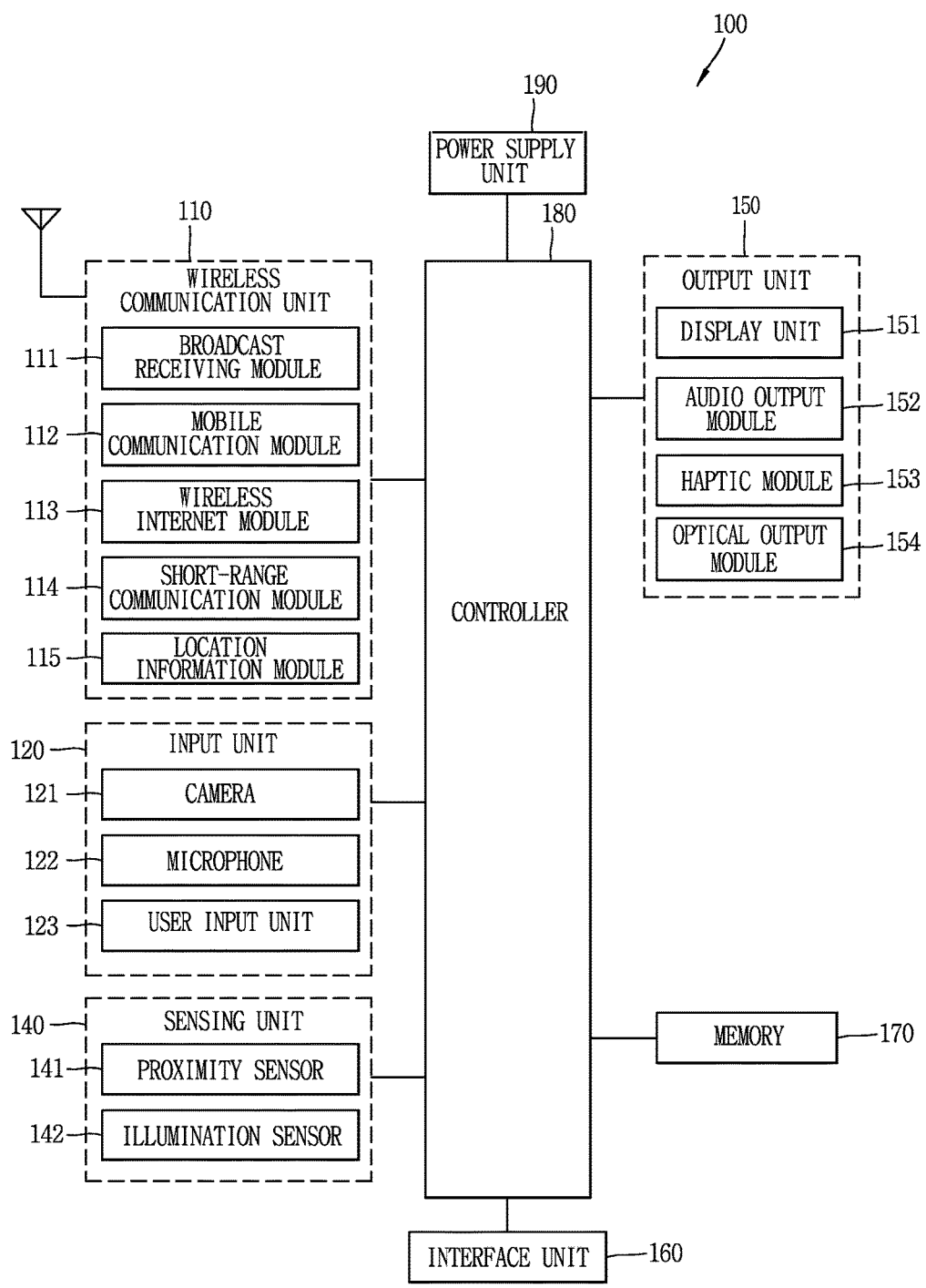
FIG. 1A is a block diagram of a mobile terminal according to the present invention.
Figure 1B:
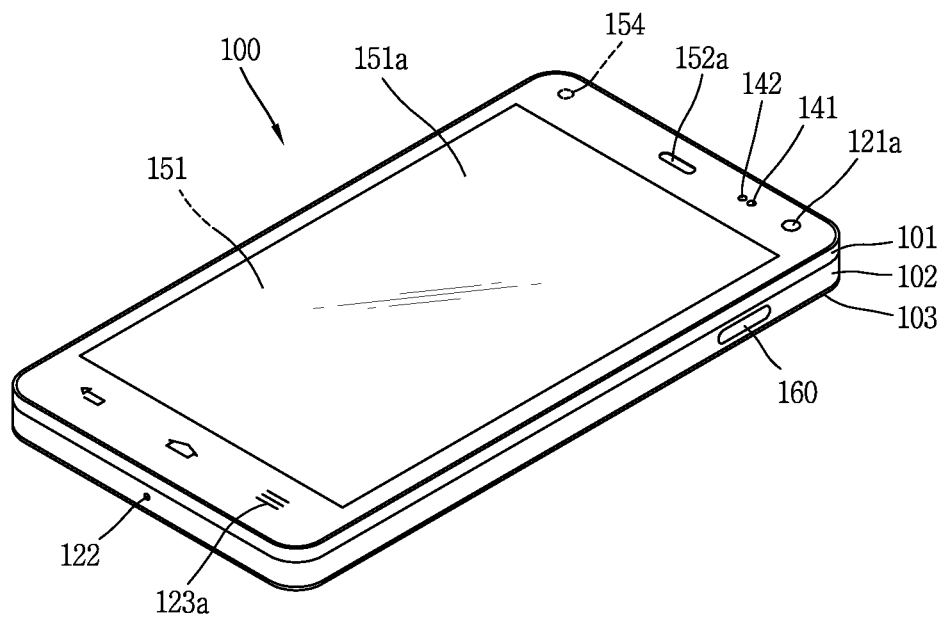
FIGS. 1B and 1C are conceptual views of a mobile terminal according to an embodiment of the present invention.
Figure 1C:
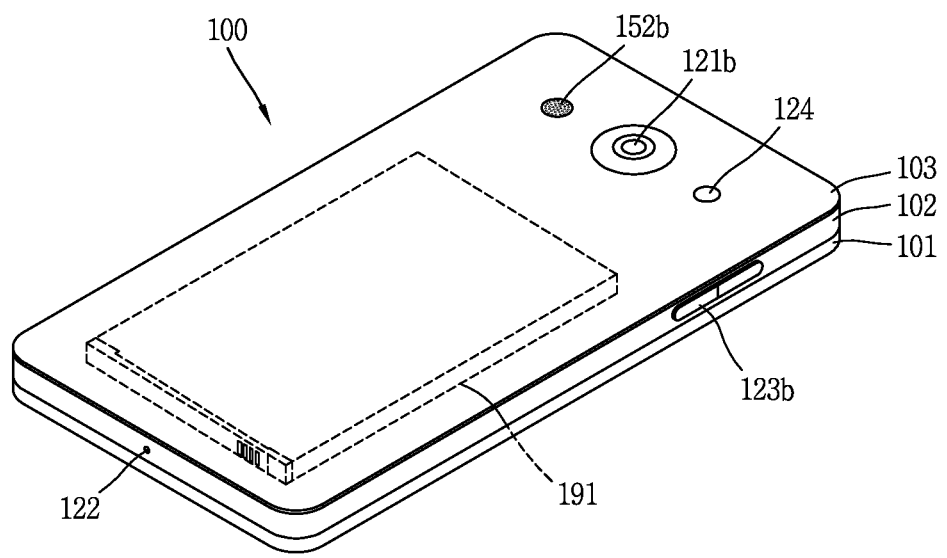

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), Wideband CDMA (WCDMA), High Speed Downlink Packet access (HSDPA), Long Term Evolution (LTE), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), Long Term Evolution (LTE), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.).

The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The display unit 151, the first audio output module 152a, the second audio output module 152b, the proximity sensor 141, the illumination sensor 142, the optical output unit 154, the first camera 121a, the second camera 121b, the first manipulation unit 123a, the second manipulation unit 123b, the microphone 122, the interface unit 160, etc. may be provided at the mobile terminal 100.

Hereinafter, as shown in FIGS. 1B and 1C, it is assumed that the display unit 151, the first audio output module 152a, the proximity sensor 141, the illumination sensor 142, the optical output unit 154, the first camera 121a and the first manipulation unit 123a are disposed on a front surface of the body. It is assumed that the second manipulation unit 123b, the microphone 122 and the interface unit 160 are disposed on side surfaces of the body. And it is assumed that the second audio output module 152*b* and the second camera 121*b* are disposed on a rear surface of the body.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123*a* may be located on another surface of the terminal body, and the second audio output module 152*b* may be located on the side surface of the terminal body.

The display unit 151 outputs information processed in the mobile terminal 100. For instance, the display unit 151 may display information on an execution screen of an application program driven in the mobile terminal 100, UI (User Interface) information, or GUI (Graphic User Interface) information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151*a* and a display on a rear surface of the window 151*a*, or a metal wire which is patterned directly on the rear surface of the window 151*a*. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123*a*.

The first audio output module 152*a* may be implemented in the form of a receiver to transmit a call sound to a user's ears, and the second audio output module 152*b* may be implemented in the form of a loud speaker to output voice audio, alarm sounds, multimedia audio reproduction, and the like.

The window 151*a* of the display unit 151 will typically include an aperture to permit audio generated by the first audio output module 152*a* to pass. One alternative is to allow audio to be released along an assembly gap between the structural bodies (for example, a gap between the window 151*a* and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121*a* can process image frames such as still or moving images obtained by the image sensor in a capture mode or a video call mode. The processed image frames can then be displayed on the display unit 151 or stored in the memory 170.

The first and second manipulation units 123*a* and 123*b* are examples of the user input unit 123, which may be manipulated by a user to provide input to the mobile terminal 100. The first and second manipulation units 123*a* and 123*b* may also be commonly referred to as a manipulating portion, and may employ any tactile method that allows the user to perform manipulation such as touch, push, scroll, or the like. The first and second manipulation units 123*a* and 123*b* may also employ any non-tactile method that allows the user to perform manipulation such as proximity touch, hovering, or the like.

FIG. 1B illustrates the first manipulation unit 123*a* as a touch key, but possible alternatives include a mechanical key, a push key, a touch key, and combinations thereof.

Input received at the first and second manipulation units 123*a* and 123*b* may be used in various ways. For example, the first manipulation unit 123*a* may be used by the user to provide an input to a menu, home key, cancel, search, or the like, and the second manipulation unit 123*b* may be used by the user to provide an input to control a volume level being output from the first or second audio output modules 152*a* or 152*b*, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152*a* or 152*b*, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123*a* in the rear input unit. As such, in situations where the first manipulation unit 123*a* is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

The mobile terminal according to the present invention may have various designs. Hereinafter, a mobile terminal having a side display unit as a structural change and modification, and a user interface utilizing the side display unit will be explained.

Figure 2A:
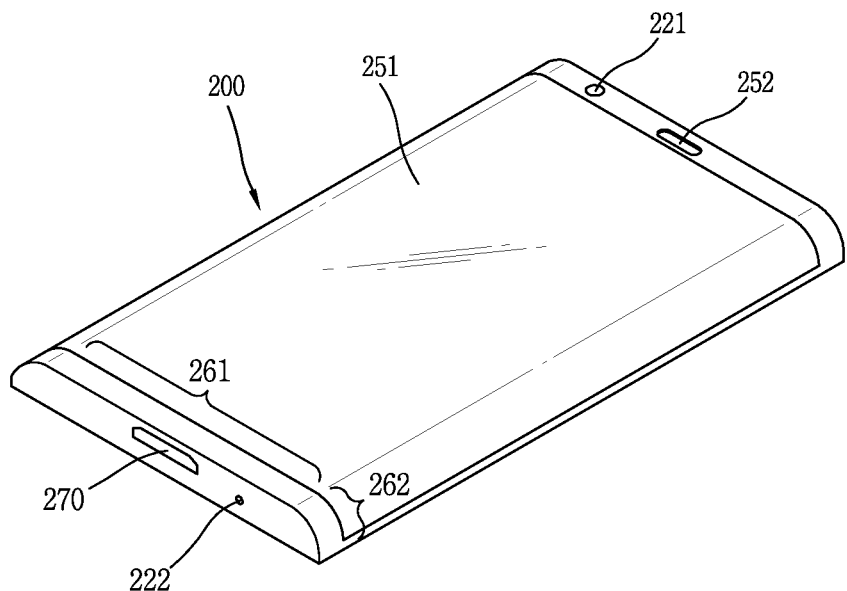
FIG. 2A is a front perspective view of a mobile terminal according to another embodiment of the present invention.
Figure 2B:
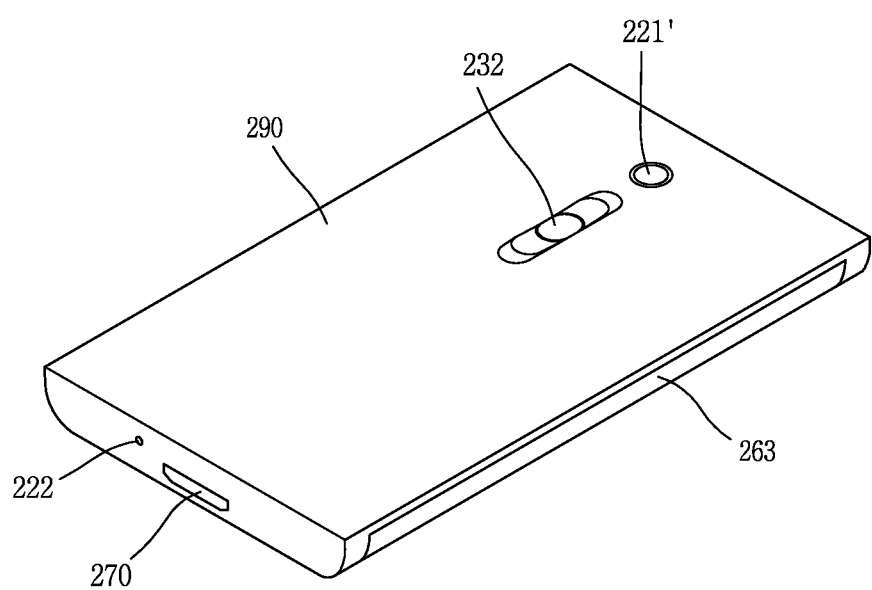
FIG. 2B is a rear perspective view of the mobile terminal of FIG. 2A.

FIG. 2A is a front perspective view of a mobile terminal according to another embodiment of the present invention, and FIG. 2B is a rear perspective view of the mobile terminal of FIG. 2A.

The mobile terminal 200 according to the present disclosure is a bar type mobile terminal. However, the present disclosure is not limited to this, but may be applied to a slide type in which two or more bodies are coupled to each other so as to perform a relative motion, a folder type, or a swing type, a swivel type and the like.

A case (casing, housing, cover, etc.) forming appearance of the body 200 may include a front case 201 and a rear case 202 (refer to FIGS. 3A and 3B). A space formed by the front case 201 and the rear case 202 may accommodate various components therein. At least one intermediate case may further be disposed between the front case 201 and the rear case 202.

Such cases may be formed by injection-molded synthetic resin, or may be formed using a metallic material such as stainless steel (STS) or titanium (Ti).

A display unit 251, an audio output unit 252, a camera 221, etc. may be disposed at the front case 201. An interface unit 270, etc. may be disposed on side surfaces of the front case 201 and the rear case 202.

The display unit 251 occupies most parts of a main surface of the front case 201. That is, the display unit is disposed on a front surface of the mobile terminal, and is configured to display visual information. The display unit 251 is formed on not only a front surface of the mobile terminal, but also other surfaces of the mobile terminal. More specifically, the display unit 251 is provided with a first region 252 disposed on the front surface, and a second region 253 extending from the first region 252 and disposed on a side surface of the body. The side surface may be a surface viewable to a user when the user views the mobile terminal from the side.

At least part of the second region 253 may be disposed on the front surface. For instance, the second region 253 may be formed on the side surface and the front surface. Whether the second region 253 is viewable from the front surface or not is determined according to a structure that the first region 252 and the second region 253 are formed on the display unit 251.

For instance, a window disposed on an upper surface of the display unit 251 is formed such that two side surfaces thereof are bent. Under such configuration, appearance of the front surface and the side surfaces is formed by the window. Thus, the first region 252 and the second region 253 may be connected to each other without a boundary therebetween. In this case, the display unit 251 may be formed in a bent manner, and may be provided with a display device mounted in correspondence to the window.

As another example, the display unit 251 may be a flexible display unit. The flexible display unit includes a display which can be bent, twisted, folded and rolled by an external force. The flexible display unit may include a general flexible display and electronic paper.

The general flexible display means a light and non-fragile display formed on a thin and flexible substrate, which maintains characteristics of the conventional flat display. The thin and flexible substrate can be bent, folded, or rolled like paper.

The electronic paper is implemented by applying characteristics of general ink, which may be different from a general flat display in that reflected light is used. The electronic paper may change images or texts by using twist balls or electrophoresis using capsules.

By such flexible material, the terminal body may be configured such that two side surfaces of a display unit are bent.

The audio output module 252 and the camera 221 are disposed at a region adjacent to one of two ends of the display unit 251, and a front input unit (not shown) and a microphone 222 may be disposed at a region adjacent to another of the two ends of the display unit 251.

The front input unit is an example of the user input unit 230 (refer to FIG. 1), and may include a plurality of manipulation units. The manipulation units may be referred to as manipulating portions, and may include any type of ones that can be manipulated in a user's tactile manner.

The display unit 251 may form a touch screen together with a touch sensor. In this case, the touch screen may be a user input unit. Under such configuration, the mobile terminal may be provided with no front input unit on the front surface thereof. In this case, the mobile terminal may be configured so than an input to the terminal body can be performed through the display unit 251 and a rear input unit 232 to be explained later.

Referring to FIG. 2B, a camera 221' may be additionally provided on the rear case 202. The camera 221' faces a direction which is opposite to a direction faced by the camera 221 (refer to FIG. 2A), and may have different pixels from the camera 221.

For example, the camera 221 may operate with relatively lower pixels (lower resolution). Thus, the camera 221 may be useful when a user can capture his face and send it to another party during a video call or the like. On the other hand, the camera 221' may operate with a relatively higher pixels (higher resolution) such that it can be useful for a user to obtain higher quality pictures for later use. The cameras 221 and 221' may be installed at the body so as to rotate or pop-up.

A flash and a mirror may be additionally disposed adjacent to the camera 221'. The flash operates in conjunction with the camera 221' when taking a picture using the camera 221'. The mirror can cooperate with the camera 221' to allow a user to photograph himself in a self-portrait mode.

An audio output unit (not shown) may be additionally disposed at the rear case 202. The audio output unit may implement a stereo function together with the audio output unit 252 (refer to FIG. 2A), and may be used for calling in a speaker phone mode.

That is, the audio output unit 252 (first audio output unit) may be formed on the front surface of the mobile terminal as a receiver, and a second audio output may be formed on the rear surface of the mobile terminal as a speaker. However, the present invention is not limited to this. That is, the second audio output unit may be provided on a side surface of the mobile terminal.

A power supply unit 290 for supplying power to the mobile terminal 200 is mounted to the body. The power supply unit 290 may be mounted in the body, or may be detachably mounted to the body.

A rear input unit 232 may be disposed on a rear surface of the body. The rear input unit 232 may be positioned below the camera 221'.

Commands inputted through the rear input unit 232 may be variously set. For instance, the rear input unit 232 is configured to input commands such as power ON/OFF, START, END, SCROLL or the like. The rear input unit 232 is also configured to input commands for controlling a level of sound outputted from the audio output unit 252, or commands for converting the current mode of the display unit 251 to a touch recognition mode. However, the present invention is not limited to this. That is, the mobile terminal may be provided with one of the front input unit and the rear input unit 232, or both of them.

As aforementioned, the controller 180 (refer to FIG. 1A) may control functions of the mobile terminal, using a display disposed on a side surface of the mobile terminal (a side display unit).

Hereinafter, a method of controlling functions of the mobile terminal using a side display unit will be explained in more detail with reference to the attached drawings.

First of all, a capturing function, among various functions which can be provided using a side display unit, will be explained in more detail.

For convenience, a first region means a display region disposed on a front surface of the mobile terminal (i.e., front display unit), the display region having a front surface, side surfaces and a rear surface. The second region means a region disposed on a side surface of the mobile terminal (i.e., side display unit). The display unit 251 of the mobile terminal may include a first region 261 formed on the front surface of the display unit 251, a second region 262 formed on a right side based on the first region 261, and a third region 263 formed on a left side based on the first region 261. Alternatively The display unit 251 of the present invention is provided with two display regions on right and left sides. However, the display unit 251 may further include a side display unit on one of right and left sides based on the first region 261 formed on the front surface of the display unit 251. For convenience, it is assumed that the display unit 251 of the present invention includes display units (display regions) on the front surface, the left side surface, and the right side surface. Thus, it is obvious to those skilled in the art that the present invention can be applied to a mobile terminal including a display region (display unit) only on one of the left side surface and the right side surface.

In the present invention, a front display unit (first region) is referred to as "261", and a side display unit (second region or third region) is referred to as "262" or "263". In a case where all of the front surface and the side surfaces can be equally used, the display unit 251 rather than the front surface and the side surface will be explained.

A capturing function performed by the mobile terminal according to the present invention may be also referred to as a 'screen capturing function'. The capturing function means that screen information output to the display unit 251 is stored in the memory in an image file format. The image includes a still image and a moving image. The capturing function may also mean that screen information output to the display unit 251 is stored in the memory, in other file format rather than an image file format.

Figure 3:
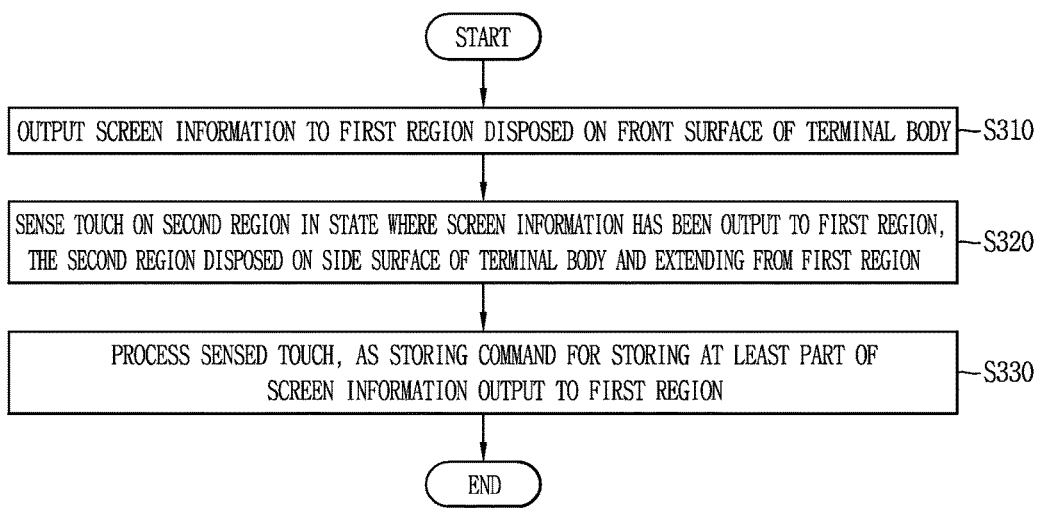
FIG. 3 is a flowchart illustrating a method of controlling a mobile terminal according to the present invention.
Figure 4A:
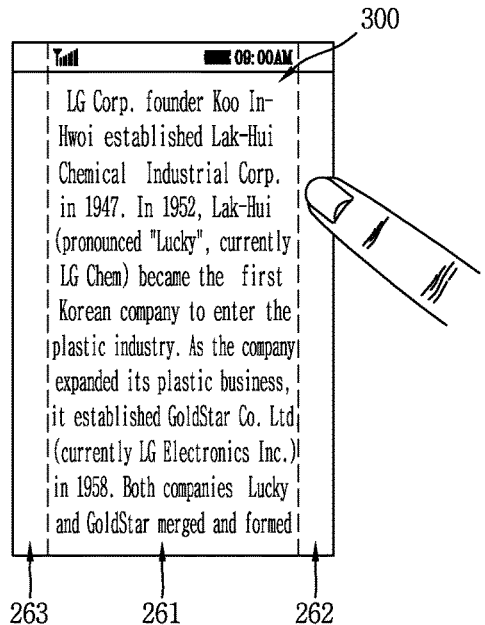
FIGS. 4(*a*), 4(*b*) and 4(*c*) are conceptual views for explaining the control method of FIG. 3.
Figure 4B:
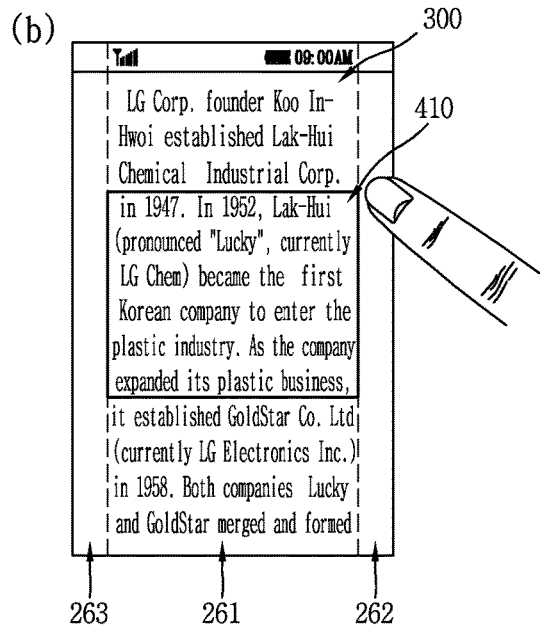
Figure 4C:
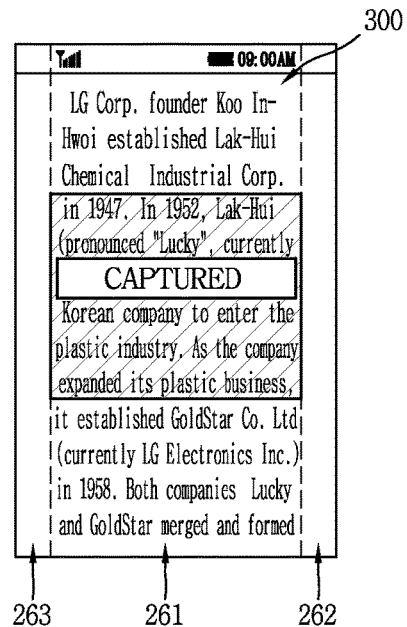

A method of providing a capturing function in the mobile terminal according to the present invention will be explained in more detail with reference to the attached drawings. FIG. 3 is a flowchart illustrating a method of controlling a mobile terminal according to the present invention, and FIGS. 4(a), 4(b) and 4(c) is a conceptual view for explaining the control method of FIG. 3.

Referring to FIG. 3 and FIGS. 4(a), 4(b) and 4(c), screen information 300 is output to the first region (front display unit 261) disposed on the front surface of the mobile terminal (S310). The screen information may be various types of information which can be output to the display unit 251. For instance, the screen information may be an execution screen of an application, a menu screen, a lock screen or a home screen. A type of the screen information output to the display unit 251 may be determined by a user's selection or under control of the controller 180.

In a state where the screen information 300 has been output to the first region (front display unit 261) (S310), if a preset type of touch is applied to the second region (side display unit 262), the controller 180 captures at least part of the screen information 300 output to the first region 261 based on the preset type of touch.

More specifically, in a state where the screen information 300 has been output to the first region (front display unit 261) (S310), a touch is sensed on the second region 262 disposed on the side surface of the body (S320). The touch sensed in S320 is a preset type of touch associated with a capturing function for capturing at least part of the screen information 300 output to the first region 261. Although not shown, in a state where the screen information 300 has been output to the first region (front display unit 261), if a touch is sensed on the second region 262, the controller 180 determines whether the sensed touch is a touch related to execution of a capturing function. The touch related to execution of a capturing function corresponds to a preset type of touch, which may be defined in various manners. The touch related to execution of a capturing function will be explained later in more detail.

If the sensed touch is a touch related to execution of a capturing function as a determination result, the controller 180 processes the sensed touch as a capturing command for capturing at least part of the screen information 300 output to the first region 261 (S330).

In a state where the screen information 300 has been output to the first region 261, if a preset type of touch related to a capturing function is sensed on the second region 262, the controller 180 may capture the screen information 300. At least one of a position and a size of a region of the screen information 300 to be captured ("capturing region") may be variable according to a touch type applied to the second region 262. The controller 180 may capture an entire part or a part of the screen information 300 according to a touch applied to the second region 262. The entire part of the screen information 300 may be a region rather than a status display bar. The status display bar means a region where status information of the mobile terminal such as a current time, the remaining amount of a battery and a reception sensitivity, or environment information is displayed.

In the present invention, a capturing function may be completed through a plurality of steps. For instance, if a first touch related to a capturing function is applied to the second region 262, the controller 180 may enter a capturing mode. The capturing mode means a series of conceptualized processes performed in the mobile terminal until when capturing is completed. In the capturing mode, the controller 180 may perform an operation related to capturing, in response to a capturing command applied to the mobile terminal.

For instance, in the capturing mode, a capturing region may be set, changed, stored, etc.

As shown in FIG. 4A, in a state where the screen information 300 has been output to the first region 261, if a preset type of touch related to execution of a capturing mode is sensed on the second region 262, the controller 180 may enter (execute) a capturing mode. In the capturing mode, the controller 180 may set a capturing region 410 as shown in FIG. 4B, in response to the preset type of touch, or other preset type of touch different from said preset type of touch.

If the capturing region 410 has been set in response to a touch applied to the second region 262, the controller 180 captures screen information included in the capturing region 410, in response to an additional control command.

The additional control may be applied in various manners. For instance, the additional control command may be applied through a touch applied to the second region 262, or a touch applied to the first region 261. The control command may be also applied through a voice, or a hardware key provided at the terminal body. The controller 180 may capture screen information included in the capturing region 410, in response to the additional control command. If the screen information included in the capturing region 410 has been captured, the screen information included in the capturing region 410 is stored in the memory 170 as an image file format or other file format.

So far, it has been explained that the screen information 300 is captured in response to an additional control command. However, the controller 180 may capture screen information included in the capturing region, based on a touch for setting the capturing region. For instance, if a touch for setting the capturing region 410 has been sensed for a preset time, the controller 180 may capture screen information included in the capturing region 410. As another example, if a preset type of touch consecutive to a touch for setting the capturing region 410 has been sensed, the controller 180 may capture screen information included in the capturing region 410.

In the above embodiment, processes of setting the capturing region 410 have been explained. However, in the present invention, at least part of the screen information 300 can be directly performed, in response to a touch applied to the second region 261, without processes of setting the capturing region 410.

As aforementioned, the controller may be provided with a capturing function to capture information output to the display unit, in response to a touch applied to the side display unit. Thus, the present invention can overcome limitations on the size of the display unit by utilizing the side display unit, the display unit configured to receive a control command and to output information.

Hereinafter, embodiments of the capturing function aforementioned with reference to FIGS. 3 and 4 will be explained in more detail. A preset type of touch related to a capturing function may be applied to a side display unit in various manners. In this specification, a method of performing a capturing function by utilizing a side display unit will be explained with reference to representative embodiments.

Hereinafter, a first touch method, among various touch methods which are utilizable to perform a capturing function, will be explained in more detail with reference to the attached drawings.

Figure 5A:
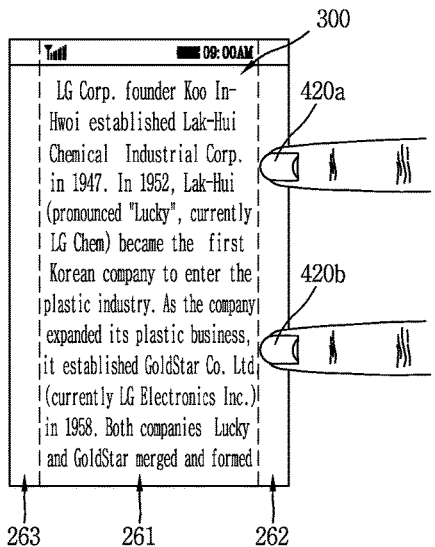
FIGS. 5A(a), 5A(b), 5A(c), 5B(a), 5B(b), 5B(c), 6A(a), 6A(b), 6A(c), 6B(a), 6B(b), 6B(c), 7A(a), 7A(b), 7B(a), 7B(b), 7B(c), 7B(d), 7C(a), 7C(b), 7C(c), 7C(d), 7D(a), 7D(b), 7D(c), 7D(d), 8A(a), 8A(b), 8B(a), 8B(b), 8B(c), 8B(d), 8C(a), 8C(b), 8C(c), 8C(d), 9A(a), 9A(b), 9B(a), 9B(b), 9C(a), 9C(b), 9C(c), 9D(a), 9D(b), 9D(c), 9E(a), 9E(b), 9E(c), 9F(a), 9F(b) 10A(a), 10A(b), 10A(c), 10A(d), 10B(a), 10B(b), 10B(c), 10B(d), 10C(a) and 10C(b) are conceptual views for explaining a method of providing a capturing function, using a touch applied to a side display unit.
Figure 5A:
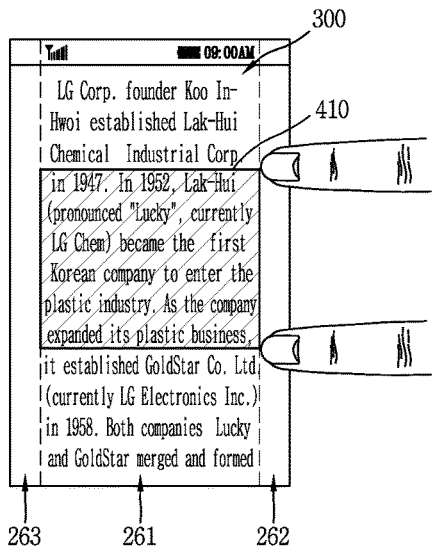
Figure 5A:
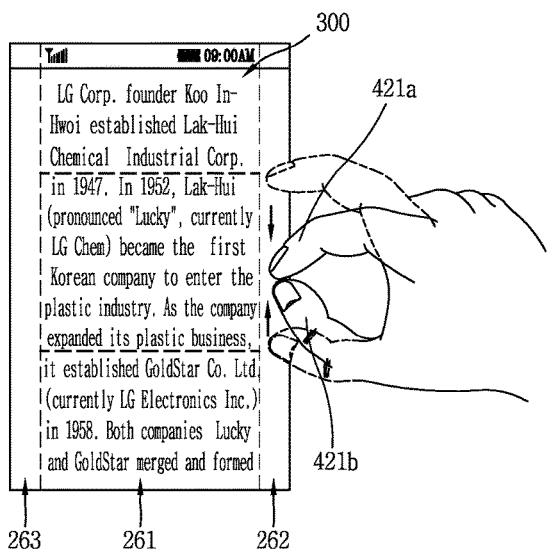

FIGS. 5A(a), 5A(b), 5A(c), 5B(a), 5B(b), 5B(c), 6A(a), 6A(b), 6A(c), 6B(a), 6B(b), 6B(c), 7A(a), 7A(b), 7B(a),

7B(b), 7B(c), 7B(d), 7C(a), 7C(b), 7C(c), 7C(d), 7D(a), 7D(b), 7D(c), 7D(d), 8A(a), 8A(b), 8B(a), 8B(b), 8B(c), 8B(d), 8C(a), 8C(b), 8C(c), 8C(d), 9A(a), 9A(b), 9B(a), 9B(b), 9C(a), 9C(b), 9C(c), 9D(a), 9D(b), 9D(c), 9E(a), 9E(b), 9E(c), 9F(a), 9F(b) 10A(a), 10A(b), 10A(c), 10A(d), 10B(a), 10B(b), 10B(c), 10B(d), 10C(b) and 10C(c) are conceptual views for explaining a method of providing a capturing function, using a touch applied to a side display unit.

Referring to FIG. 5A(a), 5A(b), 5A(c), the mobile terminal according to the present invention may execute a capture mode, based on sensing of touches applied to two points 420*a* and 420*b* on a second region 262. If touches applied to the two points (the first point 420*a* and the second point 420*b*) are simultaneously sensed, the controller 180 determines the sensing as a request for capturing at least part of screen information 300 output to a first region 261. If touches applied to the first point 420*a* and the second point 420*b* are sensed, in a state where the screen information 300 has been output to the first region 261, the controller 180 performs a capturing function for capturing at least part of the screen information 300. In the present invention, a region where touches for performing a capturing function are applied is not limited to the second region. For instance, touches applied to the second region 262 may be replaced by touches applied to a third region 263, in all embodiments related to a capturing function.

The controller 180 may be configured to recognize a request for a capturing function, if the first point 420*a* and the second point 420*b* are touched. Further, the controller 180 may set a capturing region based on the touched first point 420*a* and second point 420*b*.

More specifically, if touches applied to the first point 420*a* and the second point 420*b* on the second region 262 are simultaneously sensed, the controller 180 sets at least part of the screen information 300 output to the first region 261, as a capturing region 410, based on the touches. The controller 180 may determine a position, a size, an area, etc. of the capturing region, based on at least one of a position of the first point 420*a* and the second point 420*b*, and a distance between the first point 420*a* and the second point 420*b*.

For instance, as shown in FIG. 5A(b), a size and a position of a capturing region may be determined by the first point 420*a* and the second point 420*b*. That is, the size and the position of the capturing region are determined according to a position of the first point 420*a* and the second point 420*b* on the second region 262.

More specifically, a vertical length of the capturing region 410 corresponds to an interval between points on the second region 262 where touches have been sensed (e.g., the first point 420*a* and the second point 420*b*). A position of the capturing region 410 on the first region 261 (e.g., a boundary) corresponds to a position of touches applied to the second region 262 (e.g., the first point 420*a* and the second point 420*b*).

A boundary of the capturing region 410 may be defined by lines extending from the first point 420*a* and the second point 420*b*. The lines may be formed to penetrate the first region 261, and may be formed in parallel. The lines may be extending up to opposite sides to touched points on the display unit. In this case, the extending lines may be a substantial boundary line output to the display unit, or may be a virtual boundary line not output to the display unit. The display unit may be divided into three regions by the lines, and the capturing region 410 may be defined as a middle region among the divided three regions (refer to the oblique region of FIG. 5A(b)). As shown, the capturing region 410 may have a quadrangular shape. A horizontal length of the capturing region 410 may be preset without being influenced by touches applied to the second region 262. For instance, the horizontal length of the capturing region 410 may correspond to a horizontal length of the first region 261.

As aforementioned, in the present invention, a capturing region may be defined according to an interval between points on the second region 262 where touches have been sensed, or a position of the touches. Once two points on the second region 262 are touched by a user, the controller 180 may execute a capturing mode, and may set a capturing region.

FIG. 5A illustrates a case where touches applied to the first point 420*a* and the second point 420*b* are simultaneously applied. However, the present invention is not limited to this. For instance, in a case where a first touch has been applied to a point on the second region 262, and then a second touch has been applied to another point while the first touch is maintained, the controller 180 may execute a capturing mode. That is, even if two touches are not simultaneously applied to two points on the second region 262, the controller 180 may execute a capturing mode, in response to sensing of the two touches.

Figure 5B:
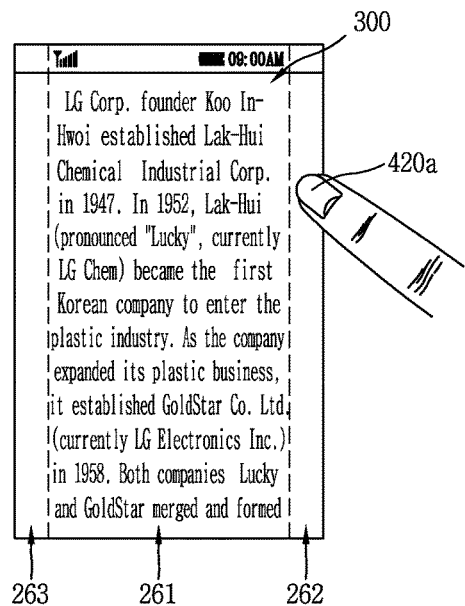
Figure 5B:
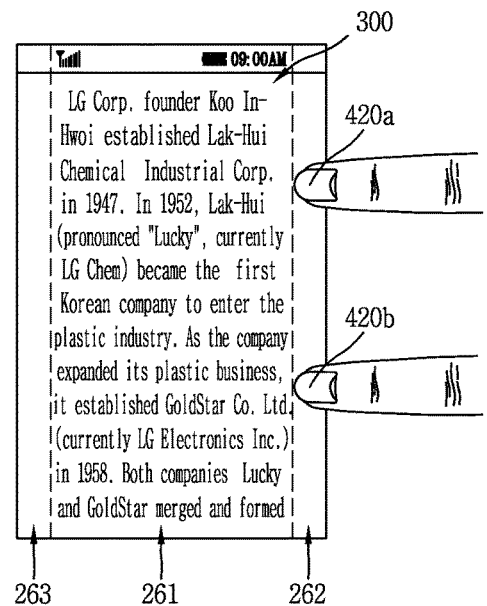
Figure 5B:
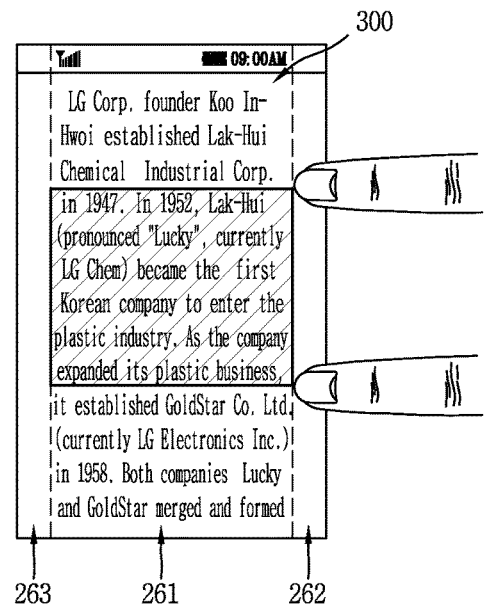

More specifically, in a state where a first touch has been applied to the first point 420*a* on the second region 262 as shown in FIG. 5B(a), if a second touch applied to the second point 420*b* is sensed as shown in FIG. 5B(b), the controller 180 determines that the first touch and the second touch have been simultaneously sensed. Accordingly, the controller 180 may specify a capturing region as shown in FIG. 5B(c).

Referring to FIG. 5A(a), 5A(b), 5A(c) back, in a state where the capturing region 410 has been set, the controller 180 may capture screen information included in the capturing region 410, in response to an additional touch applied to the second region 262. The additional touch is a touch related to a control command for storing the screen information included in the capturing region 410 in the memory as an image file format or other file format, which may have a preset type.

More specifically, the additional touch may be a touch consecutive to at least one of touches sensed on the first point 420*a* and the second point 420*b* (e.g., a first touch and a second touch), and may be a preset type of touch.

Alternatively, the additional touch may be a touch inconsecutive to touches sensed on the first point 420*a* and the second point 420*b* (e.g., a first touch and a second touch), and may be a preset type of touch.

For instance, as shown in FIG. 5A(c), a preset type of touch corresponding to the additional touch may be a drag touch consecutive to at least one of touches sensed on the first point 420*a* and the second point 420*b* (e.g., a first touch and a second touch), the drag touch applied from one of the first touch and the second touch, toward another thereof.

That is, the additional touch may be a pinch-in touch consecutive to at least one of touches sensed on the first point 420*a* and the second point 420*b* (e.g., a first touch and a second touch).

In a case where the pinch-in touch has been applied to the second region 262, the controller 180 may store screen information included in the capturing region 410 in the memory as an image file format or other file format.

In a case where an interval between points to which the pinch-in touch has been applied is less than a preset length, the controller 180 may capture screen information included in the capturing region 410. For instance, if a user's fingers contacting the second region 262 move to almost contact each other, the controller 180 may capture the screen information.

In the above configuration, the additional touch is a pinch-in touch consecutive to at least one of touches sensed on the first point 420a and the second point 420b (e.g., a first touch and a second touch). However, the additional touch may be a pinch-in touch inconsecutive to the first touch and the second touch.

As aforementioned, in the present invention, in a case where a first touch and a second touch are sequentially applied, capturing the screen information 300 may be completed. In this case, the first touch is a touch for entering a capturing mode and setting a capturing region (i.e., touches applied to the first point 420a and the second point 420b shown in FIGS. 5A (a) and (b)). The second touch is an additional touch for capturing screen information included in the capturing region (i.e., pinch-in touch shown in FIG. 5C(c)).

In the present invention, at least two steps (e.g., a first step of applying a first touch, and a second step of applying a second touch) may be required in order to complete a capturing operation. The capturing mode is ended if capturing screen information is completed by applying the first touch and the second touch.

As shown in FIG. 5A, the controller 180 sets a capturing region, in response to touches applied to at least two points 420a and 420b on the second region 262. In the present invention, a graphic effect may be implemented so that information on the set capturing region can be provided to a user. A user may have a difficulty in recognizing an operation of the mobile terminal, unless information is output in at least one of audible, visual and tactile manners. Even if a capturing region has been set by a touch applied to the second region 262, a user may not precisely recognize a position of the capturing region. In order to solve such problem, in the present invention, information on a set capturing region is output. This can allow a user to be provided with information on a precise position of the capturing region on the first region 261.

Information on a region set as a capturing region may be provided in various manners. For instance, information on a region set as a capturing region may be output in a visible manner. For instance, the controller 180 may output a graphic object (or guide image) to a capturing region. Then, a user may recognize the capturing region, through the graphic object (or guide image) output to the capturing region.

Figure 6A:
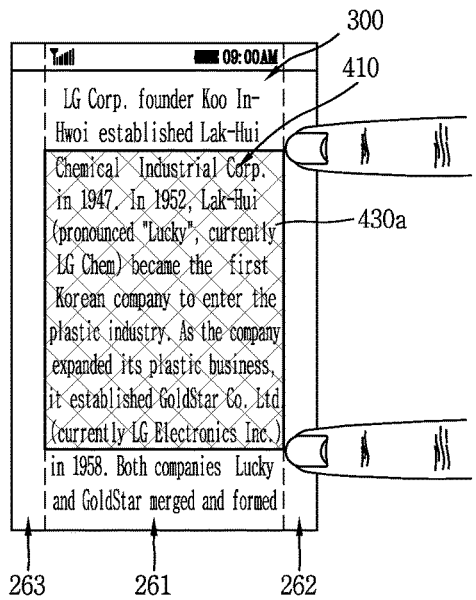
Figure 6A:
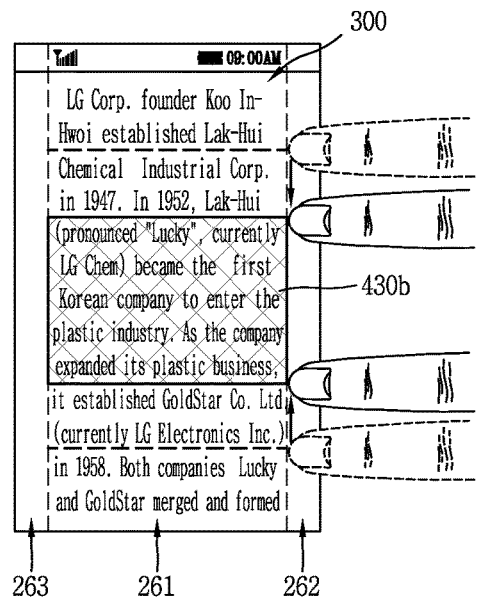
Figure 6A:
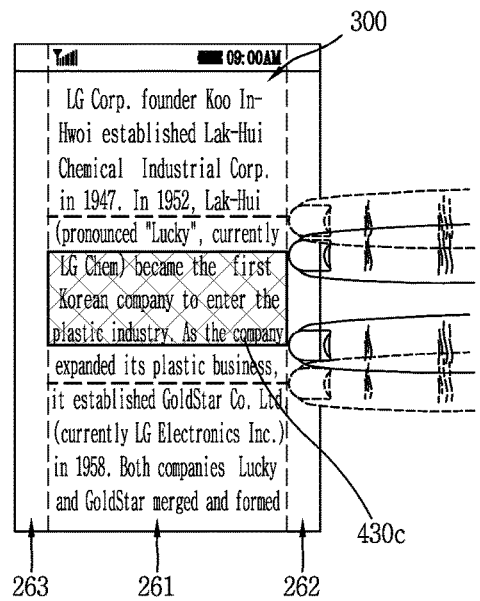

As shown in FIG. 6A(a), once a capturing region 410 (refer to FIGS. 5A and 5B) is set by touches applied to two points on the second region 262, the controller 180 outputs a graphic object 430a to the capturing region 410.

The controller 180 outputs the graphic object 430a, to the capturing region 410 set as two points on the second region 262 are touched.

The graphic object 430a may have the same size as the capturing region 410. That is, the graphic object 430a may be formed to cover the capturing region 410.

Even if the graphic object 430a has covered the capturing region 410, information output to the capturing region 410 may be exposed to outside. The information output to the capturing region 410 may be overlapped with the graphic object, in a form to be recognizable by a user. The graphic object may have transparency. As the semi-transparent graphic object is overlapped with the capturing region 410, information output to the capturing region 410 may be recognizable by a user.

A design of the graphic object 430a may be modified in various manners.

In the present invention, information on a progressed degree of capturing may be output in at least one of audible, visible and tactile manners.

As shown in FIG. 5A, in a state where a capturing region has been set, upon sensing of a touch related to a control command for storing screen information included in the capturing region 410 in the memory as an image file format or other file format, the controller 180 may change appearance of the graphic object 430a along the touch.

For instance, as aforementioned, upon sensing of a pinch-in touch consecutive to at least one of touches sensed on the first point 420a and the second point 420b for setting a capturing region (refer to FIGS. 5A and 5B) (e.g., a first touch and a second touch), the controller 180 may change the graphic object 430a along the pinch-in touch.

Alternatively, upon sensing of a pinch-in touch inconsecutive to touches sensed on the first point 420a and the second point 420b for setting a capturing region (refer to FIGS. 5A and 5B) (e.g., a first touch and a second touch), the controller 180 may change the graphic object 430a along the pinch-in touch.

For instance, as shown in FIGS. 6A(b) and 6A(c), a pinch-in touch is applied to a second region 262, the controller 180 may change appearance of graphic objects 430a, 430b and 430c. The appearance of the graphic objects 430a, 430b and 430c may be gradually changed along the pinch-in touch. The size of the graphic objects 430a, 430b and 430c may be decreased according to a progressed degree of the pinch-in touch.

An output size of the graphic objects 430a, 430b and 430c may be gradually decreased.

In a state where an output size of the graphic objects 430a, 430b and 430c has been decreased to a size smaller than a reference size, the controller 180 may capture screen information included in the capturing region 410.

That is, as aforementioned, the controller 180 may capture screen information included in the capturing region 410, if an interval between two points to which the pinch-in touches have been applied is less than a preset value. For instance, if a user's fingers contacting the second region 262 move to almost contact each other, the controller 180 may capture the screen information.

Upon completion of the capturing, output of the graphic objects 430a, 430b and 430c on the display unit 251 may be ended. An output ending time of the graphic objects 430a, 430b and 430c corresponds to a capture ending time. However, the output ending time and the capturing ending time may not be the same.

Figure 6B:
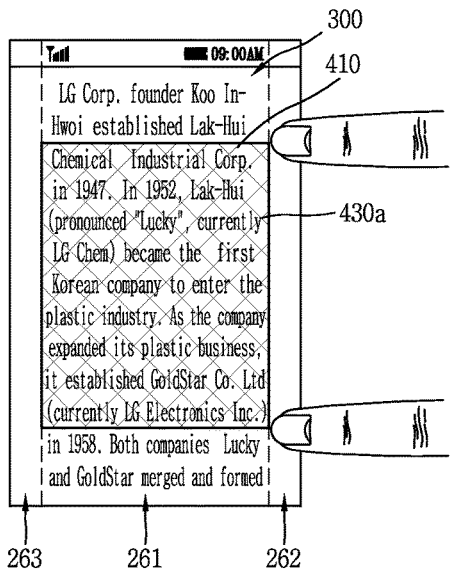
Figure 6B:
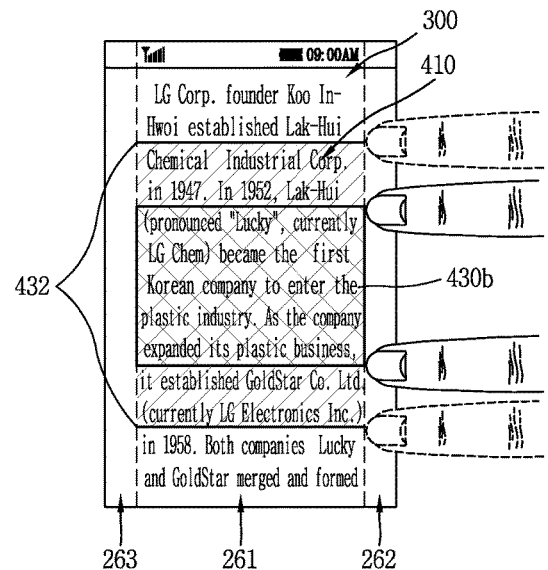
Figure 6B:
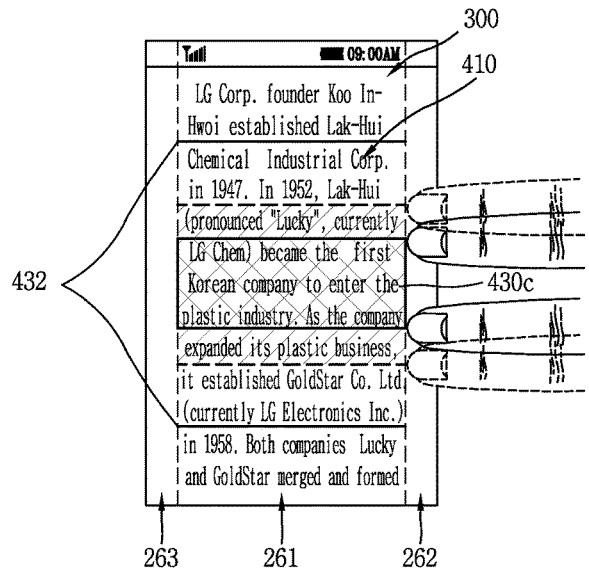

As aforementioned with reference to FIGS. 6A(a), (b) and (c), in a state where the graphic object 430a has been output, even if the appearance of the graphic object 430a is changed according to a touch applied to the second region 262 (e.g., pinch-in touch), the controller 180 may further output other graphic object 432 for providing information on a set capturing region, as shown in FIGS. 6B(b) and (c). The controller 180 may change the graphic objects 430a, 430b and 430c along the touch, and may further output other graphic object 432 indicating a position of the capturing region 410.

Said other graphic object 432 may be output only to an edge of the capturing region 410. Alternatively, said other graphic object 432 may be output to cover parts of the capturing region 410, the parts to which the graphic objects 430a, 430b and 430c have not been output.

In the present invention, even if the appearance of the graphic objects 430a, 430b and 430c is changed along the touch, the controller 180 may continuously provide information on a position of the capturing region 410, through said other graphic object 432.

In the present invention, a capturing mode may be deactivated (released or ended) after screen information included in a capturing region has been completely captured. Further, the capturing mode may be deactivated (released or ended) even if screen information included in a capturing region has not been completely captured. More specifically, the capturing mode may be cancelled before capturing is completed. Cancelling the capturing mode may be performed by a user's intention.

For instance, a control command for cancelling a capturing mode may be applied through a touch applied to the second region 262, or a touch applied to the first region 261. The control command may be also applied through a voice, or a hardware key provided at the terminal body.

Hereinafter, an embodiment to cancel a capturing mode will be explained in more detail. Cancelling a capturing mode may be performed based on a touch applied to the second region 262, release of a touch, or etc.

Figure 7A:
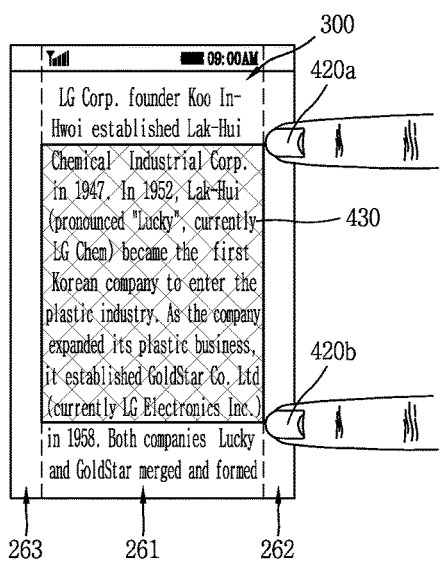
Figure 7A:
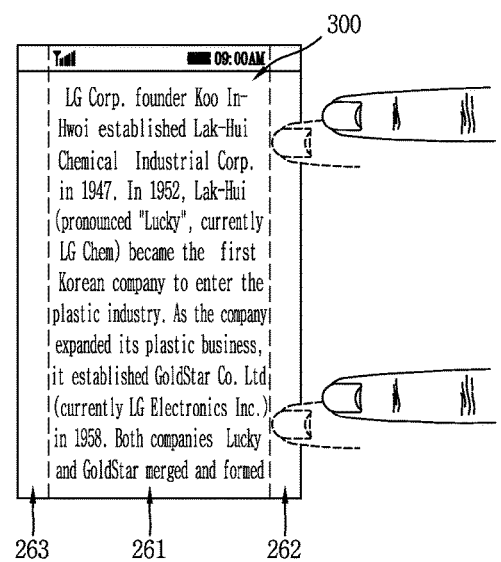

For instance, as aforementioned with reference to FIGS. 5A and 5B, a capturing mode is activated when touches applied to two points 420a and 420b on the second region 262 are sensed. As shown in FIGS. 7A(a) and (b), the capturing mode may be cancelled when the touches applied to the two points 420a and 420b on the second region 262 are released.

In a state where a capturing region 430 has been set by a first touch and a second touch applied to the two points 420a and 420b on the second region 262, if a graphic object has been output to the capturing region 430 as shown in FIGS. 6A and 6B, the graphic object may disappear (may not be output any longer) if the touches applied to the two points 420a and 420b are released.

Figure 7B:
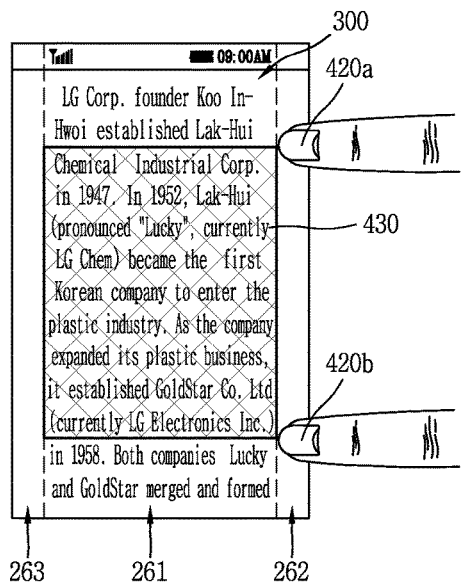
Figure 7B:
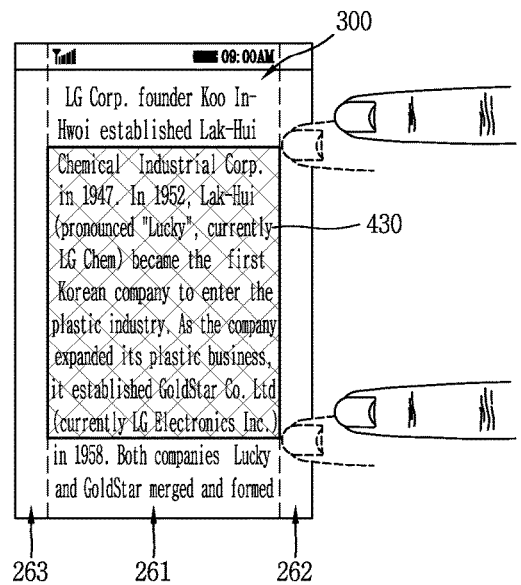
Figure 7B:
Figure 7B:
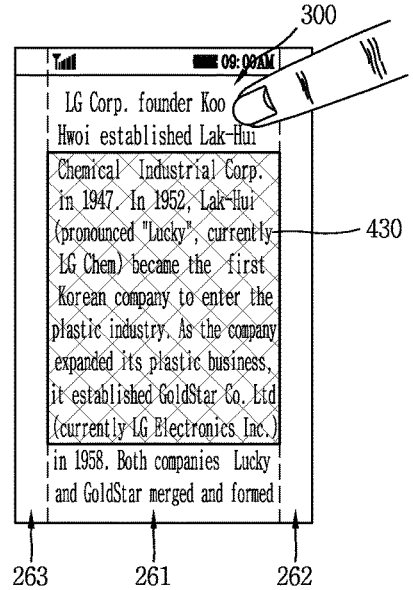

As another example, as shown in FIGS. 7B(a) and (b), if a first touch and a second touch applied to the two points 420a and 420b on the second region 262 are sensed, a capturing mode may be executed. Even when the first touch and the second touch applied to the two points 420a and 420b on the second region 262 are released, the capturing mode may not be cancelled.

In this case, even if the touches applied to the two points 420a and 420b have been released, the controller 180 may maintain the capturing mode. In a state where the capturing mode is maintained, an output state of a graphic object to the capturing region 430 may be maintained.

As shown in FIGS. 7B(c) and (d), the capturing mode may be released when a preset type of touch is applied to a region not set as the capturing region 430 in the first region 261. The preset type of touch may be various. For instance, the preset type of touch may be a short-touch, a long-touch, a double touch, etc.

As shown in FIGS. 6A and 6B, in a state where a graphic object has been output to the capturing region 430, the graphic object may disappear (may not be output any longer) if the capturing mode is cancelled (or ended).

Figure 7C:
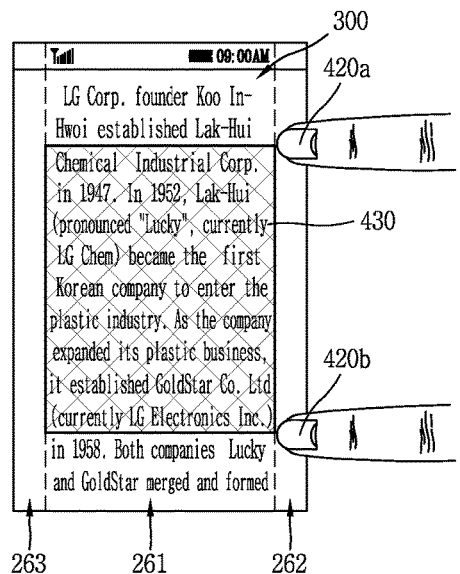
Figure 7C:
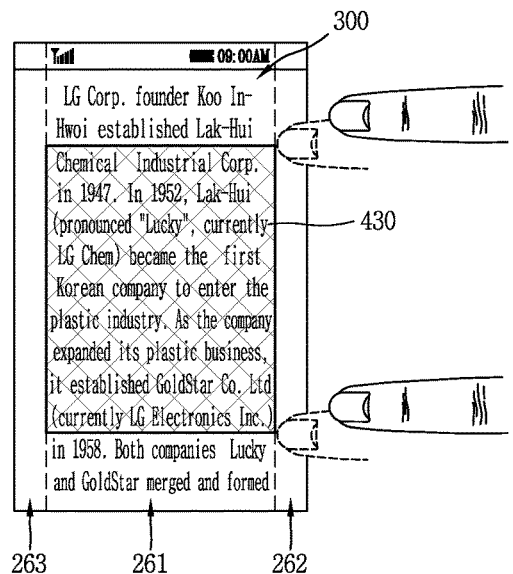
Figure 7C:
Figure 7C:
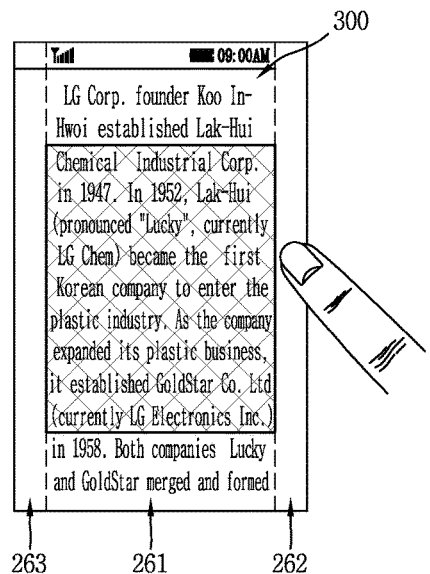

As another example, referring to FIGS. 7C(a) and (b) as aforementioned with reference to FIG. 7B, in a state where a capturing mode has been activated as a first touch and a second touch applied to the two points 420a and 420b on the second region 262 have been sensed, even if the touches applied to the two points 420a and 420b are released, the capturing mode may be maintained. That is, the controller 180 may maintain the capturing mode, even through the touches applied to the two points 420a and 420b are released. In a state where the capturing mode is maintained, an output state of a graphic object to the capturing region 430 may be maintained.

As shown in FIGS. 7C(c) and (d), the capturing mode may be released when a preset type of touch is applied to the second region 262. The preset touch may be various. For instance, the preset touch may be a short-touch, a long-touch, a double touch, etc.

Further, as shown in FIGS. 6A and 6B, in a state where a graphic object has been output to the capturing region 430, the graphic object may disappear (may not be output any longer) if the capturing mode is cancelled (or ended).

Figure 7D:
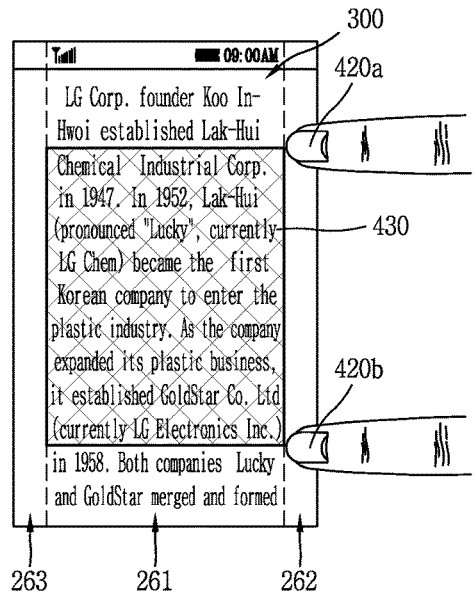
Figure 7D:
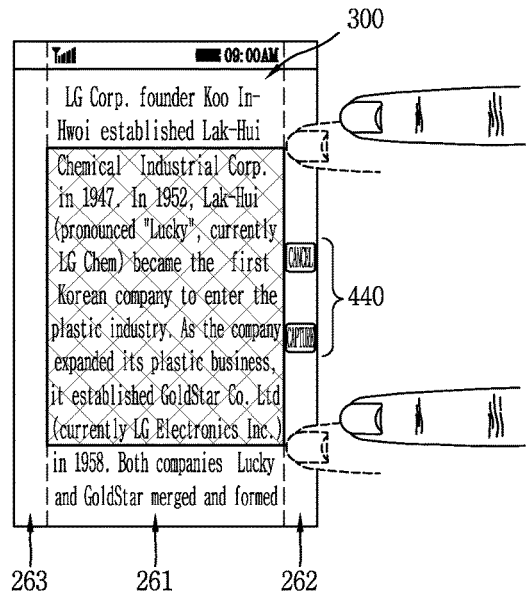
Figure 7D:
Figure 7D:
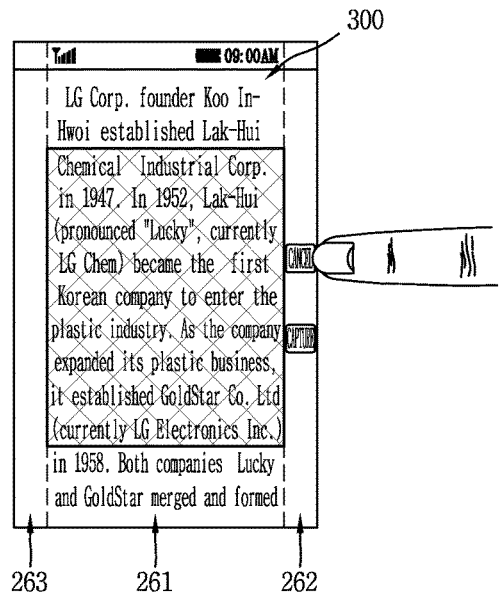

As another example, as shown in FIGS. 7D(b) and (c), the capturing mode may be cancelled through a function icon 440 output to the display unit 251. The function icon 440 is an icon related to cancelling a capturing mode. Such function icon 440 may be output to the display unit 251 in various cases. If a capturing mode is activated, the function icon 440 may be output to the display unit 251. If the capturing mode is deactivated (released or ended), the function icon 440 may disappear from the display unit 251 (or may not be output to the display unit 251 any longer). The function icon 440 may be output to at least one of the first region 261 and the second region 262 of the display unit 251.

For example, in a state where a capturing mode has been activated as a first touch and a second touch applied to the two points 420a and 420b on the second region 262 have been sensed as shown in FIG. 7D(a), if the touches applied to the two points 420a and 420b are released, the function icon 440 may be output to the second region 262 as shown in FIG. 7D(b). The capturing mode may be maintained, even if the touches applied to the two points 420a and 420b are released. In a state where the function icon 440 has been output, if a function related to cancelling a capturing mode is selected as shown in FIGS. 7D (c) and (d), the controller 180 may cancel the capturing mode.

In the capturing mode, an output state of a graphic object to the capturing region 430 may be maintained. If the capturing mode is cancelled deactivated, the graphic object may disappear (may not be output any longer).

In the mobile terminal according to the present invention, if an additional command for capturing screen information has not been applied for a preset time in a capturing mode, the capturing mode may be released. In this case, the capturing mode may be automatically released even if an additional control command has not been input from a user.

Hereinafter, a method of changing (resetting) a region set as a capturing region, especially, a method of changing a position of a capturing region will be explained in more detail with reference to the attached drawings.

In the mobile terminal according to the present invention, a capturing mode is activated if touches applied to the two points 420a and 420b on the second region 262 are sensed as shown in FIGS. 5A and 5B. In a state where a capturing region has been set (refer to 410 of FIG. 5A and 435a of FIG. 8A) based on a position of a first touch and a second touch applied to the two points 420a and 420b, etc., the controller 180 may re-set the capturing region in response to sensing of touches consecutive to the first touch and the second touch, respectively.

Figure 8A:
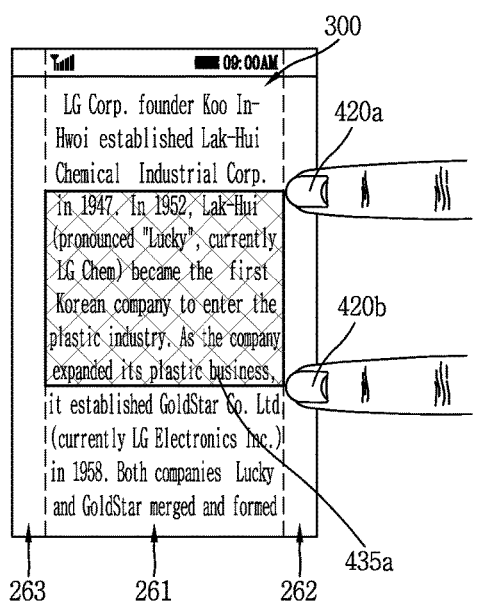
Figure 8A:
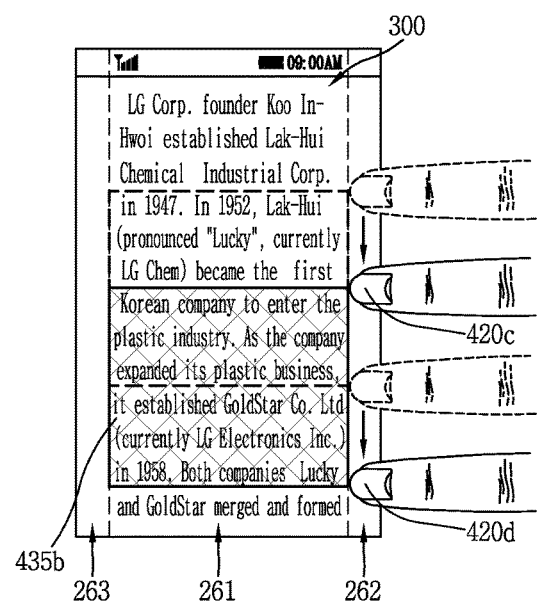

For instance, if a drag input, which starts from the first touch and the second touch applied to the first point 420a and the second point 420b, respectively (refer to FIG. 8A(a)), is applied up to a third point 420c and a fourth point 420d as shown in FIG. 8A(b), the controller 180 may re-set the capturing region in response to the drag input (refer to FIG. 435*b* of FIG. 8A(b)). That is, the controller 180 may change the capturing region, based on a drag touch consecutive to the first touch and the second touch applied to the first point 420*a* and the second point 420*b*. That is, a position of the capturing region may be changed based on the drag touch. The drag touch consecutive to the first touch and the second touch may be touches moving to the same direction.

A changed degree of the position of the capturing region may be variable according to a progressed degree of the drag touch, or a length of the drag touch.

In the aforementioned configuration, the drag touch is touches consecutive to touches sensed on the first point 420*a* and the second point 420*b*, e.g., a first touch and a second touch. However, the drag touch may be a touch inconsecutive to the first touch and the second touch. In this case, the capturing mode may be maintained even when at least one of the first touch and the second touch applied to the first point 420*a* and the second point 420*b* has been released. If a plurality of touches starting from any two points on the second region 262 are dragged to the same direction, the capturing region may be reset in correspondence to the dragged direction.

Further, in a state where a graphic object has been output to the capturing region 430 as shown in FIGS. 6A and 6B, the graphic object may be moved in correspondence to the drag touch. The graphic object may be output to a capturing region reset in correspondence to the drag touch.

For another example, resetting the capturing region may be performed based on a drag touch starting from one point on the second region 262.

Figure 8B:
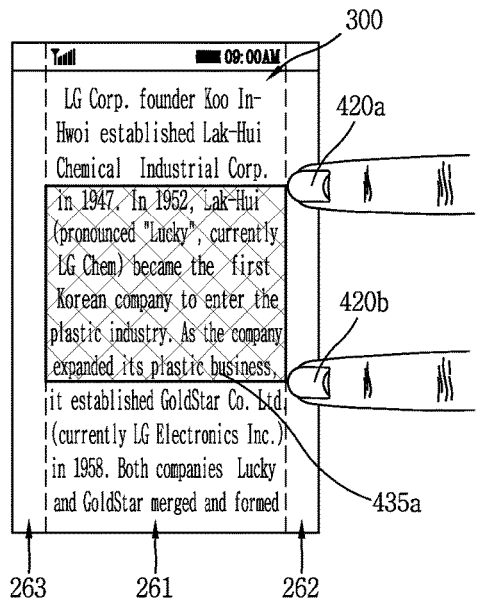
Figure 8B:
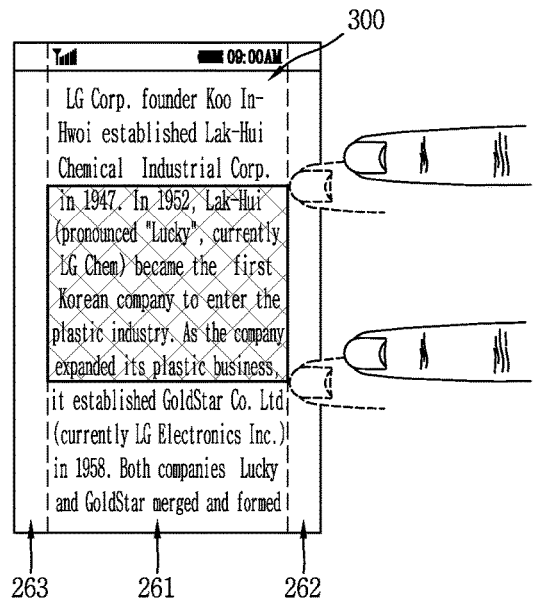
Figure 8B:
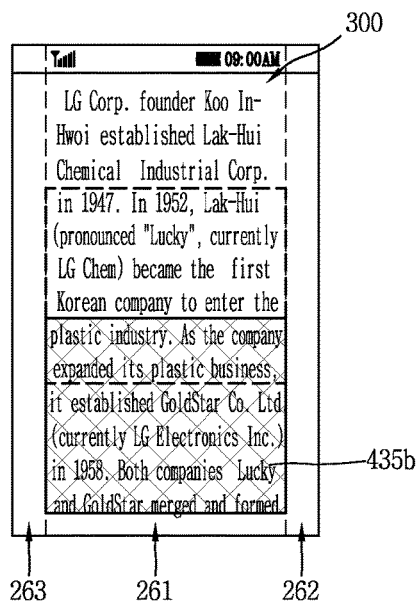
Figure 8B:
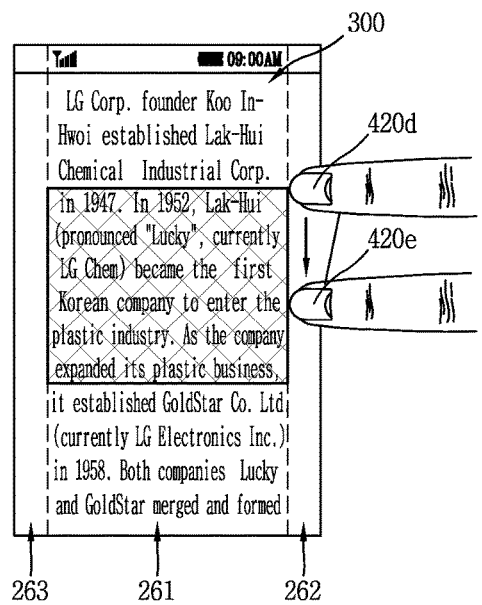

The touch applied to said one point (refer to FIG. 420*d* of FIG. 8B(c)) may be a touch re-applied after the touches applied to the second region 262 have been released as shown in FIGS. 8B(a) and (b). That is, in a case where the touches applied to the second region 262 have been released, the controller 180 may change the capturing region, based on a touch re-applied to the display unit 251 after the touches have been released.

In this case, the capturing mode may be maintained even when at least one of the first touch and the second touch applied to the first point 420*a* and the second point 420*b* is released.

The touch applied to said one point (refer to FIG. 420*d* of FIG. 8B(c)) may be one of the first touch and the second touch applied to the first point 420*a* and the second point 420*b* (refer to FIGS. 5A and 5B).

As shown in FIGS. 8B(c) and (d), the controller 180 may change the capturing region, based on a drag touch starting from one point on the second region 262. Changing the capturing region may correspond to resetting the capturing region. Through the change (resetting), a position of the capturing region may be altered (refer to 435*a* and 435*b* of FIG. 8B). The position of the capturing region may be changed according to one of a direction and a length of the drag touch.

As shown in FIGS. 6A and 6B, in a state where a graphic object has been output to the capturing region 430, the graphic object may be moved in correspondence to a touch for changing the capturing region. The graphic object may be output to other capturing region reset by a touch.

As another example, resetting the capturing region may be performed based on a drag touch starting from one point on the first region 261.

Figure 8C:
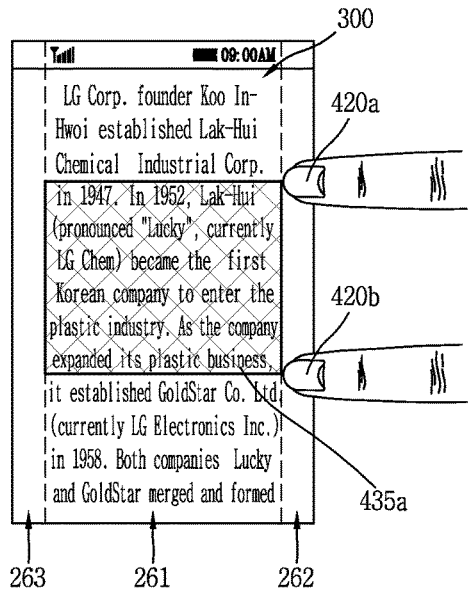
Figure 8C:
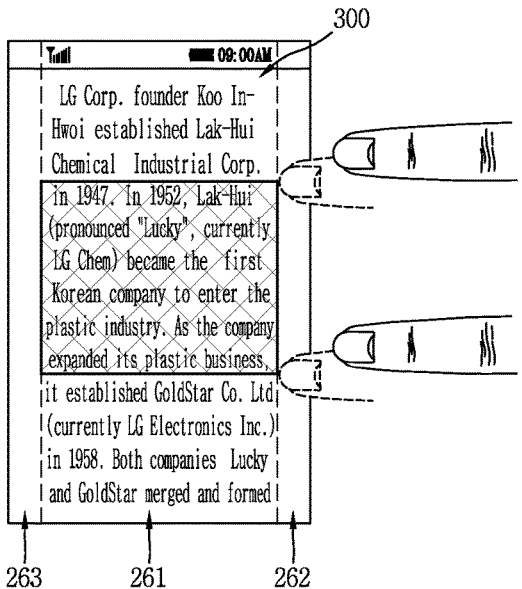
Figure 8C:
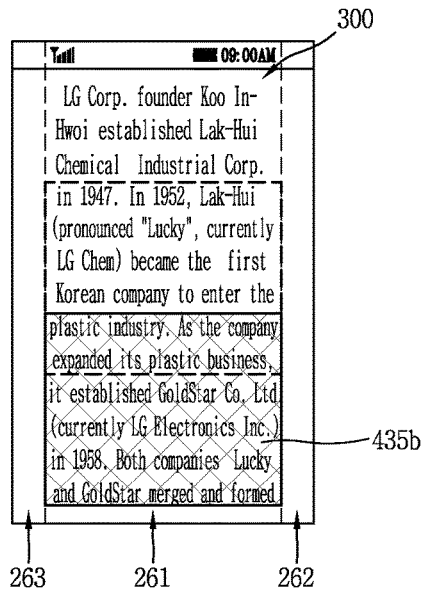
Figure 8C:
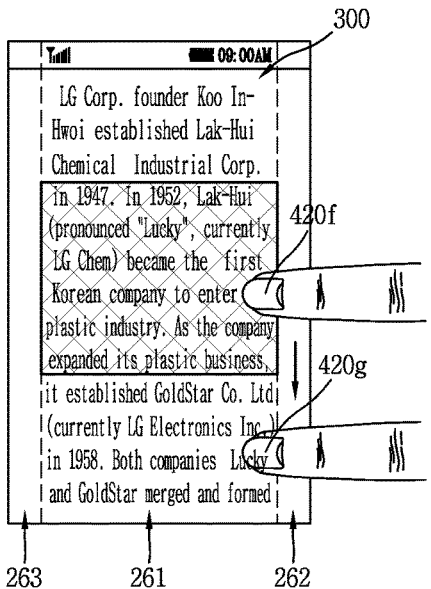

As shown in FIGS. 8C(a) and (b), the touch applied to said one point may be a touch re-applied to the second region 262 after the touches have been released. That is, in a case where the touches applied to the second region 262 have been released, the controller 180 may change the capturing region, based on a touch re-applied to the display unit 251 after the touches have been released.

In this case, the capturing mode may be maintained even when at least one of the first touch and the second touch applied to the first point 420*a* and the second point 420*b* is released.

As shown in FIG. 8C(c), the touch applied to said one point may be a touch applied to a preset capturing region 435*a*. The touch applied to a preset capturing region 435*a* may be a drag touch.

As shown in FIGS. 8C(c) and (d), the controller 180 may change the capturing region, based on a drag touch starting from the capturing region on the first region 261. Changing the capturing region may correspond to resetting the capturing region. Through the change (resetting), a position of the capturing region may be altered (refer to 435*a* and 435*b* of FIG. 8C). The position of the capturing region may be changed according to one of a direction and a length of the drag touch.

As shown in FIGS. 6A and 6B, in a state where a graphic object has been output to the capturing region 430, the graphic object may be moved in correspondence to a touch for changing the capturing region. The graphic object may be output to other capturing region reset by a touch.

Although not shown, the touch applied to the first region 261 so as to change the capturing region may not be limited to a touch applied to a preset capturing region.

Hereinafter, a method of changing (resetting) a region set as a capturing region, especially, a method of changing a size of a capturing region will be explained in more detail with reference to the attached drawings.

In the mobile terminal according to the present invention, a capturing mode is activated when touches applied to the two points 420*a* and 420*b* on the second region 262 are sensed as shown in FIGS. 5A and 5B. In the capturing mode, the controller 180 may change a size of a set capturing region, based on a preset touch sensed on at least one of the first region and the second region.

The controller 180 may change a size of a set capturing region, based on a preset touch consecutive to at least one of a first touch and a second touch applied to the first point 420*a* and the second point 420*b* on the second region 262. Alternatively, the controller 180 may change a size of a set capturing region, based on a preset touch inconsecutive to a first touch and a second touch applied to the first point 420*a* and the second point 420*b* on the second region 262. The inconsecutive touch may be applied to at least one of the first region 261 and the second region 262.

For instance, in a state where a capturing region has been set (refer to 410 of FIG. 5A and 430*a* of FIG. 9A) based on a position of a first touch and a second touch applied to the two points 420*a* and 420*b* on the second region 262, etc., the controller 180 may change a size of the capturing region in response to sensing of touches consecutive to at least one of the first touch and the second touch.

Figure 9A:
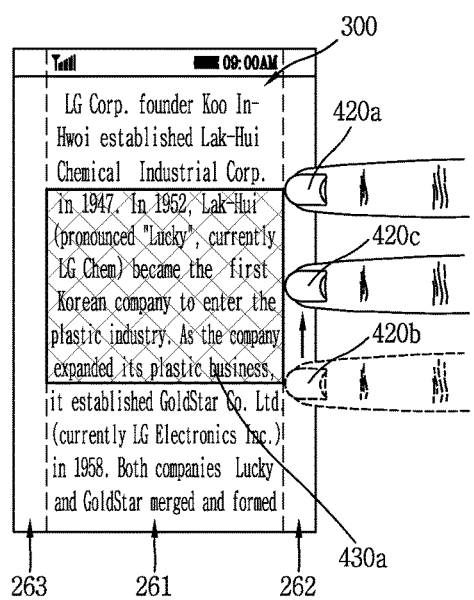
Figure 9A:
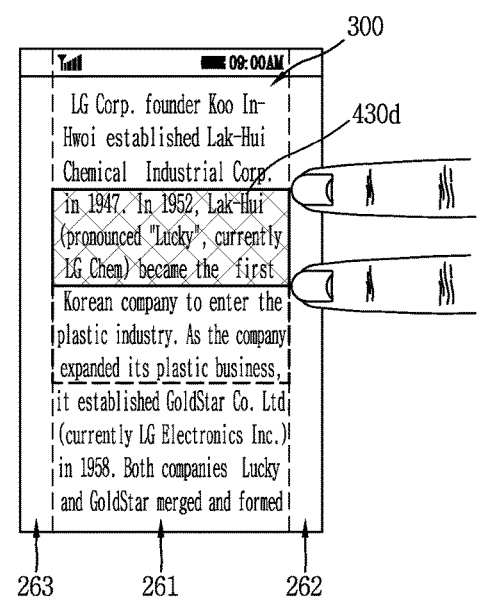

As shown in FIG. 9A(a), the controller 180 may sense a drag touch 420*c* starting from the second touch applied to the second point 420*b*, not from the first touch applied to the first point 420*a*. As shown in FIG. 9A(b), the controller 180 may reset the capturing region, in response to the drag touch (refer to 430*d* of FIG. 9A(b)). That is, the controller 180 may change a size of the capturing region, based on a drag touch consecutive to one of the first touch and the second touch applied to the first point 420*a* and the second point 420*b*, respectively. A changed degree of the size of the capturing region may be variable according to a progressed degree of the drag touch, or a length of the drag touch.

Further, in a state where a graphic object has been output to the capturing region 430 as shown in FIGS. 6A and 6B, the graphic object may be moved in correspondence to a touch for changing the size of the capturing region. The graphic object may be output to other capturing region reset by touch.

As another example, resetting the capturing region may be performed based on a preset touch starting from one point on the second region 262. The preset touch may be a drag touch.

The touch applied to said one point may be a touch re-applied to the display unit after the first touch and the second touch applied to the first point 420a and the second point 420b on the second region 262 (refer to FIGS. 8B(a) and (b)) have been released. That is, in a case where the touches applied to the second region 262 have been released, the controller 180 may change the capturing region, based on a touch re-applied to the display unit 251 after the touches have been released. In this case, the capturing mode may be maintained even when at least one of the first touch and the second touch applied to the first point 420a and the second point 420b is released.

Figure 9B:
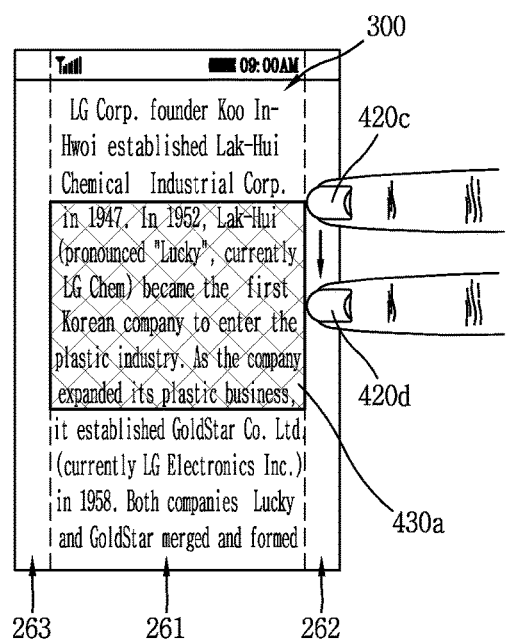
Figure 9B:
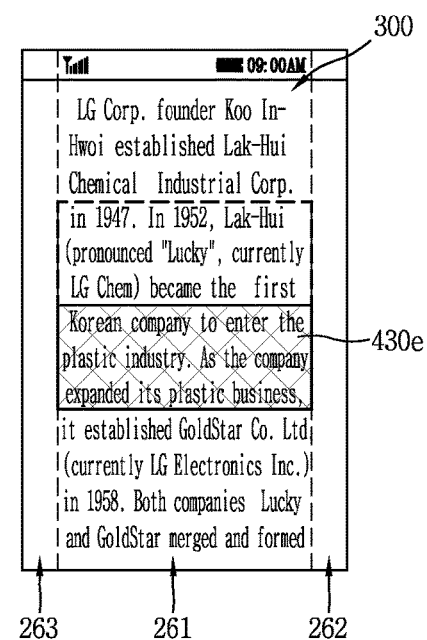

As shown in FIG. 9B(a), the controller 180 may change the size of the capturing region, based on a drag touch starting from one point 420c on the second region 262. A changed degree of the size of the capturing region may be variable according to a progressed degree of the drag touch, or a length of the drag touch.

As shown in FIGS. 6A and 6B, in a state where a graphic object has been output to the capturing region 430, the graphic object may be moved in correspondence to a touch for changing the capturing region. The graphic object may be output to other capturing region reset by a touch.

As another example, resetting the capturing region may be performed based on a preset drag touch on the second region 262. More specifically, the preset drag touch may be a drag touch starting from one point on the first region 261.

The touch applied to said one point may be a touch re-applied to the display unit after the first touch and the second touch applied to the first point 420a and the second point 420b on the second region 262 (refer to FIGS. 5A(a) and (b)) is released.

That is, in a case where the touches applied to the second region 262 have been released, the controller 180 may change the size of the capturing region, based on a touch re-applied to the display unit 251 after the touches have been released. In this case, the capturing mode may be maintained even when at least one of the first touch and the second touch applied to the first point 420a and the second point 420b is released.

Figure 9C:
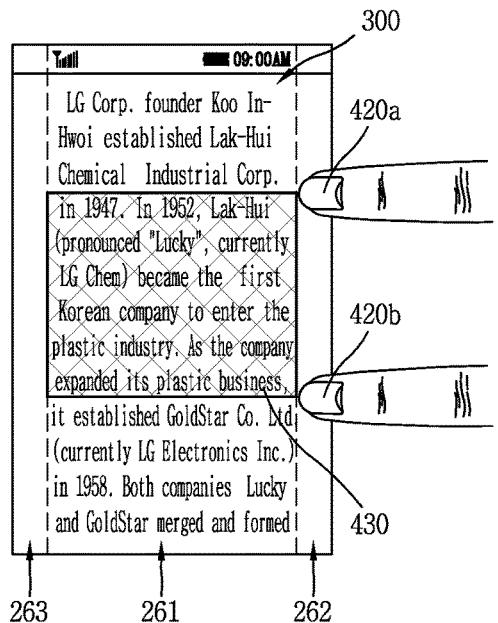
Figure 9C:
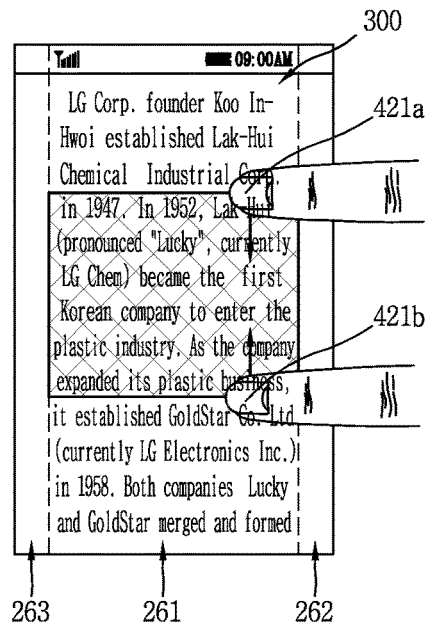
Figure 9C:
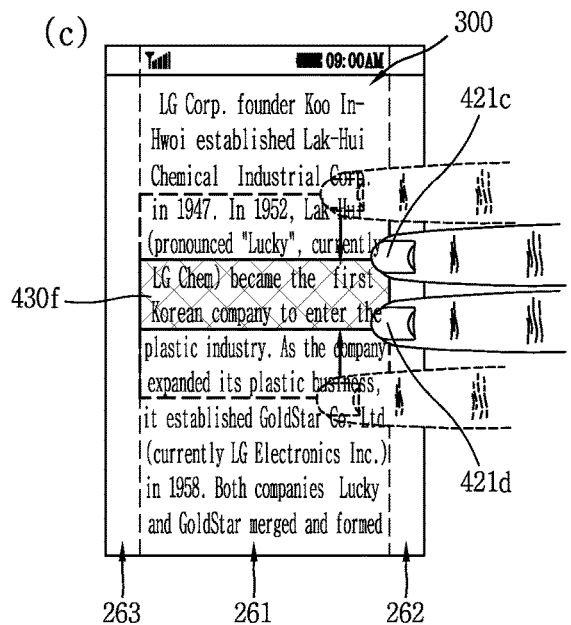

As shown in FIG. 9C(c), the touch applied to said one point may be a touch applied to a preset capturing region 430. The touch applied to the preset capturing region 430 may be variable. For instance, the touch applied to the preset capturing region 430 may be a drag touch, a pinch-in touch, a pinch-out touch, etc.

More specifically, as shown in FIGS. 9C(b) and (c), the controller 180 may change the size of a capturing region on the first region 261, based on a pinch-in touch applied to the capturing region. Changing the size of the capturing region corresponds to resetting the capturing region (refer to 430f of FIG. 9C). The size of the capturing region may be changed according to the degree of the pinch-touch (e.g., touch length).

Further, in a state where a graphic object has been output to the capturing region 430 as shown in FIGS. 6A and 6B, the graphic object may be moved in correspondence to a touch for changing the capturing region. The graphic object may be output to other capturing region reset by touch.

Although not shown, the touch applied to the first region 261 so as to change the capturing region may not be limited to a touch applied to a preset capturing region.

So far, an embodiment to control a vertical length of a capturing region has been explained as a method of controlling the size of the capturing region. In the present invention, the size of a capturing region can be controlled by controlling not only a vertical length but also a horizontal length of the capturing region. The method of controlling a horizontal length of a capturing region may be performed in the same manner or in a similar manner as/to that aforementioned with reference to FIGS. 9A~9C.

A touch for changing a horizontal length of a capturing region may be applied to a region rather than the second region 262, because a control command for controlling a vertical length of the capturing region is applied to the second region 262.

Figure 9D:
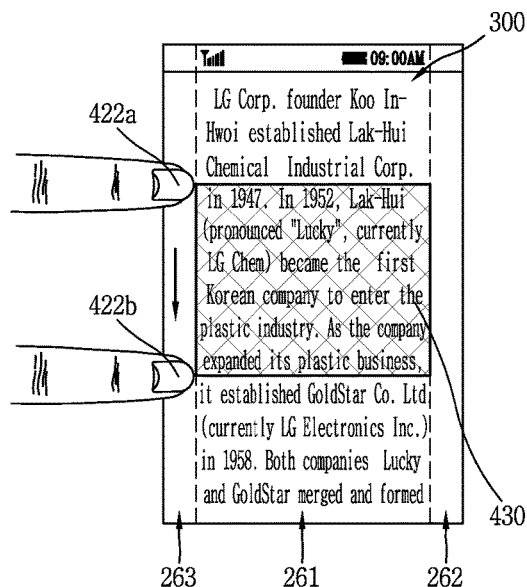
Figure 9D:
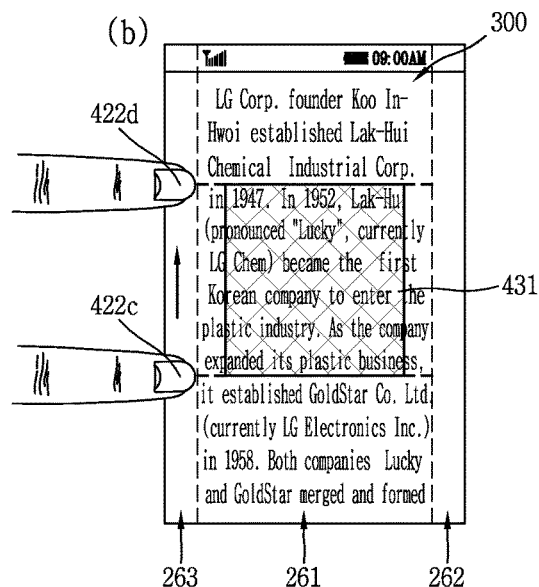
Figure 9D:
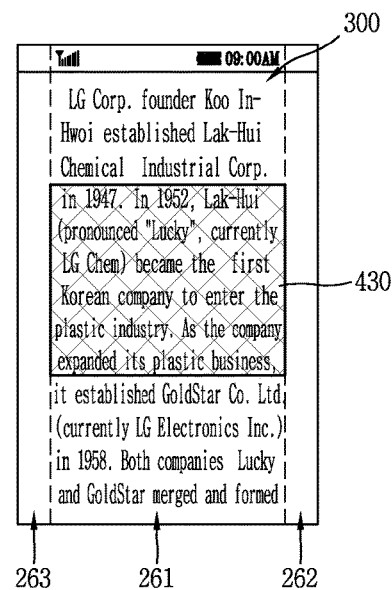

For instance, as shown in FIG. 9D(a), changing a horizontal length of a capturing region may be performed on a third region 263 rather than the first region 261 and the second region 262.

As shown in FIGS. 9D(a) and (b), the controller 180 may decrease a horizontal length of the capturing region 430, in response to a drag touch applied to the third region 263 in a first direction. As a result, the size of the capturing region 430 is contracted.

As shown in FIGS. 9D(b) and (c), the controller 180 may increase a horizontal length of the capturing region 430, in response to a drag touch applied to the third region 263 in a second direction. As a result, the size of the capturing region 430 is enlarged.

Figure 9E:
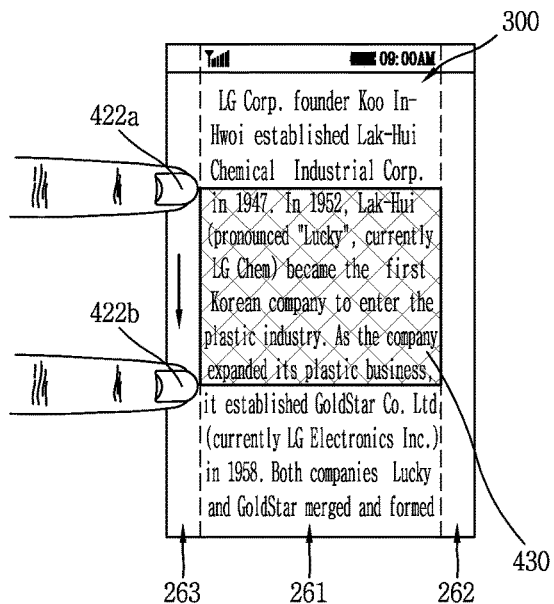
Figure 9E:
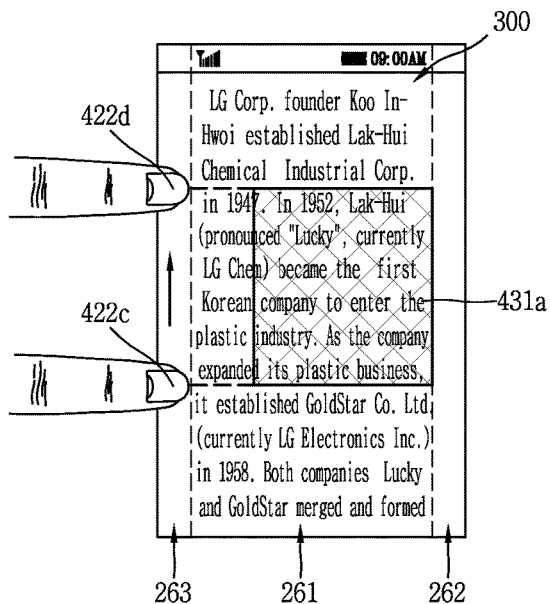
Figure 9E:
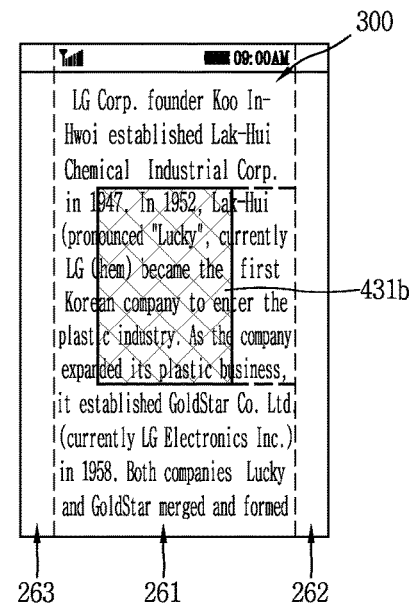

As another example, as shown in FIGS. 9E(a) and (b), the size of the capturing region 430 is contracted in response to a drag touch applied to the third region 263 in a first direction. In this case, a first side is excluded from the capturing region 430. More specifically, a boundary of the first side moves toward a second side opposite to the first side. As shown in FIGS. 9E(b) and (c), the size of capturing regions 430 and 431a are contracted in response to a drag touch applied to the third region 263 in a second direction different from the first direction. In this case, a second side is excluded from the capturing regions 430 and 431a. More specifically, a boundary of the second side moves toward the first side opposite to the second side. The first side and the second side may mean the left side and the right side of the mobile terminal, respectively.

Figure 9F:
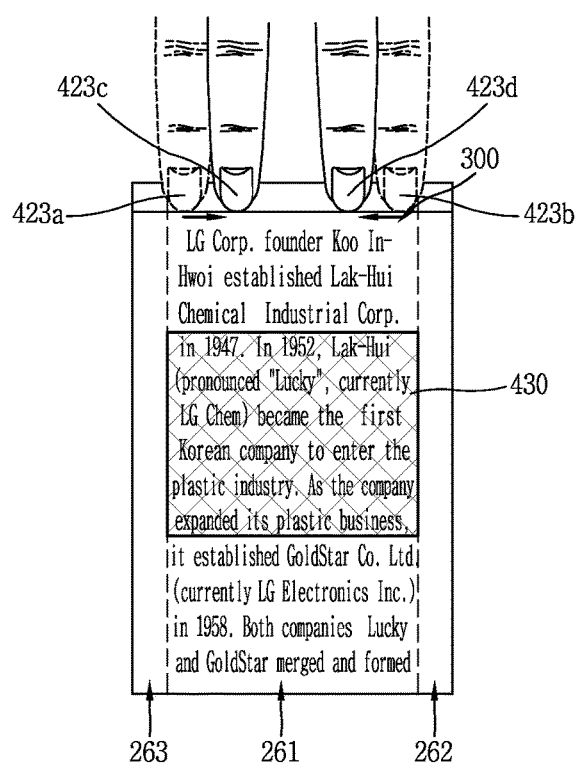
Figure 9F:
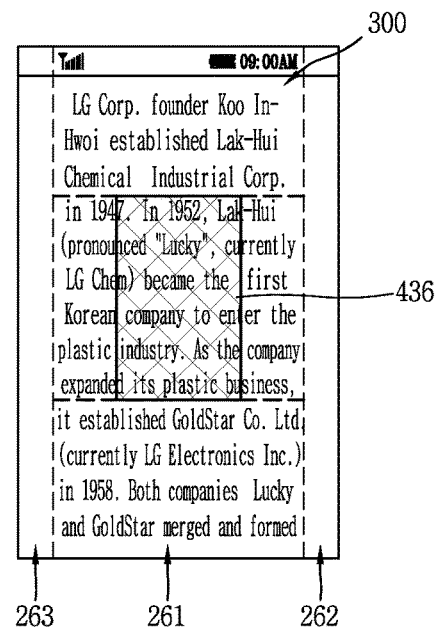

As another example, as shown in FIGS. 9F(a) and (b), the controller 180 may contract the size of capturing region (refer to 430 and 436), in response to a preset touch applied to one edge of the first region 261.

The preset touch may be at least one of a drag touch, a pinch-in touch and a pinch-out touch.

As shown in FIGS. 6A and 6B, in a state where a graphic object has been output to the capturing region 430, the graphic object may be moved in correspondence to a touch for changing the capturing region. The graphic object may be output to other capturing region reset by touch.

As aforementioned, in the mobile terminal according to the present invention, a preset capturing region may be reset based on a touch applied to the display unit. Thus, a user's needs for edition of a capturing region can be satisfied.

Figure 10A:
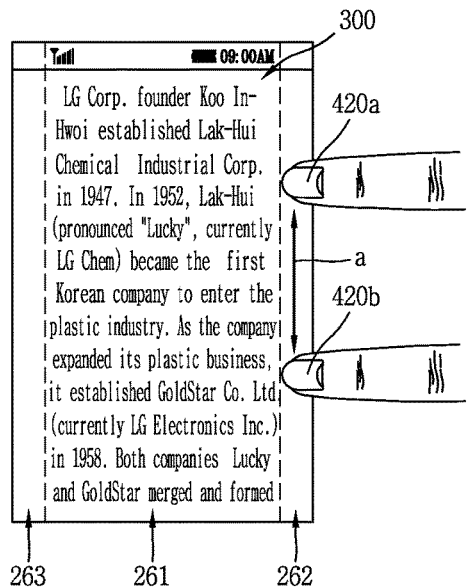
Figure 10A:
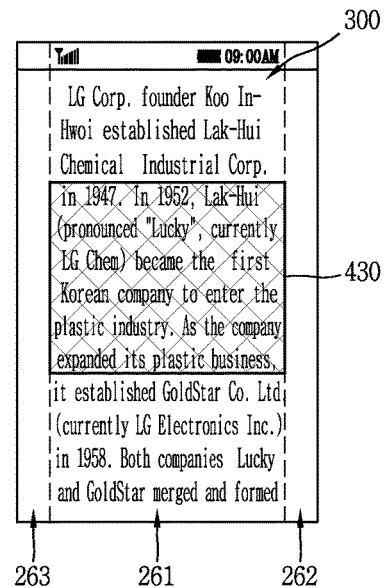
Figure 10A:
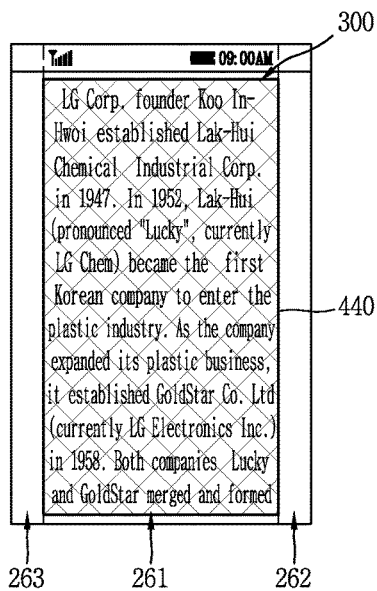
Figure 10A:
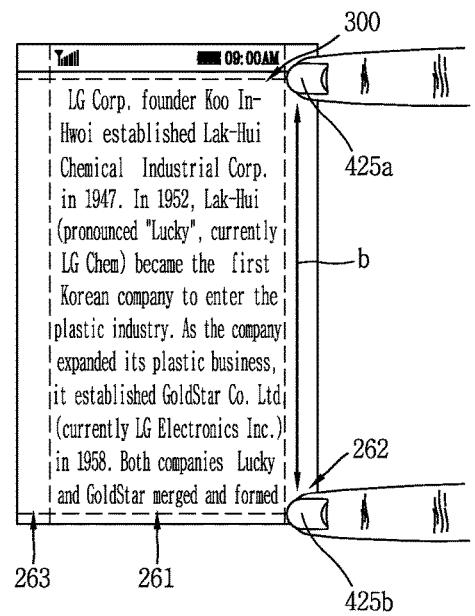

So far, as shown in FIGS. 10A(a) and (b), has been explained a method of setting part of the first region 261 as a capturing region, based on touches applied to the two points 420a and 420b on the second region, and then of capturing information included in the capturing region.

A user may wish to capture an entire part of the first region 261. In order to satisfy the user's such needs, the present invention proposes a method of setting an entire part of the first region 261 as a capturing region, based on a touch applied to the second region 262.

For instance, as shown in FIG. 10A, the controller 180 may determine whether to set an entire part of the first region 261 as a capturing region, or whether to set a part of the first region 261 as a capturing region, based on a distance between the first point 420a and the second point 420b on the second region 262.

For instance, as shown in FIGS. 10A(a) and (b), a distance 'a' between the first point 420a and the second point 420b is less than a preset distance, the controller 180 sets a part of the first region 261 as the capturing region 430.

A method of setting a part of the first region 261 as a capturing region has been aforementioned with reference to FIGS. 5A and 5B, and thus detailed explanations thereof will be omitted. As shown in FIGS. 10A (c) and (d), if a distance 'b' between the first point 420a and the second point 420b is more than a preset distance, the controller 180 may set an entire part of the first region 261 as a capturing region 440, and may entirely capture screen information output to the first region 261. That is, if the distance 'b' between the first point 420a and the second point 420b is more than a preset distance, the controller 180 may entirely capture screen information output to the first region 261, without setting the capturing region 440.

As another example, the controller 180 may determine whether to set an entire part of the first region 261 as a capturing region, or whether to set a part of the first region 261 as a capturing region, based on a touch applied to the second region 262.

Figure 10B:
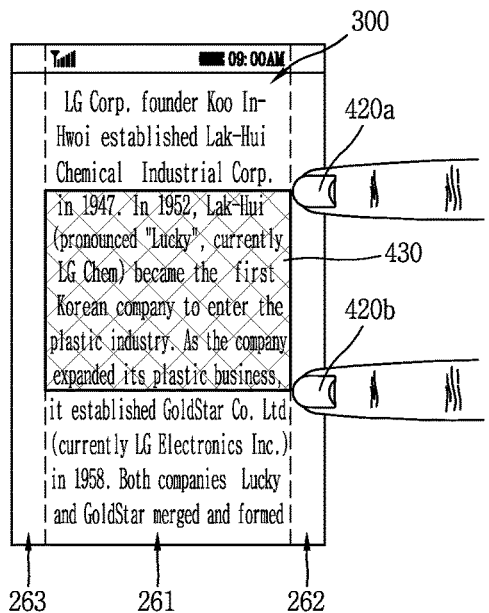
Figure 10B:
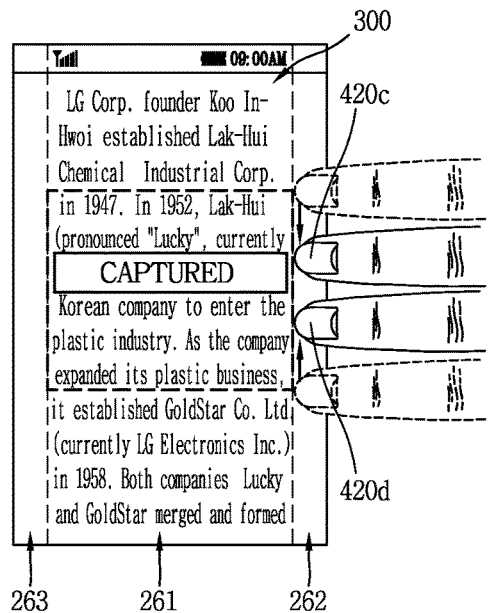
Figure 10B:
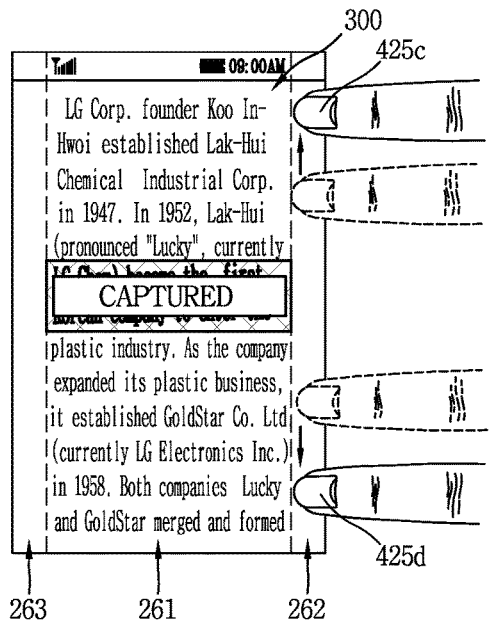
Figure 10B:
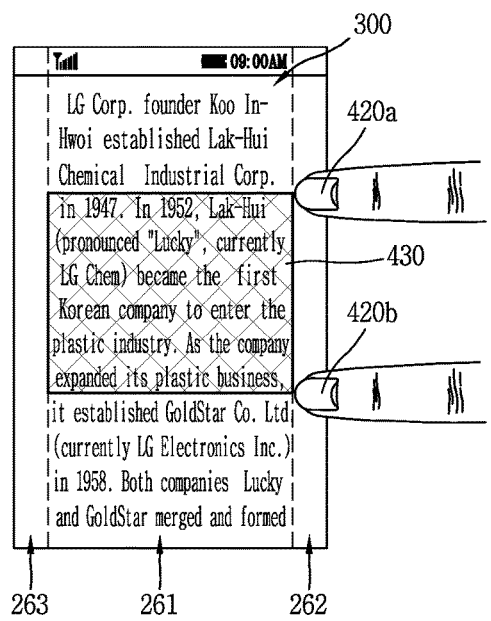

More specifically, as shown in FIGS. 5A, 10B(a) and 10B(b), if a pinch-in touch is applied to the second region 262, the controller 180 captures screen information included in part of the first region 261. A method of performing capturing in response to a pinch-in touch has been aforementioned with reference to FIGS. 5A and 5B, and thus detailed explanations thereof will be omitted.

As shown in FIGS. 10B(c) and (d), if a pinch-out touch is applied to the second region 262 in an opposite direction to a pinch-in touch, the controller 180 captures screen information included in an entire part of the first region 261.

As aforementioned, even if a capturing region has been set by touches for entering a capturing mode and setting a capturing region (i.e., touches applied to the first point 420a and the second point 420b of FIGS. 5A(a) and (b)), if a pinch-out touch is applied to the second region 262, the controller 180 may capture screen information included in an entire part of the first region 261.

Figure 10C:
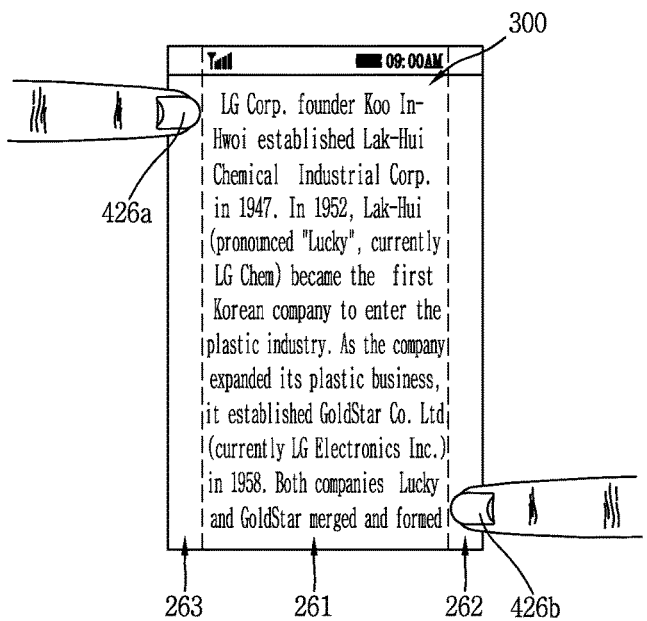
Figure 10C:

As another example, as shown in FIG. 10C(a), the controller 180 may capture an entire part of the first region 261 in response to touches onto the second region 262 and the third region 263. More specifically, the controller 180 may capture an entire part of the first region 261, in a case where a first touch has been sensed on one end of the second region 262, and a second touch has been sensed on another end of the third region 263.

As aforementioned, in the present invention, a specific function or an entire operation of the mobile terminal can be controlled in response to a touch applied to a side display unit. Under such configuration, a user can apply a control command to the mobile terminal without blocking a front display unit. Thus, the user can utilize information output to the display unit more efficiently.

Hereinafter, a method of providing various functions in association with information output to the display unit based on a touch applied to a side display unit, will be explained in more detail with reference to the attached drawings. FIGS. 11(a), 11(b), 11(c), 11(d), 12A(a), 12A(b), 12B(a), 12B(b), 12C(a), 12C(b), 13(a), 13(b), 13(c) and 13(d) are conceptual views for explaining a method of providing various functions rather than a capturing function, using a touch applied to a side display unit.

In the aforementioned embodiment, capturing information output to the first region 261 is performed in response to a touch applied to the second region 262. In the present invention, information output to the first region 261 may be captured, or information output to the first region 261 may be selected, in response to a different type of touch applied to the second region 262.

Figure 11A:
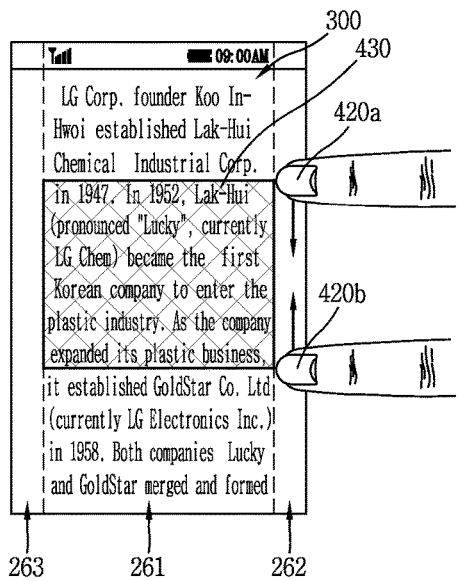
FIGS. 11(*a*), 11(*b*), 11(*c*), 11(*d*), 12A(a), 12A(b), 12B(a), 12B(b), 12C(a), 12C(b), 13(*a*), 13(*b*), 13(*c*) and 13(*d*) are conceptual views for explaining a method of providing various functions rather than a capturing function, using a touch applied to a side display unit.
Figure 11B:
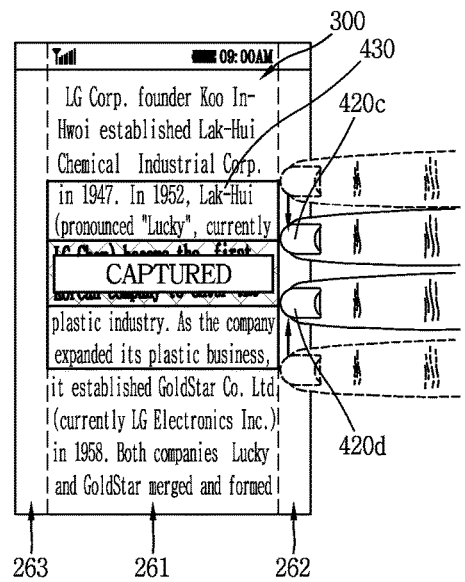
Figure 11D:
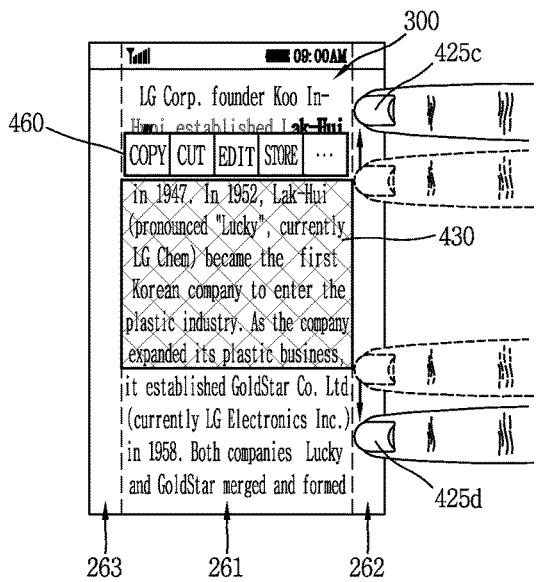

For instance, as shown in FIGS. 11(a) and (b), if a pinch-in touch is applied to the second region 262, the controller 180 may capture screen information included in the capturing region 430.

Figure 11C:
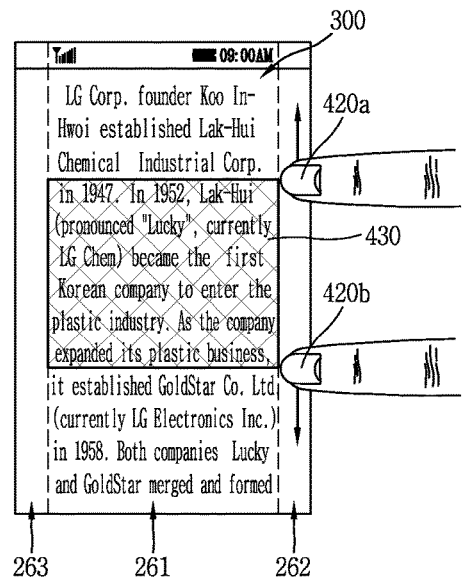

As shown in FIGS. 11(c) and (d), if a pinch-out touch is applied to the second region 262, the controller 180 may output information 460 on functions executable in association with content included in a selected region 430. The functions may relate to edition of content included in the selected region 430, or reuse of the content.

A method of setting, resetting and changing a capturing region is similar to or the same as a method of setting, resetting and changing a selected region, and has been aforementioned. Thus, detailed explanations thereof will be omitted.

In the present invention, once a capturing region 430 has been set by the method aforementioned with reference to FIGS. 5A and 5B, screen information output to the capturing region 430 can be captured. Besides the function to capture screen information output to the capturing region 430, the present invention can provide other functions executable using the screen information output to the capturing region 430.

Figure 12A:
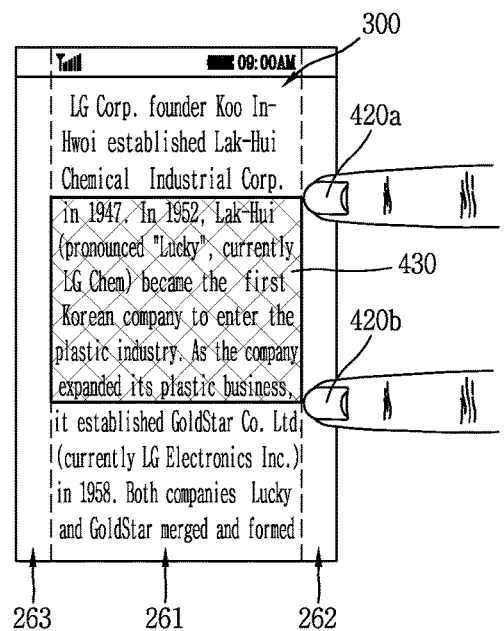
Figure 12A:
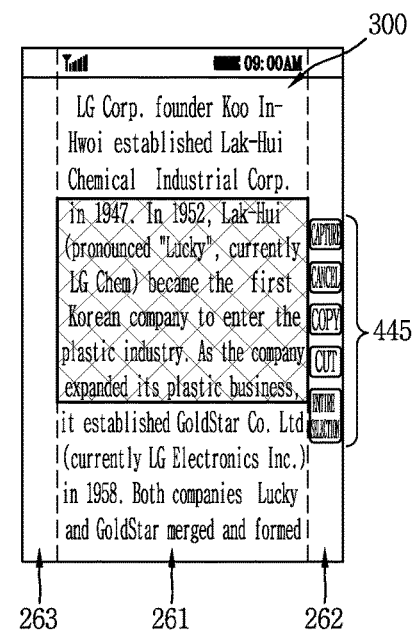

For instance, as shown in FIG. 12A(a), if the capturing region 430 is set in response to a touch applied to the second region 262, the controller 180 may output function icons 445 on the second region 262. The function icons 445 are related to functions executable using screen information output to the capturing region 430. The functions executable using screen information output to the capturing region 430 may be a capturing-related function such as a capturing function, a capturing cancel function, a copy function, a cut function, and an entire select function, or an edit or reuse function with respect to information included in the capturing region.

Figure 12B:
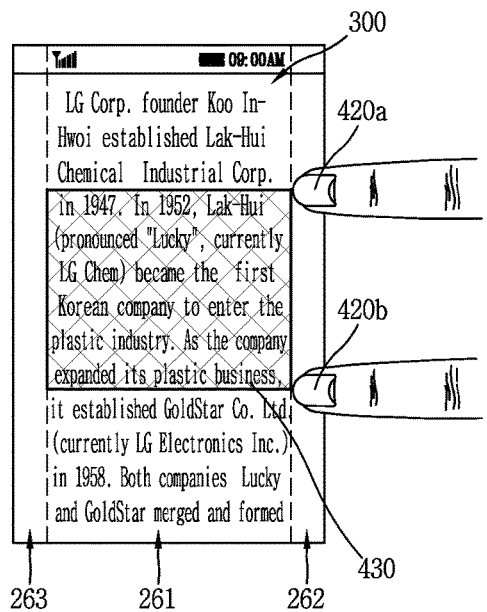
Figure 12B:
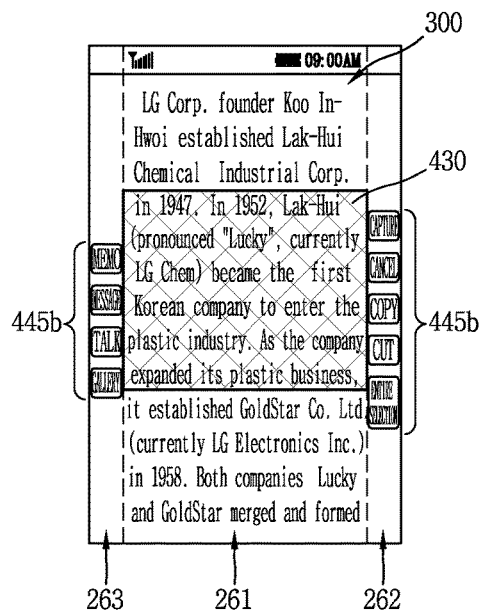
Figure 12C:
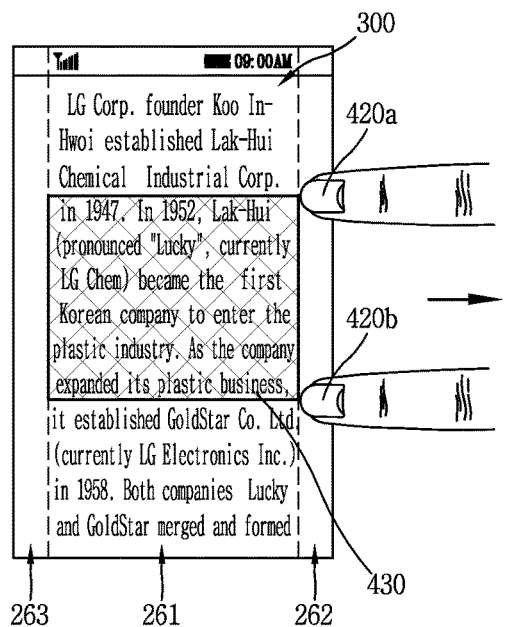
Figure 12C:
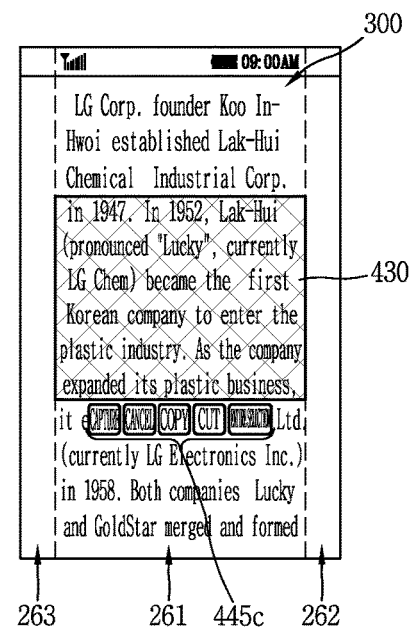
Figure 13A:
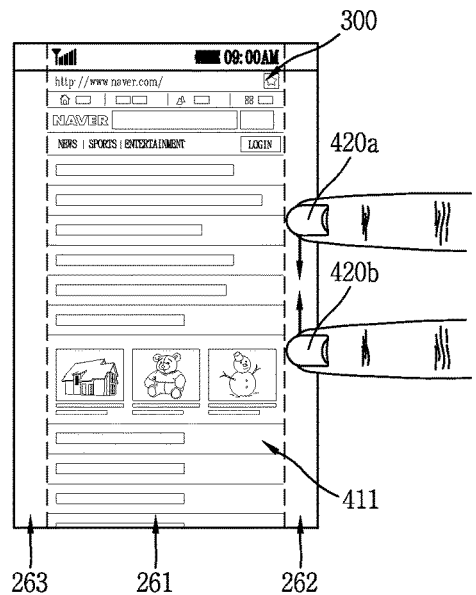
Figure 13B:
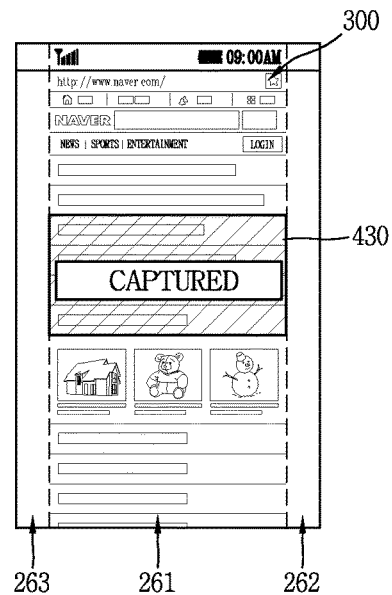
Figure 13D:
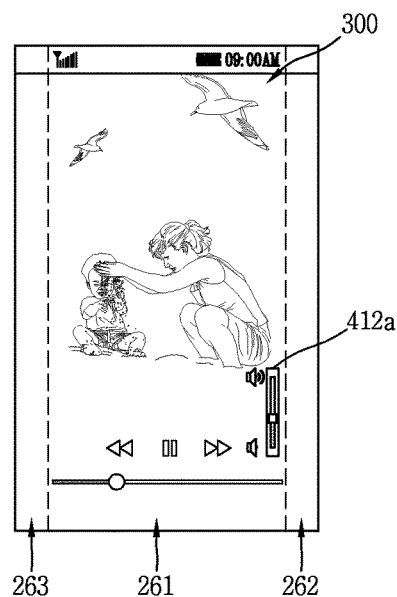
Figure 13C:
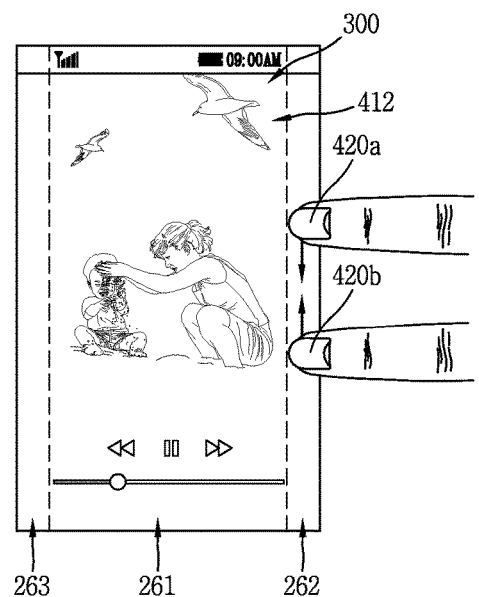

In the present invention, as shown in FIGS. 12B(a) and (b), not only function icons related to capturing, editing and reusing information included in a capturing region, but also function icons associated with applications may be output. The applications may be applications having functions to utilize screen information included in the capturing region.

As shown in FIGS. 12A and 12B, such function icons may be output to at least one of the first region 261, the second region 262 and the third region 263. The function icons may be output to different regions according to a function type, an attribute, or a sorting category.

In the aforementioned embodiment, screen information output to the first region is captured in response to a touch applied to the second region, regardless of a type of the screen information output to the first region. That is, if a capturing-related touch applied to the second region is sensed, the controller 180 may capture at least part of screen information output to the first region, regardless of a type of the screen information output to the first region.

In the present invention, even if a capturing-related touch applied to the second region is sensed, the controller 180 may not perform a capturing function according to screen information output to the first region. In this case, the controller 180 may perform other functions rather than a capturing function. More specifically, if a capturing-related touch applied to the second region is sensed, the controller 180 may determine whether to recognize the touch as a control command for performing a capturing function, or a control command for performing other function, based on a type of an application corresponding to screen information output to the first region.

For instance, in a case where a specific application has been set to perform other function rather than a capturing function, if screen information output to the first region 261 is an execution screen of the specific application, the controller 180 may execute said other function, in response to a capturing-related touch applied to the second region 262.

As shown in FIG. 13(*a*), in a state where screen information of an application set not to perform other function rather than a capturing function has been output (e.g., screen information of an application related to an internet function has been output), if a capturing-related touch applied to the second region 262 is sensed, the controller 180 may capture at least part of the screen information output to the first region 261.

As shown in FIG. 13(*c*), in a state where screen information of an application related to other function rather than a capturing function has been output (e.g., screen information of an application related to play of a moving image has been output), if a capturing-related touch applied to the second region 262 is sensed, the controller 180 may perform a function rather than a capturing function as shown in FIG. 13(*d*). For instance, if the screen information is an execution screen of an application related to play of a moving image, the controller 180 may control a volume in response to the capturing-related touch. Further, if the screen information is an execution screen of an application related to play of a moving image, the controller 180 may perform a function related to the output screen information, such as image enlargement and image contraction, in response to the capturing-related touch.

It is obvious to those skilled in the art that the aforementioned various embodiments are applicable to embodiments related to a second type of touch or a third type of touch to be explained later.

Hereinafter, a second type of touch among various types of touches which can be utilized for a capturing function will be explained with reference to the attached drawings.

Figure 14A:
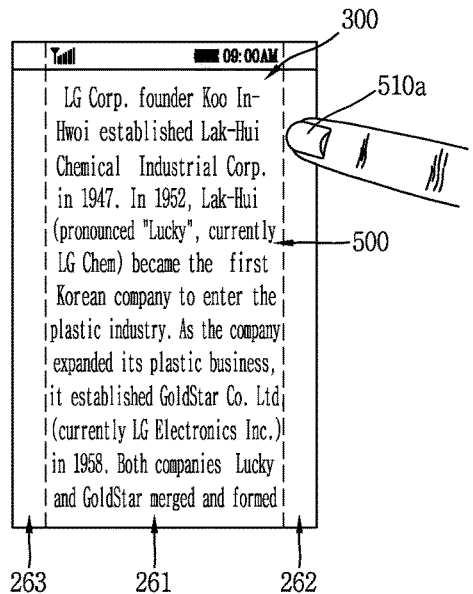
FIGS. 14A(a), 14A(b), 14A(c), 14A(d), 14B(a), 14B(b), 14C(a), 14C(b), 14C(c), 14D, 15A(a), 15A(b), 15A(c), 15A (d), 15B(a), 15B(b), 15B(c), 16A(a), 16A(b), 16B(a), 16B (b), 16B(c), 16C(a) and 16C(b) are conceptual views for explaining another embodiment of a method of providing a capturing function, using a touch applied to a side display unit.
Figure 14A:
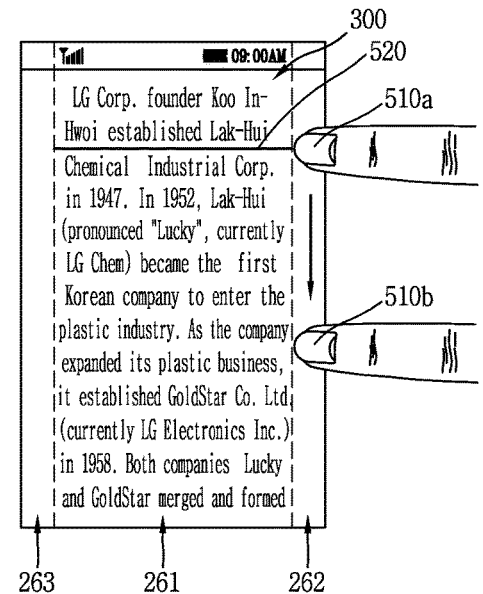
Figure 14A:
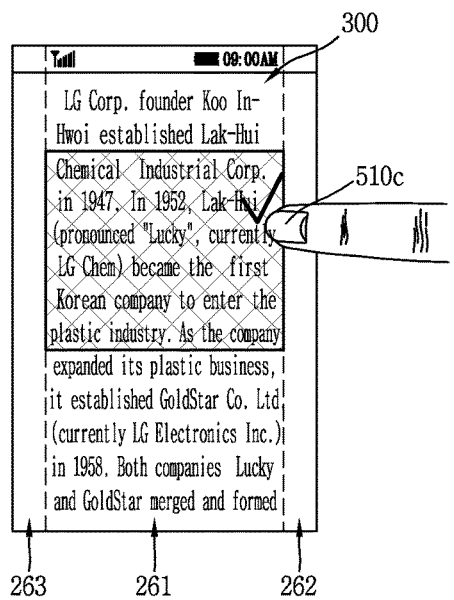
Figure 14A:
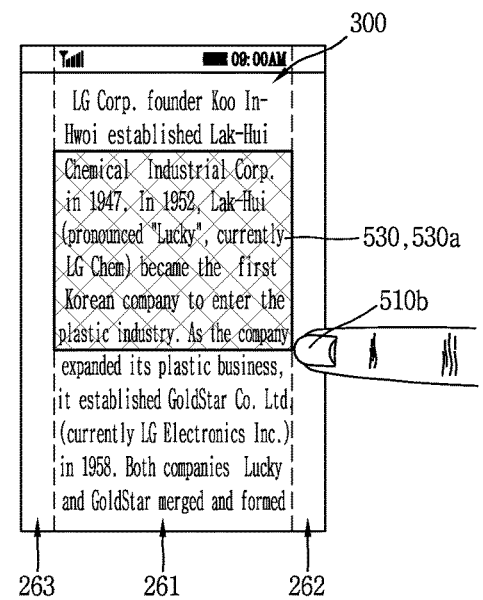

FIGS. 14A(*a*), 14A(*b*), 14A(*c*), 14A(*d*), 14B(*a*), 14B(*b*), 14C(*a*), 14C(*b*), 14C(*c*), 14D, 15A(*a*), 15A(*b*), 15A(*c*), 15A(*d*), 15B(*a*), 15B(*b*), 15B(*c*), 16A(*a*), 16A(*b*), 16B(*a*), 16B(*b*), 16B(*c*), 16C(*a*) and 16C(*b*) are conceptual views for explaining another embodiment of a method of providing a capturing function, using a touch applied to a side display unit.

Based on the aforementioned first type of touch, the mobile terminal according to the present invention performs a capturing function, in response to touches sensed on two points on a second region (or side display unit).

Hereinafter, will be explained a method of performing a capturing function using a side display unit, based on other type of touch rather than the first type of touch. The mobile terminal according to the present invention may perform a capturing mode in response to a touch applied to one point on a side display unit. A second type of touch for performing a capturing mode in response to a touch applied to one point on a side display unit will be explained in more detail.

Referring to FIG. 14A(*a*), 14A(*b*), 14A(*c*), 14A(*d*), the controller 180 may perform a capturing mode in response to sensing of a touch applied to one point 510*a* on the second region 262. If a touch applied to one point 510*a* on the second region 262 is sensed, the controller 180 determines the touch as a request for capturing at least part of screen information 500 output to the first region 261. In a state where the screen information 500 has been output to the first region 261, if a touch applied to said one point 510*a* is sensed, the controller 180 performs a capturing function for capturing at least part of the screen information 500. However, in the present invention, a region where the capturing-related touch is applied may not be limited to the second region. For instance, in all embodiments related to a capturing function, a touch applied to the second region 262 may be replaced by a touch applied to the third region 263.

If a touch applied to one point 510 on the second region 262 has been sensed for more than a preset time, the controller 180 may determine a request for capturing at least part of screen information 500 output to the first region 261. The touch applied for more than a preset time may be a long touch. Under such configuration, the controller 180 may precisely determine whether a user's touch applied to the second region 262 has been applied to request for a capturing function.

In the present invention, if a touch applied to said one point 510*a* is sensed, the controller 180 may not only recognize the touch as a request for performing a capturing function, but also set a capturing region based on the touch applied to said one point 510*a*.

More specifically, if a touch applied to one point 510*a* on the second region 262 is sensed, the controller 180 sets at least part of screen information 300 output to the first region 261 as a capturing region 530, based on the touch.

As shown in FIGS. 14A(b) and (c), the controller 180 may set a capturing region 530, based on a drag touch consecutive to the touch applied to said one point 510*a*. A position, a size, an area, etc. of the capturing region 530 are determined based on at least one of a position of a first point 510*a* and a second point 510*b*, and a length between the first point 510*a* and the second point 510*b*. The first point 510*a* corresponds to said one point 510*a*, and the second point 510*b* indicates a point where the drag touch has been ended.

For instance, a size and a position of the capturing region is determined (set) based on a position of the first point 510*a* and the second point 510*b* on the second region 262.

More specifically, a vertical length of the capturing region 530 corresponds to an interval (or length) between points on the second region 262 to which touches have been sensed (e.g., the first point 510*a* and the second point 510*b*). A position of the capturing region 530 on the first region 261 (e.g., a boundary) corresponds to points on the second region 262 to which touches have been sensed (e.g. the first point 420*a* and the second point 420*b*).

A boundary of the capturing region 530 may be defined by lines extending from the first point 510*a* and the second point 510*b*. The lines may be formed to penetrate the first region 261, and may be formed in parallel. The lines may be extending up to opposite sides to touched points on the display unit. In this case, the extending lines may be a substantial boundary line output to the display unit, or may be a virtual boundary line not output to the display unit. The display unit may be divided into three regions by the lines, and the capturing region 530 may be defined as a middle region among the divided three regions (refer to the oblique region 530 of FIG. 14A). As shown, the capturing region 530 may have a quadrangular shape. A horizontal length of the capturing region 530 may be preset without being influenced by touches applied to the second region 262. For instance, the horizontal length of the capturing region 530 may correspond to a horizontal length of the first region 261.

As aforementioned, in the present invention, a capturing region may be defined according to an interval between points on the second region 262 where touches have been sensed, or a position of the touches. Once a user applies a drag touch starting from the first point 510a to the second point 510b, the controller 180 may execute a capturing mode and may set a capturing region.

FIG. 5A illustrates an embodiment where a drag touch is consecutively applied from a touch applied to the first point 510a (e.g., first touch). However, the present invention is not limited to this. For instance, in a state where a capturing mode has been executed in response to a touch applied to one point on the second region 262, even if the touch applied to said one point is released, the capturing mode may be maintained.

In a state where the capturing region 530 has been set, the controller 180 may capture screen information included in the capturing region 530, in response to an additional touch applied to the display unit. The additional touch is a touch related to a control command for storing the screen information included in the capturing region 530 in the memory as an image file format or other file format, which may have a preset type.

More specifically, the additional touch may be a preset type of touch applied to at least one of the first region 261 and the second region 262.

Alternatively, the additional touch may be a touch inconsecutive to touches sensed on the first point 510a and the second point 510b, and may be a preset type of touch.

For instance, as shown in FIG. 14A(d), a preset type of touch corresponding to the additional touch may be a touch applied to the capturing region 530 on the first region 261. The touch applied to the capturing region 530 on the first region 261 may be a short-touch, a long-touch, a double touch, etc.

If the preset type of touch corresponding to the additional touch is applied to the first region 261, the controller 180 may store screen information included in the capturing region 530 in the memory as an image file format or other file format.

Figure 14B:
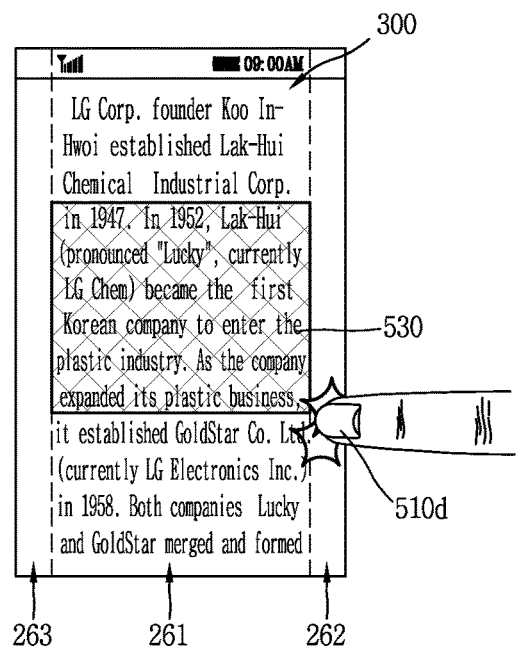
Figure 14B:
Figure 14C:
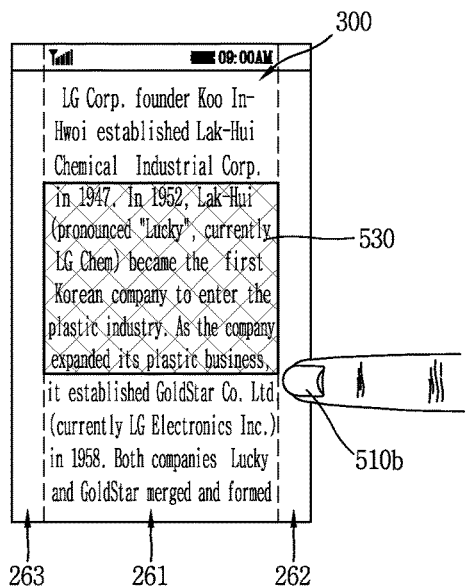
Figure 14C:
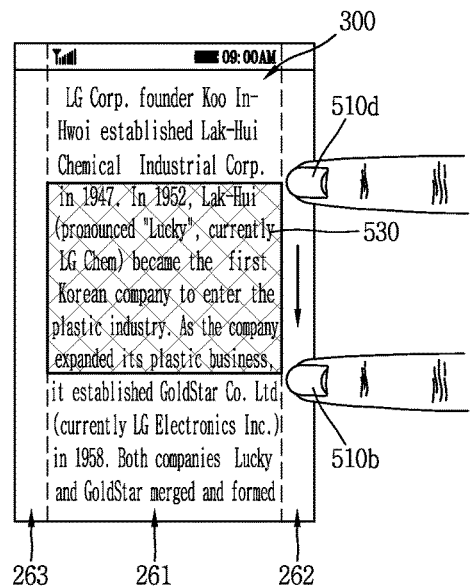
Figure 14C:
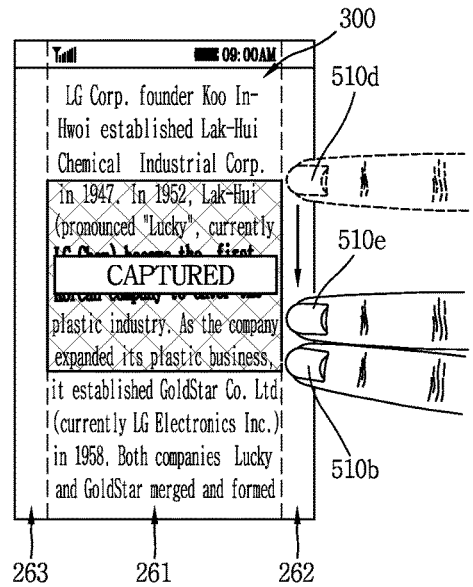

As another example, as shown in FIGS. 14B(a) and (b), the preset type of touch corresponding to the additional touch may be a touch applied to the capturing region 530 on the second region 262. The touch applied to the second region 262 may be a short-touch, a long-touch, a double touch, etc.

If the preset type of touch corresponding to the additional touch is a long touch applied to the second region 262, the touch applied to the second region 262 may be a touch consecutive to a drag touch applied when setting the capturing region 530, as shown in FIGS. 14A(a), (b) and (c). That is, if a drag touch is maintained at an ending point for a preset time, the controller 180 may determine the touch as a capturing command for storing screen information included in the capturing region 530 in the memory. More specifically, in a state where a drag touch has been applied to the second region 262, if the drag touch is maintained at an ending point for a preset time, the controller 180 may capture screen information included in the capturing region 530.

Even if a drag touch applied to the second region 262 is released, the capturing mode may be maintained. That is, even if a drag touch, applied to the second region 262 so as to execute a capturing mode and set a capturing region, is released, the controller 180 may maintain the capturing mode.

As another example, the preset type of touch corresponding to the additional touch is a pinch-in touch applied to the second region 262.

For instance, as shown in FIGS. 14A(a), 14A(b), 14A(c) and 14C(c), the pinch-in touch may be a pinch-in touch consecutive to a touch (e.g. second touch) sensed on the second point 510b (or an ending point of a drag touch). In a state where the second touch has been maintained, if a touch is applied to another point (e.g., third point 510d), the controller 180 may sense a pinch-in touch consecutive to the second touch and the third touch. If such pinch-in touch is applied, the controller 180 may store screen information included in the capturing region 530 in the memory as an image file format or other file format.

In a case where an interval between points to which the pinch-in touch has been applied is less than a preset length, the controller 180 may capture screen information included in the capturing region 530. For instance, if a user's fingers contacting the second region 262 move to almost contact each other, the controller 180 may capture the screen information.

In the above configuration, the additional touch is a pinch-in touch consecutive to at least one of touches (e.g., a first touch and a second touch) sensed on the first point 510a and the second point 510b. However, the additional touch may be a pinch-in touch inconsecutive to the first touch and the second touch.

As aforementioned, in the present invention, in a case where a first touch and a second touch are sequentially applied, capturing screen information 500 may be completed. In this case, the first touch is a touch for entering a capturing mode and setting a capturing region. And the second touch is an additional touch for capturing screen information included in the capturing region.

In the present invention, at least two steps (e.g., a first step of applying a first touch, and a second step of applying a second touch) may be required in order to complete a capturing operation. The capturing mode is ended if capturing screen information is completed by applying the first touch and the second touch.

Figure 14D:
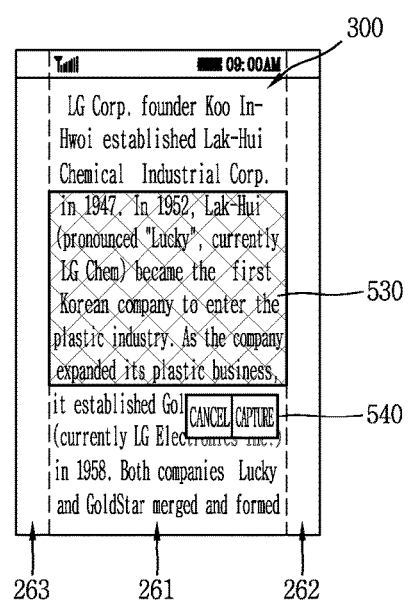

As another example, as shown in FIG. 14D, a capturing operation may be completed through a function icon 540 output to the display unit 251.

The function icon 540 is an icon related to a capturing command or a capturing cancel command. Such function icon 540 may be output to the display unit 251 in various cases. If a capturing mode is activated, the function icon 540 may be output to the display unit 251. If the capturing mode is deactivated, the function icon 540 may disappear from the display unit 251 (or may not be output to the display unit 251 any longer). The function icon 540 may be output to at least one of the first region 261 and the second region 262 of the display unit 251.

Like in the aforementioned embodiment with reference to FIGS. 6A and 6B, in this embodiment, a graphic effect may be implemented so that information on a set capturing region can be provided to a user. A user may have a difficulty in recognizing an operation of the mobile terminal, unless information is output in at least one of audible, visual and tactile manners. Even if a capturing region has been set by a touch applied to the second region 262, a user may not precisely recognize a position of the capturing region. In order to solve such problem, in the present invention, information on a set capturing region is output. This can allow a user to be provided with information on a precise position of the capturing region on the first region 261.

Information on a region set as a capturing region may be provided in various manners. For instance, information on a region set as a capturing region may be output in a visible manner. For instance, the controller 180 may output a graphic object (or guide image) to a capturing region. Then, a user may recognize the capturing region, through the graphic object output to the capturing region.

For instance, as shown in FIGS. 14A(a) and (b), if one point on the second region 262 (e.g., first point 510a) is touched, the controller 180 may output a guide image 520 (first graphic object) indicating a starting point of a capturing region. If the capturing region is set in response to a touch applied to the second region 262, etc., the controller 180 outputs a graphic object 530a (second graphic object) to the capturing region 530 as shown in FIG. 14A(c).

The graphic object 530a may have the same size as the capturing region 530. That is, the graphic object 530a may be formed to cover the capturing region 530.

Even if the graphic object 530a has covered the capturing region 530, information output to the capturing region 530 may be exposed to outside. The information output to the capturing region 530 may be overlapped with the graphic object, in a form to be recognizable by a user. The graphic object may have transparency. As the semi-transparent graphic object is overlapped with the capturing region 530, information output to the capturing region 530 may be recognizable by a user.

A design of the graphic object 530a may be modified in various manners.

In the present invention, information on a progressed degree of capturing may be output in at least one of audible, visible and tactile manners.

Such graphic objects 520 and 530a may disappear from the display unit (or may not be output to the display unit any longer) if the capturing mode is released. That is, upon completion of capturing screen information included in the capturing region, the controller 180 controls the display unit 251 so that the graphic objects 520 and 530a cannot be output any longer.

In the present invention, a capturing mode may be deactivated (or released) after screen information included in a capturing region has been completely captured. Further, the capturing mode may be deactivated (or released) even if screen information included in a capturing region has not been completely captured. More specifically, the capturing mode may be cancelled before capturing is completed. Cancelling the capturing mode may be performed by a user's intention.

For instance, a control command for cancelling a capturing mode may be applied through a touch applied to the second region 262, or a touch applied to the first region 261. The control command may be also applied through a voice, or a hardware key provided at the terminal body.

Hereinafter, an embodiment to cancel a capturing mode will be explained in more detail. Cancelling a capturing mode may be performed based on a touch applied to the second region 262, release of a touch, or etc.

Figure 15A:
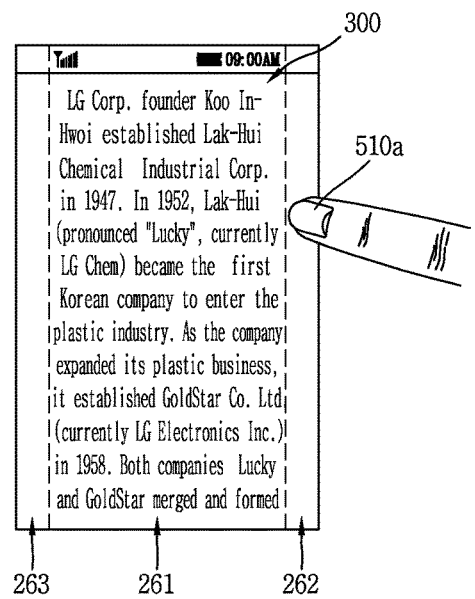
Figure 15A:
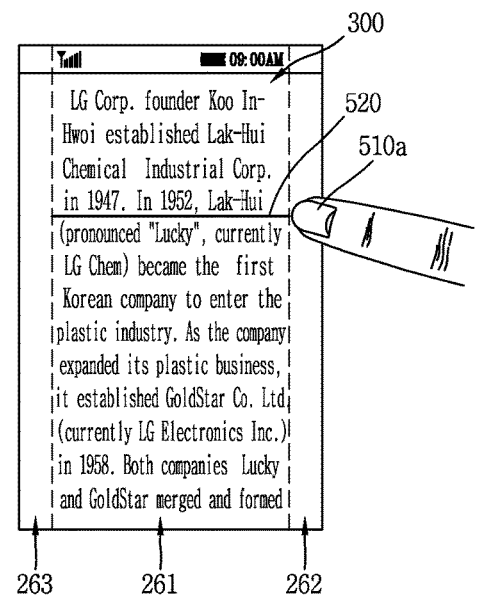
Figure 15A:
Figure 15A:
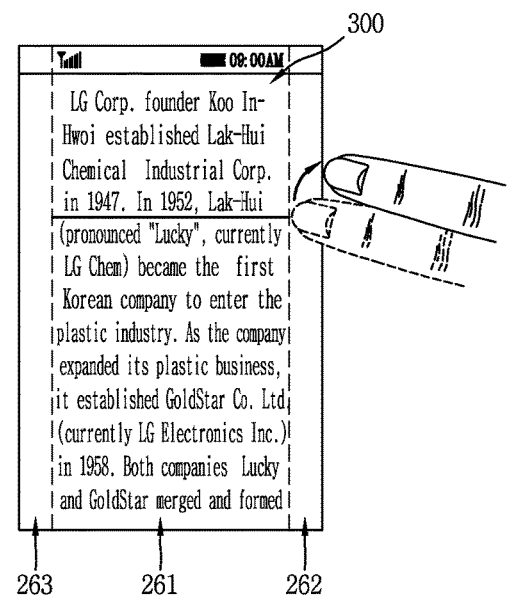

For instance, as shown in FIG. 14A, a capturing mode is activated when a touch applied to one point 510a on the second region 262 (refer to FIGS. 14A and 15A) is sensed. As shown in FIGS. 15A(a)-(d), the capturing mode may be cancelled when the touch applied to said one point 510a on the second region 262 (refer to FIGS. 14A and 15A) is released.

The capturing mode may be cancelled even after the capturing region 530 has been set. In a state where a graphic object has been output to the capturing region 530 as shown in FIG. 14A, the graphic object may disappear (may not be output any longer) if the touch applied to the second region 262 is released.

As another example, after a capturing region has been set in response to a touch applied to the second region 262, even if the touch is released, the capturing mode may be maintained. That is, the controller 180 may maintain the capturing mode even through the touch applied to the second region 262 is released. In a state where the capturing mode is maintained, an output state of a graphic object to the capturing region 530 may be maintained.

Figure 15B:
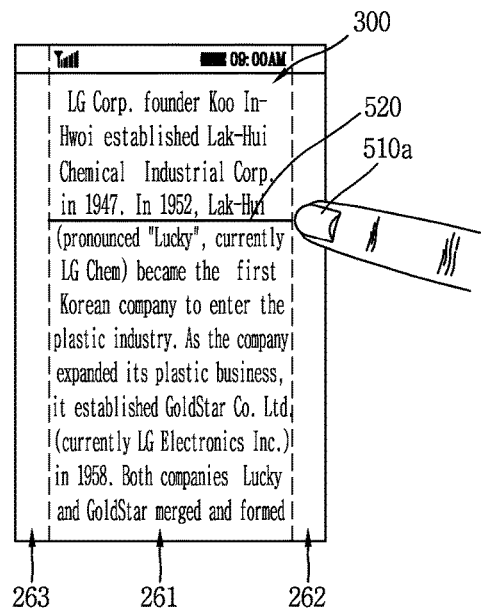
Figure 15B:
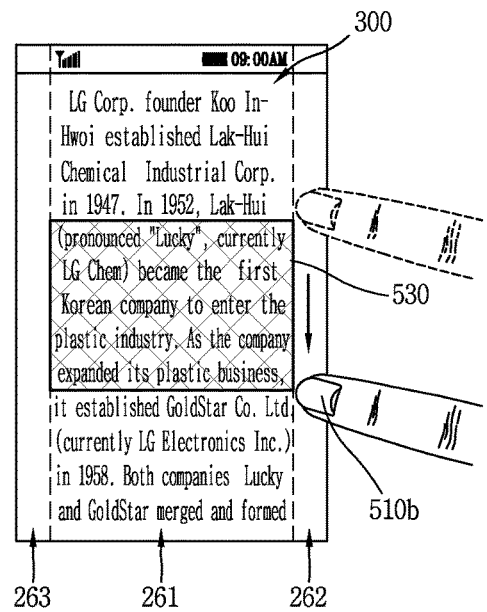
Figure 15B:
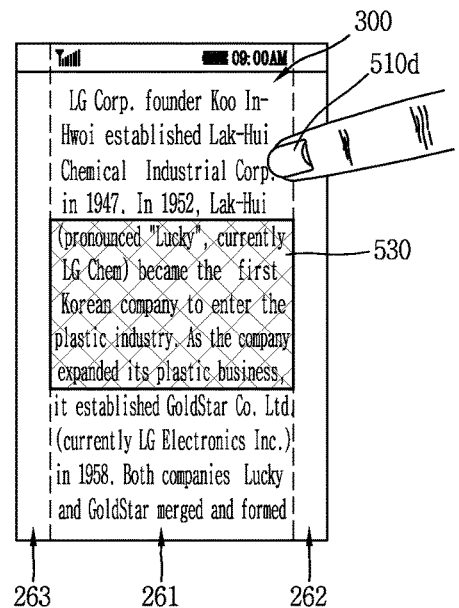

In this case, as shown in FIG. 15B(c), the capturing mode may be released by a preset touch applied to a region on the first region 261, the region not set as the capturing region 530. The preset touch may be various. For instance, the preset touch may be a short touch, a long touch, a double touch, etc.

As shown in FIG. 14A, in a state where a graphic object has been output to the capturing region 530, the graphic object may disappear (may not be output any longer) if the capturing mode is cancelled (or ended).

As another example, as shown in FIG. 14D, the capturing mode may be cancelled through a function icon 540 output to the display unit 251. The function icon 540 may be icons related to cancelling a capturing mode. Such function icon 540 may be output to the display unit 251 in various cases. If a capturing mode is activated, the function icon 540 may be output to the display unit 251. If the capturing mode is deactivated, the function icon 540 may disappear from the display unit 251 (or may not be output to the display unit 251 any longer). The function icon 540 may be output to at least one of the first region 261 and the second region 262 of the display unit 251.

An embodiment related to output of the function icon 540 has been aforementioned with reference to FIG. 7D, and thus detailed explanations thereof will be omitted.

A capturing region set by the aforementioned second type of touch may be moved or changed. More specifically, a method of changing (resetting) a region set as a capturing region, especially, a method of changing a size or a position of a capturing region may be performed in the same manner or in a similar manner as/to that by a first type of touch. Thus, a method of resetting, moving or changing a set capturing region by a second type of touch will not be explained. Detailed explanations thereof may be given with reference to FIGS. 8A~8C and 9A~9F.

Hereinafter, the present invention proposes a method of setting an entire part of the first region 261 as a capturing region according to embodiments by a second touch method, in response to a user's needs for capturing an entire part of the first region 261. The entire part of screen information 300 may be a region rather than a status display bar. The status display bar means a region where status information of the mobile terminal such as a current time, the remaining amount of a battery and a reception sensitivity, or environment information is displayed.

Figure 16A:
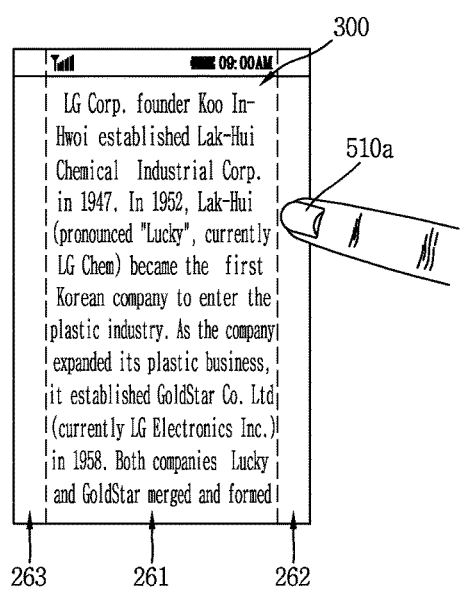
Figure 16A:
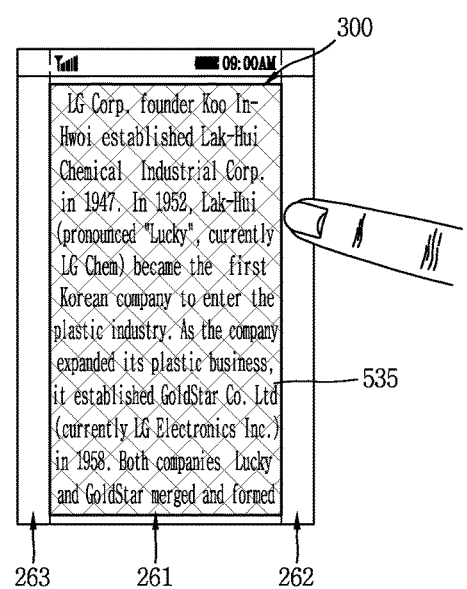

For instance, as shown in FIGS. 16A(a) and (b), if the second region 262 has been touched for a preset time, the controller 180 may set an entire part of the first region 261 as a capturing region.

More specifically, as shown in FIGS. 16A(a) and (b), in a case where a touch applied to the second region 262 is maintained for a preset time without being released, the controller 180 sets an entire part of the first region 261 as a capturing region.

Figure 16B:
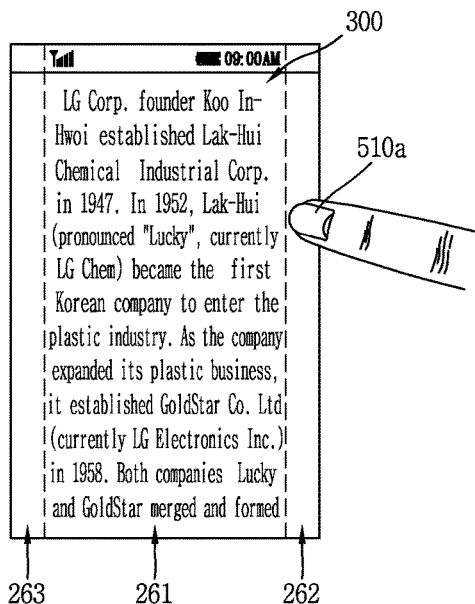
Figure 16B:
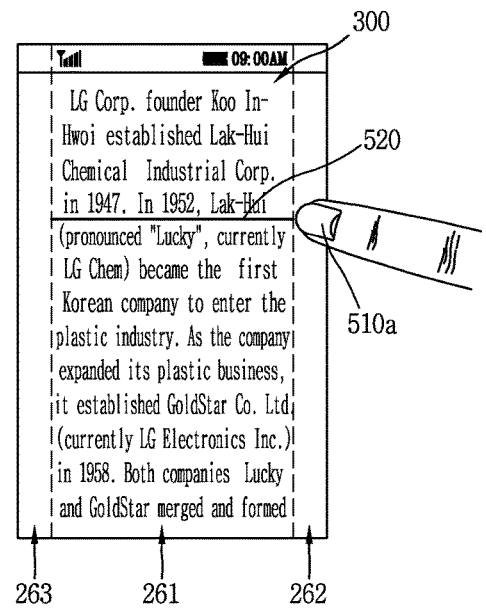
Figure 16B:
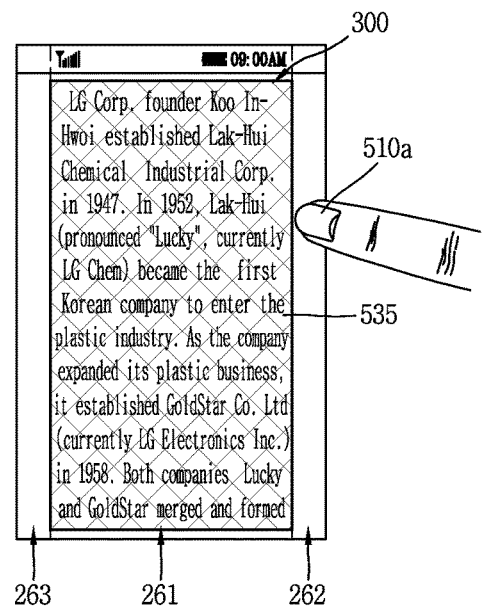

If a touch is applied to one point 510a on the second region 262 as shown in FIGS. 16A(a) and 16B(a), the controller 180 may execute a capturing mode, and may output a guide image 520 (first graphic object) indicating a starting point of a capturing region, as shown in FIG. 16B(b). If the touch applied to said one point 510a on the second region 262 is maintained for a preset time without being moved or released, the controller 180 may set an entire part of the first region 261 as a capturing region, as shown in FIG. 16B(c). In this case, a graphic object 535 which covers the first region 261 may be output. Characteristics of such graphic object have been aforementioned, and thus detailed explanations thereof will be omitted.

Figure 16C:
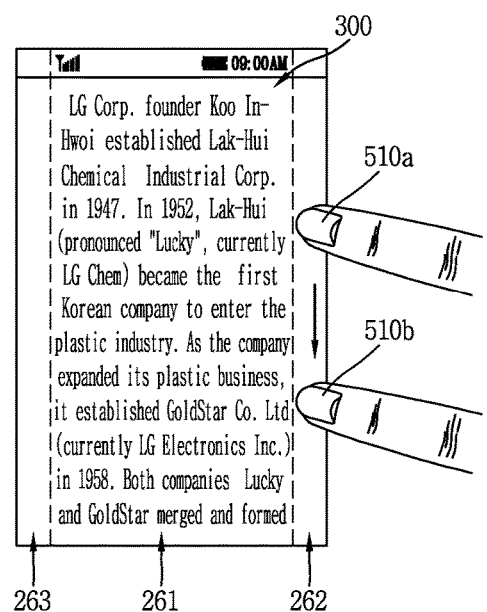
Figure 16C:
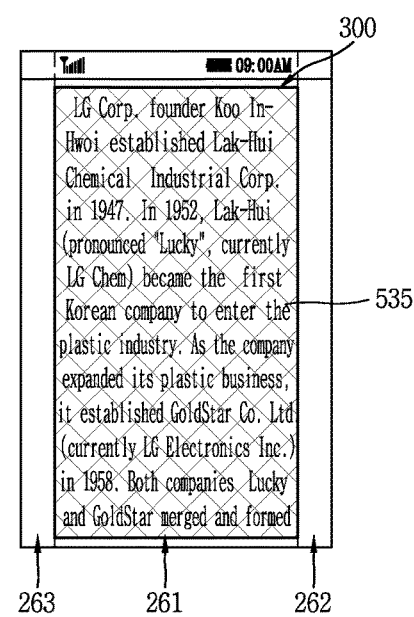

As another example, as shown in FIGS. 16C(a) and (b), in a case where a drag touch or a flicking touch is applied to the second region 262 with a speed more than a preset value, the controller 180 may capture an entire part of the first region 261.

The drag touch or the flicking touch may be a touch consecutive to a touch applied to said one point 510a on the second region 262 so as to perform a capturing mode. The function to capture an entire part of the first region 261 may be also performed in response to input of a drag touch or a flicking touch inconsecutive to said one point 510a on the second region 262.

It is obvious to those skilled in the art that the above embodiments are applicable to the embodiments aforementioned in relation to a first type of touch.

Figure 17A:
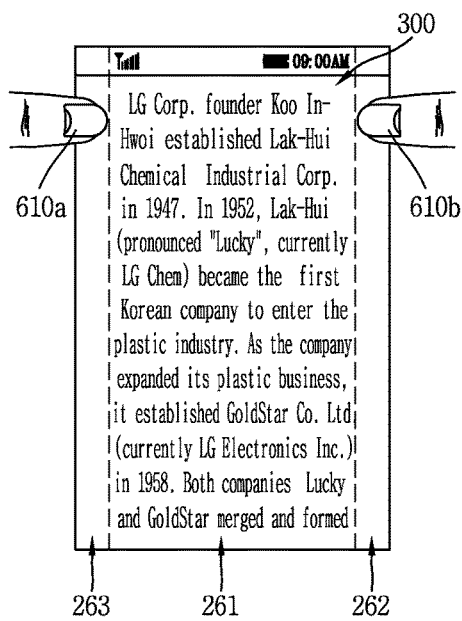
FIGS. 17(a) and 17(b) are conceptual views for explaining another embodiment of a method of providing a capturing function, using a touch applied to a side display unit.
Figure 17B:
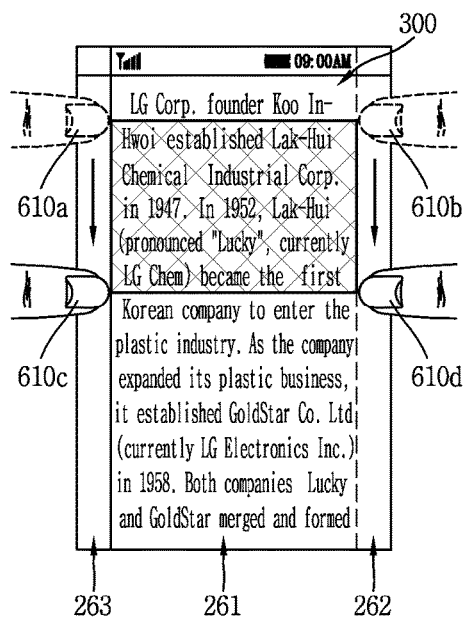

Hereinafter, a third type of touch, among various types of touches which can be utilizable to perform a capturing function, will be explained in more detail with reference to the attached drawings. FIGS. 17(a) and 17(b) are conceptual views for explaining another embodiment of a method of providing a capturing function, using a touch applied to a side display unit.

According to the aforementioned first type of touch and second type of touch, the mobile terminal enters a capturing mode in response to a touch applied to one of the second region 262 and the third region 263.

Hereinafter, a method of allowing a mobile terminal to enter a capturing mode using two side display units will be explained.

Referring to FIG. 14A(a), 14A(b), 14A(c), 14A(d), the mobile terminal according to the present invention may execute a capturing mode, in response to sensing of a touch applied to a point 610b on the second region 262, and a touch applied to a point 610a of the third region 263. If the touches applied to the first point 610b and the second point 610a are simultaneously sensed, the controller 180 determines the sensing as a request for capturing at least part of screen information 300 output to the first region 261. In a state where the screen information 300 has been output to the first region 261, if the touches applied to the first point 610b and the second point 610a are sensed, the controller 180 performs a capturing function to capture at least part of the screen information 300.

In the present invention, the controller 180 may recognize a request for a capturing function, in response to touches applied to the first point 610b and the second point 610a. Further, the controller 180 may set a capturing region, based on the first point 610b and the second point 610a to which touches have been applied.

More specifically, if touches applied to the first point 610b and the second point 610a are simultaneously sensed, the controller 180 sets at least part of screen information 300 output to the first region 261 as a capturing region (refer to oblique part of FIG. 17(b)). The controller 180 may determine a position, a size, an area, etc. of the capturing region, based on a position of at least one of the first point 610b and the second point 610a, and a progressed degree of touches starting from the first point 610b and the second point 610a.

For instance, as shown in FIG. 17(a), a size and a position of a capturing region may be set based on the first point 610b and the second point 610a. As an example, a size and a position of the capturing region may be determined based on a position of the first point 610b on the second region 262, and a position of the second point 610a on the third region 263.

Whether to determine a size, a position, etc. of a capturing region based on the first point 610b or the second point 610a may be preset. For instance, the controller 180 may determine a size and a position of a capturing region, based on a touch applied to the second region 262. On the contrary, the controller 180 may determine a size and a position of a capturing region, based on a touch applied to the third region 263.

As shown in FIG. 17(b), a vertical length of a capturing region may be determined based on a drag touch applied to the second region 262 and the third region 263. The drag touch may be a touch consecutive or inconsecutive to touches applied to the first point 610b and the second point 610a so as to perform a capturing mode.

A method of executing a capturing mode by a third type of touch may be equal to or similar to the aforementioned methods by a first type of touch and a second type of touch (i.e., a method of outputting a graphic object, a method of moving a capturing region, a method of changing a size of a capturing region, a method of resetting a capturing region, a method of capturing an entire part of a capturing region, and a method of cancelling a capturing mode). Thus, detailed explanations of the method of executing a capturing mode by a third type of touch will be omitted.

In the above embodiments, a capturing region is set in a state where screen information has been output to the display unit, and then information output to the capturing region is captured. The present invention also proposes a method of setting a capturing region, and then capturing screen information output to the display unit.

Figure 18A:
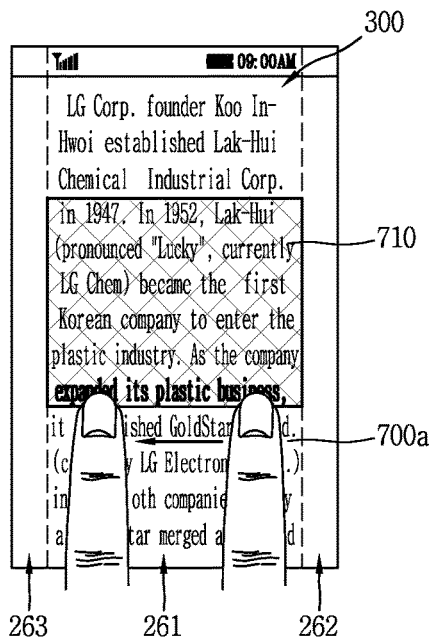
FIGS. 18(a) and 18(b) are conceptual views for explaining a function to capture a plurality of screen information.

The method of setting a capturing region may be performed in various manners. And the method may be executable in one of the aforementioned embodiments by first to third types of touches. As shown in FIG. 18(a), the controller 180 may maintain a capturing mode until when a capturing mode cancel command is applied to the mobile terminal. In this case, the capturing mode may be maintained even after screen information included in a capturing region 710 has been completely captured. In this case, the capturing region 710 is maintained on the first region 261 in a preset state.

Screen information output to the display unit 251 can be changed by a user's selection or under control of the controller 180. That is, a capturing function may be simultaneously performed with other function which are executable in the mobile terminal. The capturing function may be multi-tasked with other functions which are executable in the mobile terminal.

Figure 18B:
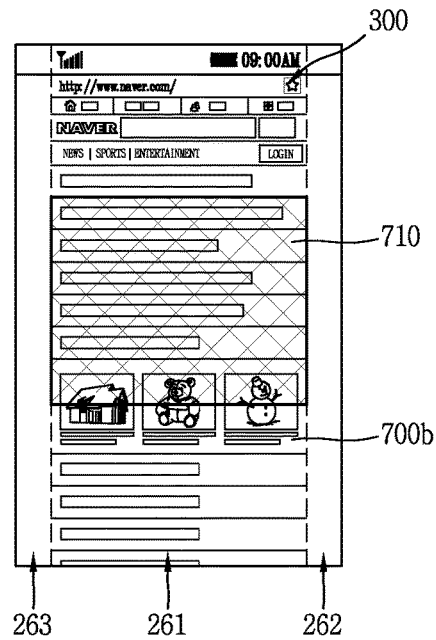

In a state where the set capturing region 710 has been maintained, as shown in FIGS. 18(*a*) and (*b*), screen information output to the display unit 251 may be changed (refer to 700*a* and 700*b*). Under such configuration, information included in the capturing region 710 can be changed. Thus, a user can capture a plurality of screen information on the basis of the fact that the set capturing region 710 is maintained. That is, in a case where a capturing mode is maintained, a user's inconvenience which occurs when applying a control command to re-execute a capturing mode so as to capture another screen information, after completely capturing one screen information, can be solved. The control command to capture information included in the capturing region 710 can be executed in one of the aforementioned embodiments by first to third types of touches, and thus detailed explanations thereof will be omitted.

As shown in FIGS. 18(*a*) and (*b*), screen information output to the first region 261 may be converted, in response to a preset touch applied to the display unit 251. More specifically, the preset touch may be a drag touch, a flicking touch, or etc. Only in a case where the preset touch has been applied to a preset region, the controller 180 may convert the screen information. The preset region may be the capturing region 710, for instance. The screen information to be converted may be an execution screen of an application which has been executed recently.

Figure 19A:
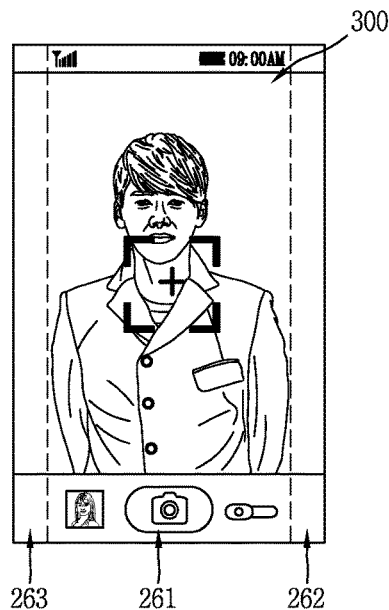
FIGS. 19A(a), 19A(b), 19A(c), 19B(a), 19B(b), 20A(a), 20A(b), 20A(c), 20A(d), 20B(a), 20B(b), 20B(c), 21A(a), 21A(b), 21B(a), 21B(b), 22(a), 22(b), 23A(a), 23A(b), 23B (a) and 23B(b) are conceptual views for explaining a method of controlling a camera function, using a touch applied to a side display unit.
Figure 19A:
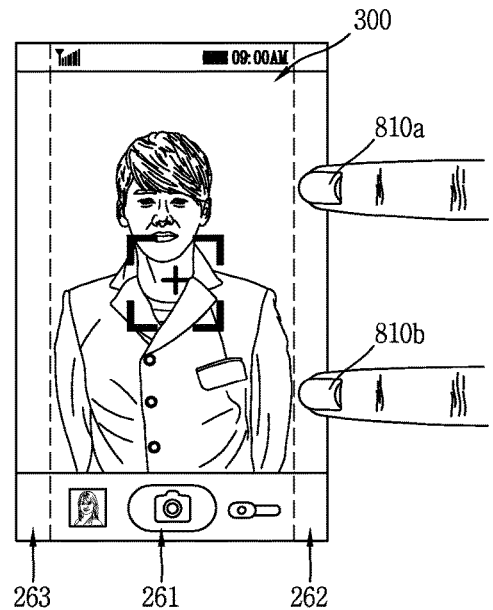
Figure 19A:
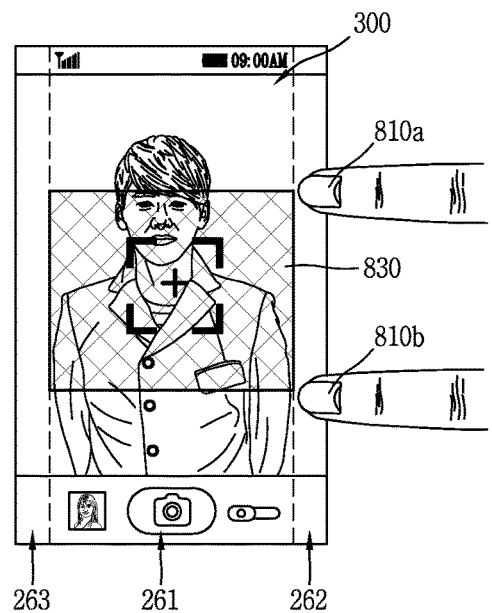

Hereinafter, a method of controlling a camera function using a side display unit will be explained in more detail with reference to the attached drawings. FIGS. 19A(a), 19A(b), 19A(c), 19B(a), 19B(b), 20A(a), 20A(b), 20A(c), 20A(d), 20B(a), 20B(b), 20B(c), 21A(a), 21A(b), 21B(a), 21B(b), 22(*a*), 22(*b*), 23A(a), 23A(b), 23B(a) and 23B(b) are conceptual views for explaining a method of controlling a camera function, using a touch applied to a side display unit.

Referring to FIGS. 19A(a), 19A(b), 19A(c), 19B(a), the controller 180 may control a camera function, based on sensing of touches applied to two points 810*a* and 810*b* on the second region 262.

For instance, in a state where a preview image of a subject captured by a camera has been output to the display unit (refer to FIG. 19A(a)), a specific region may be selected from the preview image in response to a touch applied to a side display unit.

More specifically, if touches are simultaneously applied to the first point 810*a* and the second point 810*b* (refer to FIG. 19A(b)), the controller 180 determines the touches as a request for selecting at least part of the preview image output to the first region 261.

The controller 180 may set a capturing region, based on the first point 810*a* and the second point 810*b* to which touches have been applied. For instance, as shown in FIG. 19A(c), if touches applied to the first point 810*a* and the second point 810*b* on the second region 262 are sensed, the controller 180 sets at least part of the preview image output to the first region 261 as a capturing region 830, based on the touches.

However, the present invention is not limited to this. If touches applied to two points on the second region 262 are sensed, the controller 180 sets at least part of the preview image output to the first region 261 as a capturing region 830. In all embodiments related to photo capturing, a touch applied to the second region may be replaced by a touch applied to a third region.

The controller 180 may determine a position, a size, an area, etc. of the capturing region based on at least one of a position of the first point 810*a* and the second point 810*b* on the second region 262, and a length between the first point 810*a* and the second point 810*b*.

For instance, as shown in FIG. 19A(c), a size and a position of a capturing region may be determined by the first point 810*a* and the second point 810*b*. That is, the size and the position of the capturing region are determined according to a position of the first point 810*a* and the second point 810*b* on the second region 262.

More specifically, a vertical length of the capturing region 830 corresponds to an interval between points on the second region 262 where touches have been sensed (e.g., the first point 810*a* and the second point 810*b*). A position of the capturing region 830 on the first region 261 (e.g., a boundary) corresponds to a position of touches applied to the second region 262 (e.g., the first point 810*a* and the second point 810*b*).

A boundary of the capturing region 830 may be defined by lines extending from the first point 810*a* and the second point 810*b*. The lines may be formed to penetrate the first region 261, and may be formed in parallel. The lines may be extending up to opposite sides to touched points on the display unit. In this case, the extending lines may be a substantial boundary line output to the display unit, or may be a virtual boundary line not output to the display unit. The display unit may be divided into three regions by the lines, and the capturing region 830 may be defined as a middle region among the divided three regions (refer to the oblique region of FIG. 19A(c). As shown, the capturing region 830 may have a quadrangular shape. A horizontal length of the capturing region 830 may be preset without being influenced by touches applied to the second region 262. For instance, the horizontal length of the capturing region 830 may correspond to a horizontal length of the first region 261.

As aforementioned, in the present invention, a capturing region may be defined according to an interval between points on the second region 262 where touches have been sensed, or a position of the touches. However, the present invention is not limited to this. For instance, in a state where a position, a size, an area, etc. of a capturing region have been preset, if touches are applied to the two points 810*a* and 810*b* on the second region 262, the capturing region may be reset.

FIG. 19A illustrates a case where touches are simultaneously applied to the first point 810*a* and the second point 810*b*. However, the present invention is not limited to this. For instance, in a state where a first touch applied to one point on the second region 262 has been maintained, even if a second touch is applied to another point on the second region 262, a capturing region may be set. That is, the controller 180 may set a capturing region if two touches applied to two points on the second region 262 are simultaneously sensed, even if the two touches are not simultaneously applied to the two points.

In the present invention, a graphic effect may be implemented so that information on a set capturing region can be provided to a user. Information on a region set as a capturing region may be provided in various manners. For instance, information on a region set as a capturing region may be output in a visible manner. For instance, the controller 180 may output a graphic object (or guide image) to a capturing region. Then, a user may recognize the capturing region, through the graphic object (or guide image) output to the capturing region.

For instance, once a capturing region 830 is set by touches applied to two points on the second region 262, the controller 180 may output the graphic object 430*a* (refer to FIG. 6A) to the capturing region 830. The controller 180 outputs the graphic object 430a, to the capturing region 830 set as two points on the second region 262 are touched. The graphic object 430a may have the same size as the capturing region 830. That is, the graphic object 430a may be formed to cover the capturing region 830.

Even if the graphic object 430a has covered the capturing region 830, information output to the capturing region 830 may be exposed to outside. The information output to the capturing region 830 may be overlapped with the graphic object, in a form to be recognizable by a user. The graphic object may have transparency. As the semi-transparent graphic object is overlapped with the capturing region 830, information output to the capturing region 830 may be recognizable by a user. The graphic object 430a may be modified by the methods aforementioned with reference to FIGS. 6A(a)-(c).

The controller 180 may further output other graphic object 432 (refer to FIG. 6B) for providing information on a set capturing region. As a method of outputting other graphic object 432, the method aforementioned with reference to FIGS. 6B(b) and (c) may be applied.

In the present invention, setting a capturing region may be ended (a set capturing region may be released) after capturing screen information included in the capturing region (image storing) has been completed. Alternatively, setting a capturing region may be ended (a set capturing region may be released) even though capturing screen information included in the capturing region (image storing) has not been completed.

Cancelling setting of a capturing region may be performed by a user's intention. For instance, a control command for cancelling setting of a capturing region may be applied through a touch applied to the second region 262, or a touch applied to the first region 261. The control command may be also applied through a voice, or a hardware key provided at the terminal body. Cancelling setting of a capturing region may be changed by the method aforementioned with reference to FIGS. 7A(a) and (b).

As another example, even when the touches applied to the two points 810a and 810b are released, the set capturing region may be maintained. That is, even if the touches applied to the two points 810a and 810b have been released, the controller 180 may maintain the set capturing region. In this state, an output state of a graphic object to the capturing region may be maintained.

As aforementioned with reference to FIGS. 7C(c) and (d), the setting of the capturing region may be released when a preset touch is applied to the second region 262. The preset type of touch may be various. For instance, the preset type of touch may be a short-touch, a long-touch, a double touch, etc.

In a state where a graphic object has been output to the capturing region, the graphic object may disappear (may not be output any longer) if the setting of the capturing region is cancelled (or ended). As another example, as aforementioned with reference to FIGS. 7D(b) and (c), the setting of the capturing region may be performed through the function icon 440 (refer to FIG. 7D) output to the display unit 251.

As another example to control a camera function based on sensing of touches applied to the two points 810a and 810b on the second region 262, a position of a focal point on a preview image may be changed. More specifically, a position of a focal point may be firstly set based on the first region 261. Then, in a case where a capturing region has been selected from the preview image by touches applied to the side display unit, the position of the focal point may be set based on the capturing region.

Figure 19B:
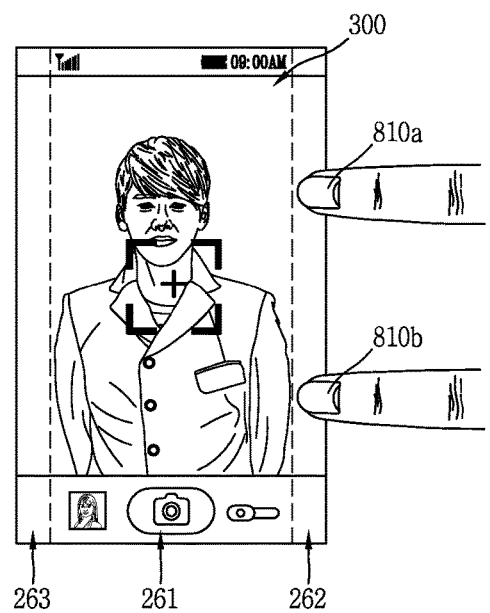
Figure 19B:
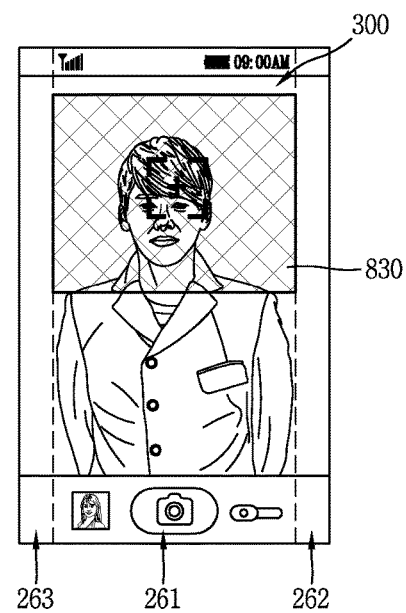

For instance, referring to FIG. 19B(a), in a state where a preview image of a subject captured by a camera has been displayed on the display unit, if touches are applied to the side display unit, a specific region may be selected from the preview image. The specific region is a capturing region, which may be a region to which a plurality of embodiments aforementioned with reference to FIG. 19A are applied.

Referring to FIG. 19B(a), a preview image is output to the first region 261 (or entire part of the display unit) in a camera mode, and an indicator indicating a focal point is displayed on the first region 261. In the camera mode, a focal point may be formed at a preset position on the first region 261 as shown. For instance, a focal point may be formed at a central part of the first region 261. In this case, if a capturing region 830 is set by touches applied to the two points 810a and 810b on the second region, the focal point may be formed at a central part of the capturing region 830 as shown in FIG. 19B(b). That is, if the preset position is a central part of a capturing region, a focal point is set to a central part of a preview image in a preview mode. And if a capturing region is set, a focal point is set to a central part of the capturing region. Thus, an indicator indicating a focal point is firstly displayed on a central part of the first region 261. Then if a capturing region 830 is set, the indicator is moved to a central part of the capturing region 830.

If the capturing region 830 is released by one of the methods aforementioned with reference to FIG. 19A, the position of the focal point may be restored to the original position. That is, if the capturing region 830 is released, the focal point may be set to a central part of the first region 261, and the indicator may be output to the central part of the first region 261.

Referring to FIGS. 19A(a), 19A(b), 19A(c), 19B(a), 19B(b), in a state where the capturing region 830 has been set, if an additional control command is applied to the display unit, the controller 180 may store screen information included in the capturing region 830 as a photo image. For instance, the control command may be release of touches applied to the two points 810a and 810b. A control command, related to storage of screen information included in the capturing region 830, may be defined in various forms, which will be explained with reference to FIGS. 20A and 20B. As a method of setting the capturing region 830, the method aforementioned with reference to FIGS. 19A and 19B may be used. In this embodiment, a control method subsequent to the setting will be explained.

Figure 20A:
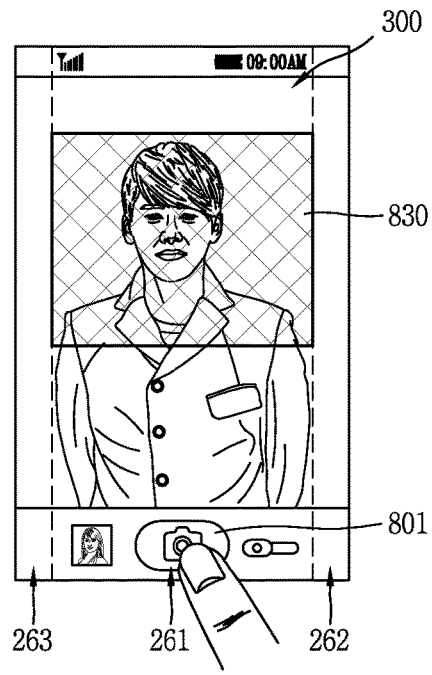
Figure 20A:
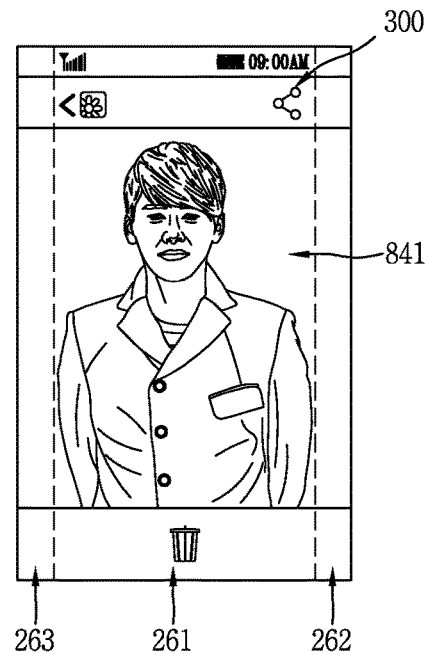
Figure 20A:
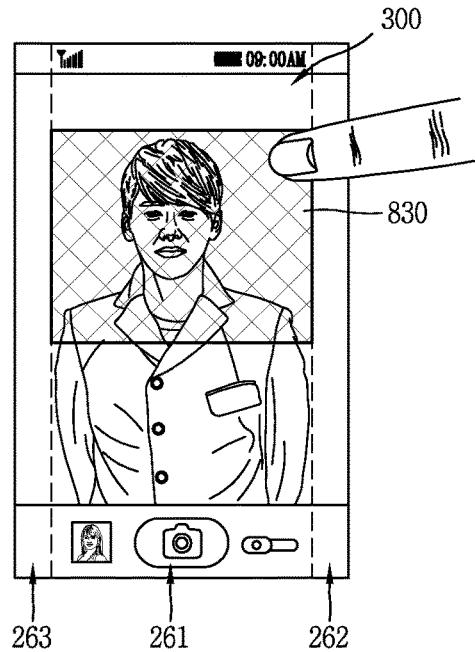
Figure 20A:
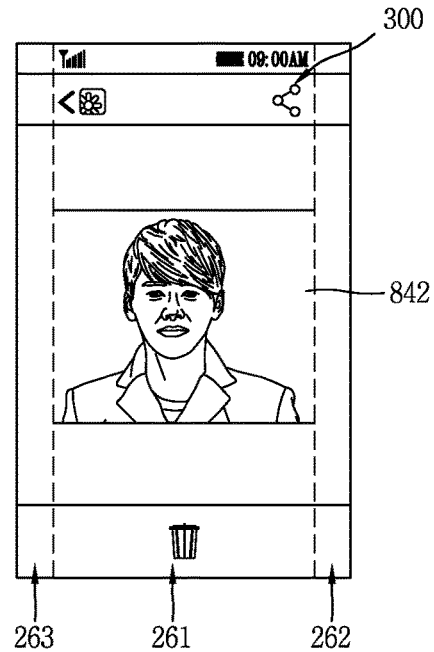

Referring to FIGS. 20A(a), 20A(b), 20A(c), 20A(d), in a state where the capturing region 830 has been set, if an additional control command is input, whether to store a preview image or an image output to the capturing region 830 is determined based on a type of the additional control command.

The additional control command is a touch related to a control command for storing screen information included in the capturing region 830 in the memory as an image file format or other file format, which may have a preset type.

More specifically, the additional control command may be a touch consecutive to at least one of touches sensed on the first point 810a and the second point 810b (e.g., a first touch and a second touch), and may be a preset type of touch. Alternatively, the additional control command may be a touch inconsecutive to touches sensed on the first point 810a and the second point 810b (e.g., a first touch and a second touch), and may be a preset type of touch.

Referring to FIG. 20A(a), in a state where the capturing region 830 has been set, if a touch is applied to a capturing button 801, a preview image is stored in the memory as a photo file. In this case, the stored image 841 (or an image of the photo file) may be output to the display unit.

As another example, referring to FIG. 20A(b), in a state where the capturing region 830 has been set, if a touch (e.g., short-touch) is applied to the capturing region 830, the capturing region 830 among the preview image may be stored as a photo file. The stored image 842 is an image corresponding to the capturing region 830 among the preview image, which may be output to the display unit. Once the image has been stored, the setting of the capturing region 830 may be released.

As another example, a control command for storing an image corresponding to the capturing region 830 may be a drag touch consecutive to at least one of touches sensed on two points (e.g., a first touch and a second touch), the drag touch applied from one of the first touch and the second touch, toward another thereof. That is, a control command for storing an image corresponding to the capturing region 830 may be a pinch-in touch consecutive to at least one of touches sensed on the first point 810a and the second point 810b (refer to FIG. 19A) (e.g., a first touch and a second touch). If the aforementioned pinch-in touch is applied to the second region 262, the controller 180 may store screen information included in the capturing region 830 in the memory as an image file format or another file format.

In a case where an interval between points to which the pinch-in touch has been applied is less than a preset length, the controller 180 may store screen information included in the capturing region 830. For instance, if a user's fingers contacting the second region 262 move to almost contact each other, the controller 180 may store the screen information.

In the above configuration, the control command is a pinch-in touch consecutive to at least one of a first touch and a second touch. However, the control command may be a pinch-in touch inconsecutive to the first touch and the second touch.

Figure 20B:
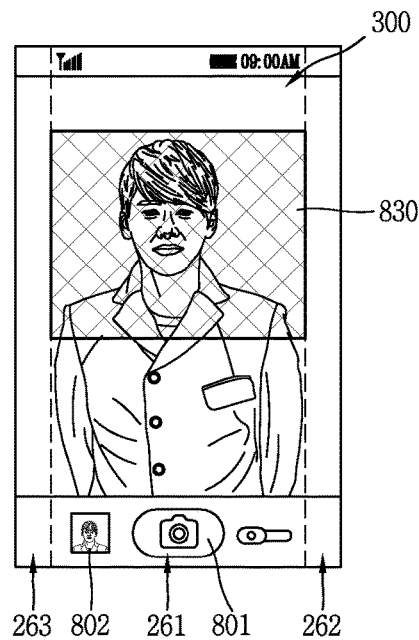
Figure 20B:
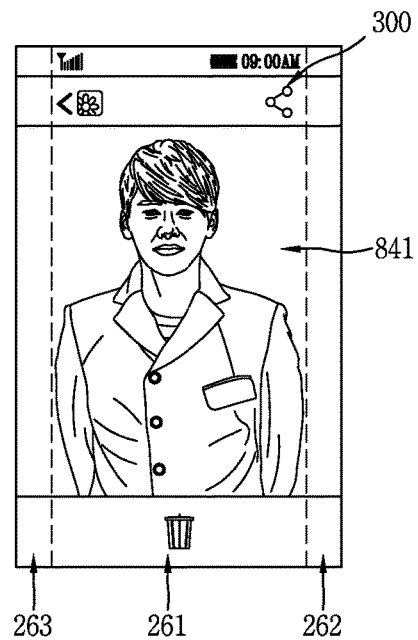
Figure 20B:
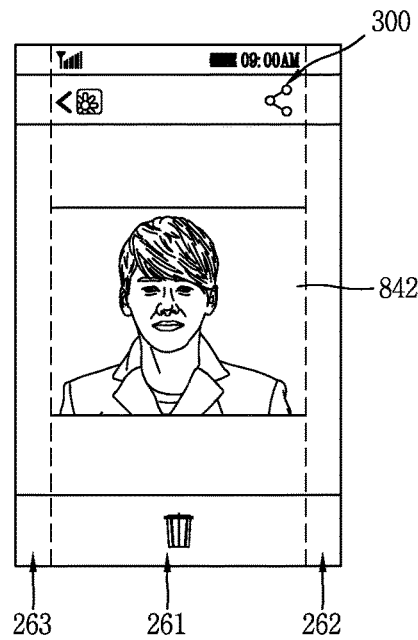

Referring to FIG. 20B(a), 20B(b), 20B(c), a capturing button 801 for storing an image output to the first region 261 (hereinafter, will be referred to as a 'first capturing button'), and a capturing button 802 for storing an image output to the capturing region 830 (hereinafter, will be referred to as a 'second capturing button') may be separately output to the display unit. In this case, the second capturing button 802 may be output if the capturing region 830 is set by one of the aforementioned methods.

Referring to FIG. 20B(a), in a state where a first capturing button 801 and a preview image have been output, if touches are applied to two points on the second region 262, a capturing region 830 is set and a second capturing button 802 is generated. Referring to FIG. 20B(b), in a state where the capturing region 830 has been set and the second capturing button 802 has been generated, if a touch is applied to the first capturing button 801, the preview image is stored in the memory as a photo file. In this case, the stored image 841 (or photo file) may be output to the display unit. Referring to FIG. 20B(c), in a state where the capturing region 830 has been set and the second capturing button 802 has been generated, if a touch (e.g., short-touch) is applied to the second capturing button 802, the capturing region 830 among the preview image may be stored as a photo file. The stored image 842 is an image corresponding to the capturing region 830 among the preview image, which may be output to the display unit. Once the image has been stored, the setting of the capturing region 830 may be released.

A capturing region set by the method aforementioned with reference to FIGS. 19A and 19B may be changed (reset).

Hereinafter, a method of changing (resetting) a capturing region, especially, a method of changing a position of a capturing region will be explained in more detail with reference to FIGS. 21A and 21B. And a method of changing a size of a capturing region will be explained in more detail with reference to FIGS. 22(a), 22(b).

In the mobile terminal according to the present invention, in a state where a capturing region has been set, if an additional control command is applied to the display unit, the controller 180 may reset the capturing region.

The additional control command is a touch related to a control command for resetting the capturing region, which may have a preset type.

More specifically, the additional control command may be a touch consecutive to at least one of touches sensed on the first point 810a and the second point 810b (e.g., a first touch and a second touch), and may be a touch applied to correspond to the preset type. Alternatively, the additional control command may be a touch inconsecutive to touches sensed on the first point 810a and the second point 810b (e.g., a first touch and a second touch), and may be a touch applied to correspond to the preset type.

Figure 21A:
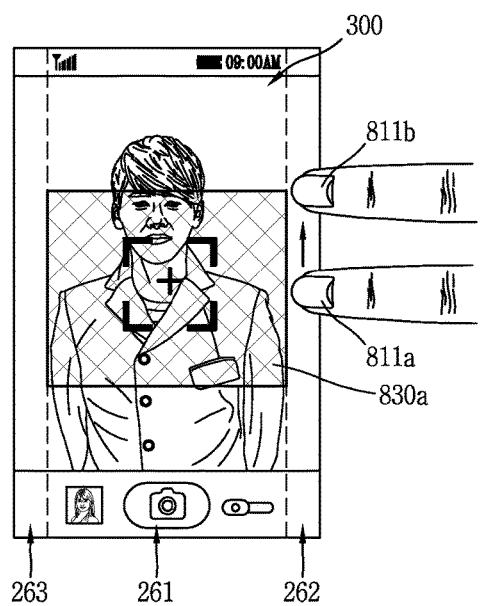
Figure 21A:
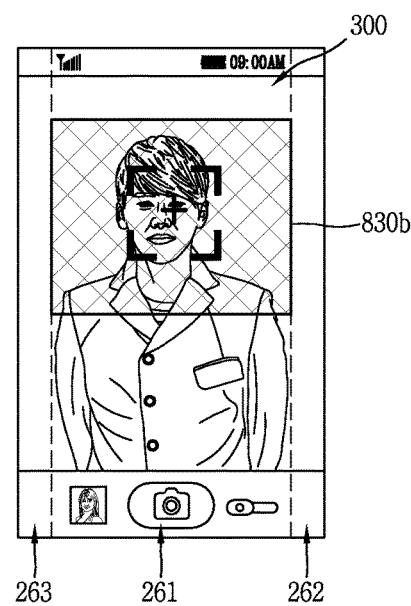
Figure 21B:
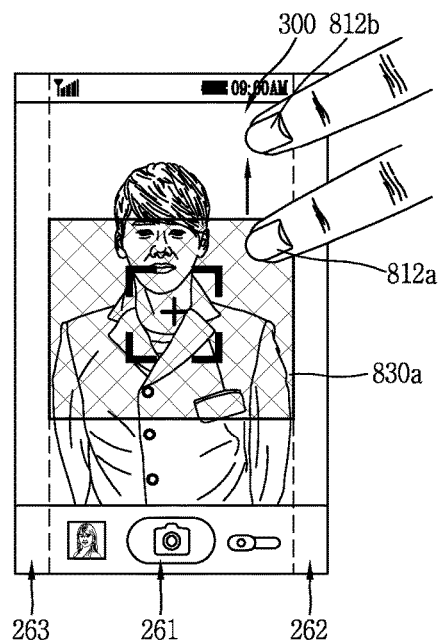
Figure 21B:
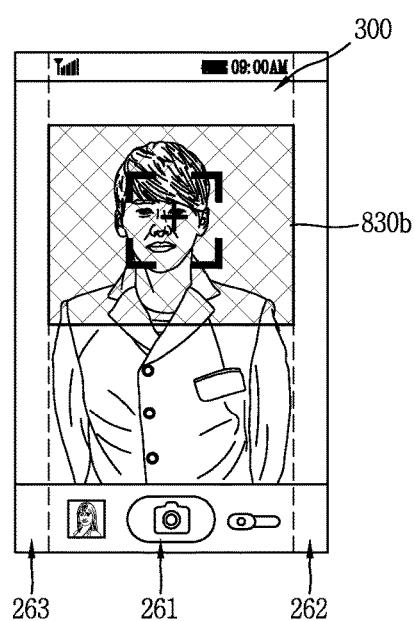

Referring to FIGS. 21A(a), 21A(b), 21B(a), 21B(b), a capturing region may be moved by an additional control command inconsecutive to a first touch and a second touch. However, the present invention is not limited to this. That is, the additional control command may be a control command consecutive to at least one of a first touch and a second touch.

More specifically, as shown in FIGS. 19A and 19B, if touches applied to the first point 810a and the second point 810b on the second region 262 are sensed, a capturing region 830a is set (refer to FIG. 21A(a)). In a state where the capturing region 830a has been set, if a drag touch is applied to the second region 262, the capturing region 830a is moved to an input direction of the drag touch. More specifically, if a touch is applied to a first point 811a on the second region 262 and then the touched point is moved to a second point 811b, the capturing region 830a is moved to an input direction of the touched point. In this case, the capturing region 830a is moved while maintaining its size. Upon sensing of touches applied to the first point 810a and the second point 810b on the second region 262, the capturing region 830a is set to have a preset size. The preset size of the capturing region 830a is maintained while the capturing region 830a is moved.

The touched points may be plural. The touched points may be two points on the second region to which touches are applied so as to set the capturing region 830a. In this case, the additional control command may be a control command consecutive to at least one of a first touch and a second touch.

As another example, in a state where the capturing region 830a has been set, if a drag touch is applied to the capturing region 830a, the capturing region 830a is moved to an input direction of the drag touch. More specifically, if a touch is applied to a first point 812a on the capturing region 830a and then the touched point is moved to a second point 812b, the capturing region 830a is moved to an input direction of the touched point.

Figure 22A:
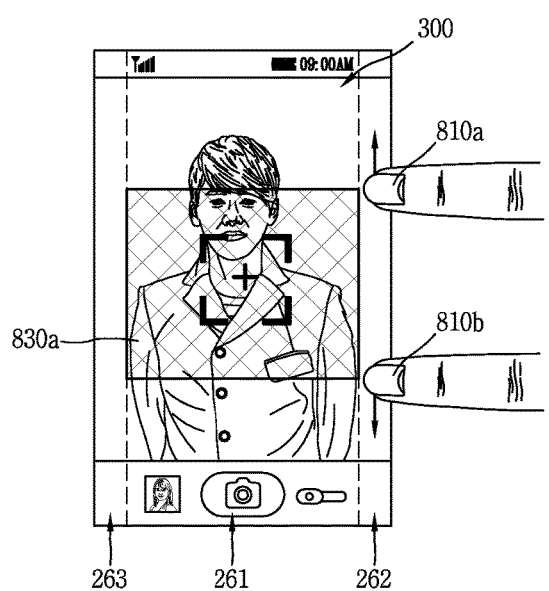
Figure 22B:
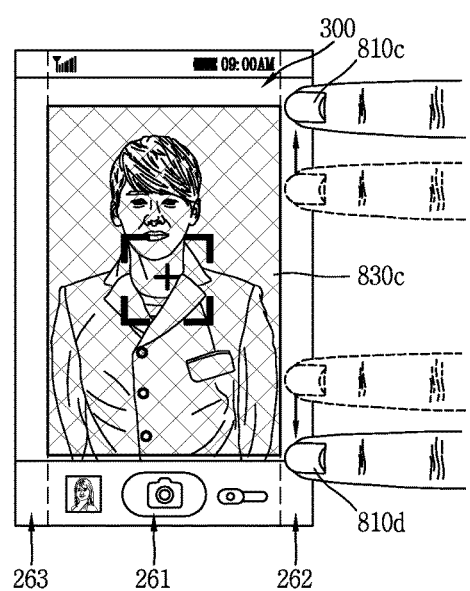

Referring to FIGS. 22(a), 22(b), a size of a capturing region may be changed by an additional control command consecutive to a first touch and a second touch. However, the present invention is not limited to this. That is, the additional control command may be a control command inconsecutive to at least one of a first touch and a second touch.

Referring to FIG. 22(a), if a first touch and a second touch applied to the first point 810a and the second point 810b on the second region 262, respectively are sensed, a capturing region 830a is set. As shown in FIG. 22(b), if a drag touch starting from the first touch and the second touch is applied up to a third point 810c and a fourth point 810d, the controller 180 may reset the capturing region 830a to another capturing region 830c.

That is, a size of the capturing region may be changed based on the drag touch. The drag touch consecutive to the first touch and the second touch may be a touch applied to opposite directions. The degree that the size of the capturing region is changed may be variable according to a progressed degree of the drag touch, or a length of the drag touch.

Once a graphic object has been output to the capturing region, the graphic object may be moved in response to the drag touch. And the graphic object may be output to the capturing region 830c reset in response to the drag touch.

As another example, the size of the capturing region may be changed based on a drag touch starting from one point on the second region 262.

The touch applied to said one point may be a touch re-applied after the first touch and the second touch applied to the second region 262 have been released. That is, in a case where the first touch and the second touch applied to the second region 262 have been released, the controller 180 may change the capturing region, based on a touch re-applied to the display unit 251 after the touches have been released.

In this case, the capturing mode may be maintained even when at least one of the first touch and the second touch applied to the first point 420a and the second point 420b is released.

As another example, the size of the capturing region may be changed based on a drag touch starting from one point on the first region 261.

The touch applied to said one point may be a touch re-applied after the first touch and the second touch applied to the first region 261 have been released. In this case, one of an upper edge and a lower edge of the capturing region may be moved along an input direction of the drag touch. Since one of the upper edge and the lower edge of the capturing region is fixed, the size of the capturing region is changed. The touch applied to said one point may be a touch applied to a preset capturing region.

A touch applied to the second region 262 or the capturing region may have various types. For instance, the touch applied to the capturing region may be a drag touch, a pinch-in touch, a pinch-out touch, etc.

More specifically, in the same manner as the method of changing the size of the capturing region shown in FIGS. 9C(b) and (c), the controller 180 may change the size of the capturing region based on a pinch-in touch applied to a capturing region on the first region 261. Changing the size of the capturing region corresponds to resetting the capturing region. The size of the capturing region may be changed according to the degree of the pinch-touch (e.g., touch length).

After the capturing region has changed in position or size, a preview image or an image included in the capturing region may be stored by the method aforementioned with reference to FIGS. 20A and 20B.

After a capturing region has been set, other function related to a camera function, e.g., a zoom function may be performed. Hereinafter, a method of performing a zoom function will be explained in more detail with reference to FIGS. 23A and 23B.

In the mobile terminal according to the present invention, in a state where a capturing region has been set, if an additional control command is applied to the display unit, the controller 180 may perform a zoom function.

Figure 23A:
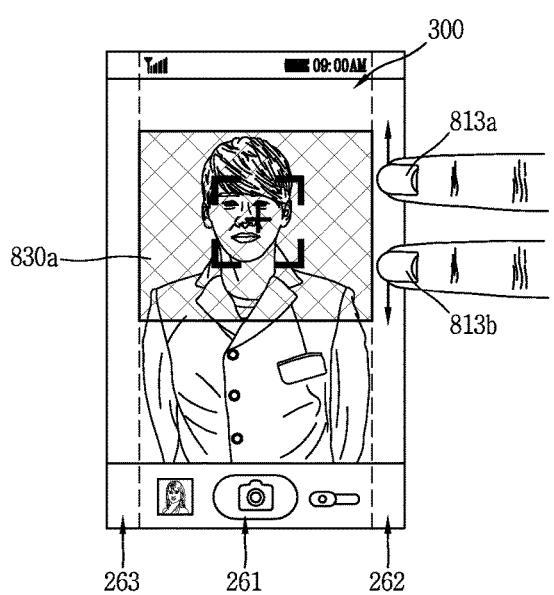
Figure 23A:
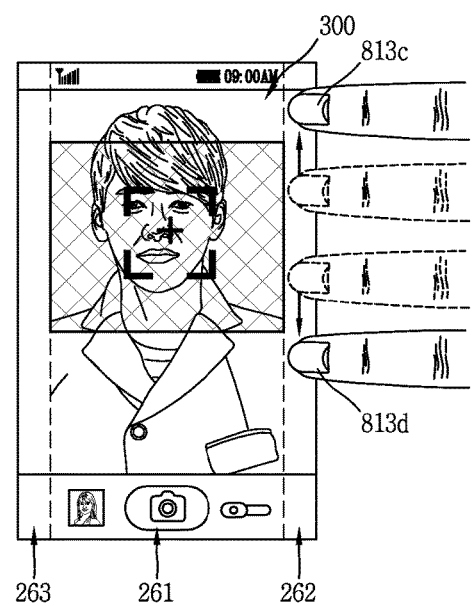

Referring to FIGS. 23A(a), 23A(b), 23B(a) and 23B(b), a zoom function may be performed by an additional control command inconsecutive to a first touch and a second touch for setting a capturing region. However, the present invention is not limited to this. That is, the additional control command may be a control command consecutive to at least one of a first touch and a second touch.

More specifically, if touches applied to the first point 810a and the second point 810b on the second region 262 (refer to FIG. 19A) are sensed, a capturing region 830a is set. In this state, if a drag touch is applied to the second region 262 as shown in FIG. 23A, a zoom function is performed. More specifically, if a drag touch applied to two points 813a and 813b is moved up to other two points 813c and 813d, a zoom function may be performed. For instance, if the drag touch starting from the two points 813a and 813b is applied to directions far from each other, a zoom-in function may be performed. On the other hand, if the drag touch starting from the two points 813a and 813b is applied to directions close to each other, a zoom-out function may be performed. The zoom-in/out degree of a preview image may be variable according to a progressed degree of the drag touch, or a length of the drag touch. As shown, in case of performing a zoom-in function, a preview image may be entirely zoomed-in, and an image included in the capturing region 830a may be zoomed-in.

In a case where a zoom function is performed by a consecutive control command, the two points 813 and 813b from which the drag touch starts may be the first point 810a and the second point 810b which define the capturing region 830a.

Figure 23B:
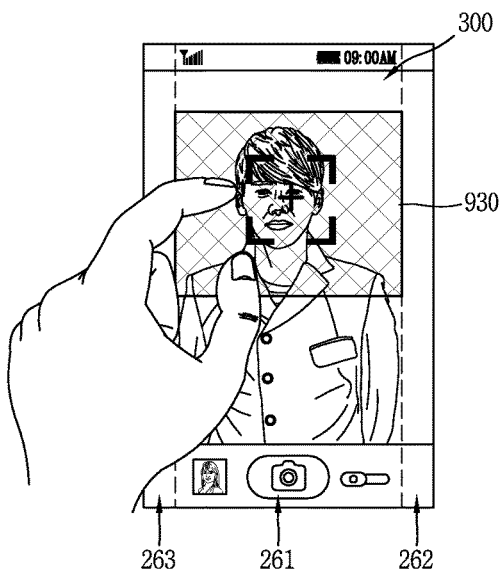
Figure 23B:
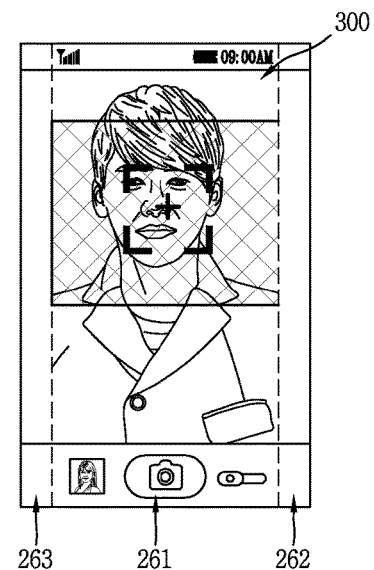

As another example, as shown in FIG. 23B, in a state where a capturing region 930 has been set, if a touch is applied to the capturing region 930, a zoom function may be performed. In this case, the touch applied to the capturing region 930 may have various types. For instance, the touch applied to the capturing region 930 may be a drag touch, a pinch-in touch, a pinch-out touch, etc. As shown, in case of performing a zoom function, a preview image may be entirely zoomed-in or out, and an image included in the capturing region 830a may be zoomed-in or out.

After the capturing region has been set and the zoom function has been performed, a preview image or an image included in the capturing region may be stored by the method aforementioned with reference to FIGS. 20A and 20B.

Figure 24A:
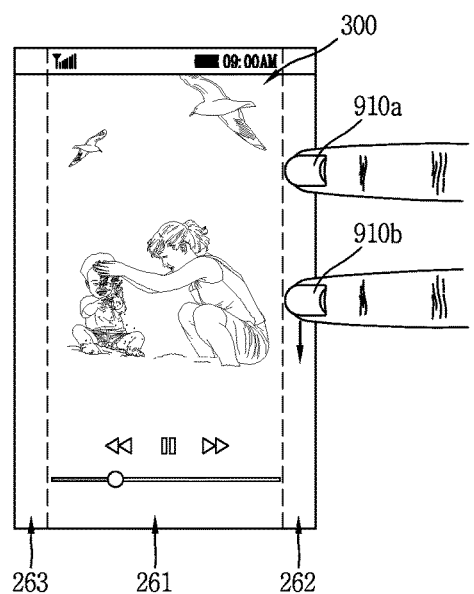
FIGS. 24A(a), 24A(b), 24A(c), 24B(a), 24B(b), 24C(a) and 24C(b) are conceptual views for explaining a method of controlling a moving image-related function, using a touch applied to a side display unit.
Figure 24A:
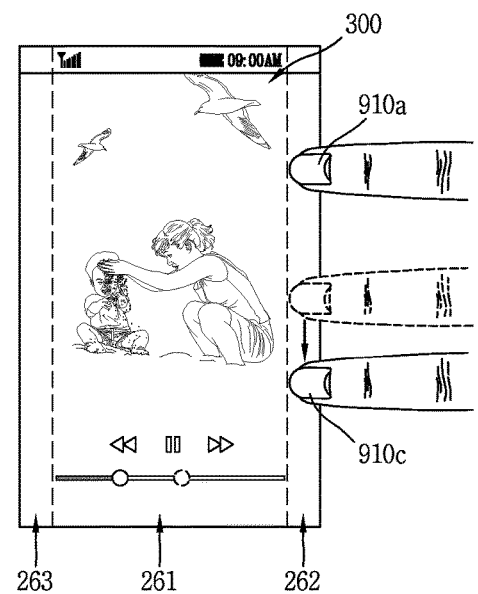
Figure 24A:
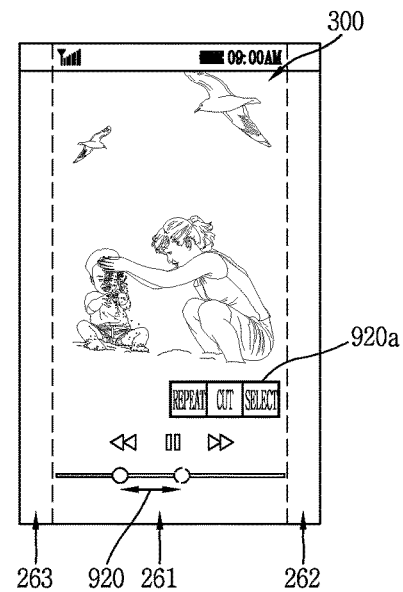

Hereinafter, a method of controlling a moving image-related function using a side display unit will be explained in more detail with reference to the attached drawings. FIGS. 24A(a), 24A(b), 24A(c), 24B(a), 24B(b), 24C(a) and 24C(b) are conceptual views for explaining a method of controlling a moving image-related function, using a touch applied to a side display unit.

Referring to FIGS. 24A(a), 24A(b), 24A(c), 24B(a), 24B(b), 24C(a) and 24C(b), a function related to play of a moving image may be controlled, in response to sensing of a touch on at least one point on the second region 262. However, the present invention is not limited to this. That is, the controller 180 may control a function related to play of a moving image, in response to sensing of a touch on at least one point on the third region 263. In all embodiments, a touch applied to the second region may be replaced by a touch applied to the third region.

Referring to FIG. 24A(a), in a case where a moving image is played (or play has been completed) as a moving image play application is driven, if touches are sensed on two points 910*a* and 910*b* on the second region 262, the mobile terminal enters a moving image play control mode. The control mode indicates a mode for controlling a function related to play of a moving image, in response to input of an additional control command.

As shown, in the control mode, the controller 180 may output control icons for controlling play of a moving image, on the display unit. The control icons may be a rewind key, a pause key, a fast-forward key, a play time indicator, etc. If a touch (e.g., short-touch) is applied to one of the control icon, a corresponding operation is performed.

The controller 180 may further display, on the display unit, a representative image of moving image data (e.g., a thumbnail image of a moving image file), information on moving image data (e.g., a title of a moving image, etc.).

Referring to FIG. 24A(b), if a touch is applied to the second region in the control mode, a moving image-related function may be controlled. In this case, the touch applied to the second region may be a drag touch consecutive to at least one of touches sensed on the first point 910*a* and the second point 910*b* (e.g., a first touch and a second touch). The touch applied to the first point 910*a* may be maintained with its position fixed.

More specifically, after a touch has been applied to the second point 910*b* on the second region 262, if the touched point is moved to a third point 910*c*, a play time of a moving image is changed. The play time indicator may be moved by a specific section 920 corresponding to a moving distance of the touched point (or a distance of the drag touch). And a moving image corresponding to a corresponding play time may be output.

As another example, as shown in FIG. 24A(b), the specific section 920 may be set by a drag input consecutive to at least one of a first touch and a second touch. In this case, a section control mode for inputting a control command related to the specific section 920 may be executed. The section control mode is executed at the same time as setting of the specific section 920. In the section control mode, repeating, cutting, selecting, etc. with respect to the specific section 920 may be activated. In the section control mode, an input window 920*a* having a repetition icon, a cutting icon and a selection icon may be output to the display unit. The repetition icon, the cutting icon and the selection icon are linked to a section repeating function, a section cutting function and a section selecting function, respectively. That is, if a user touches the repetition icon, a moving image is repeated at the specific section 920. If a user touches the cutting icon, moving image data corresponding to the specific section 920 may be stored as an additional file. As another example, if a user touches the selection icon, the specific section 920 is selected, and a current state is converted into a state where an additional control command with respect to the selected specific section 920 (e.g., marking, etc.) can be input.

Figure 24B:
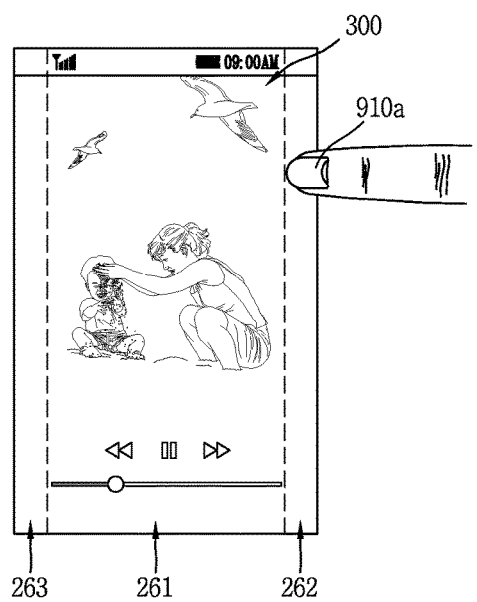
Figure 24B:
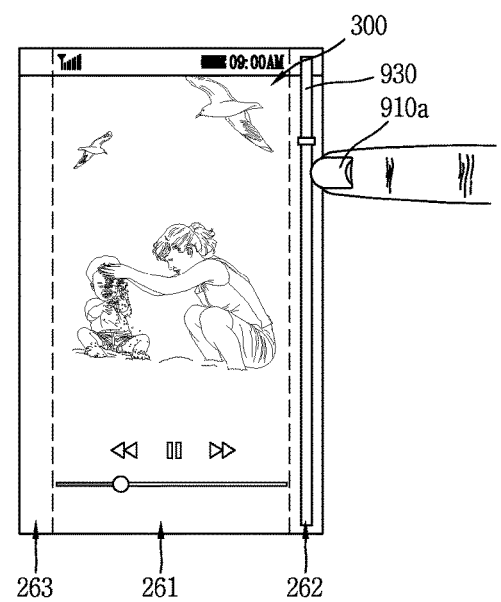
Figure 24C:
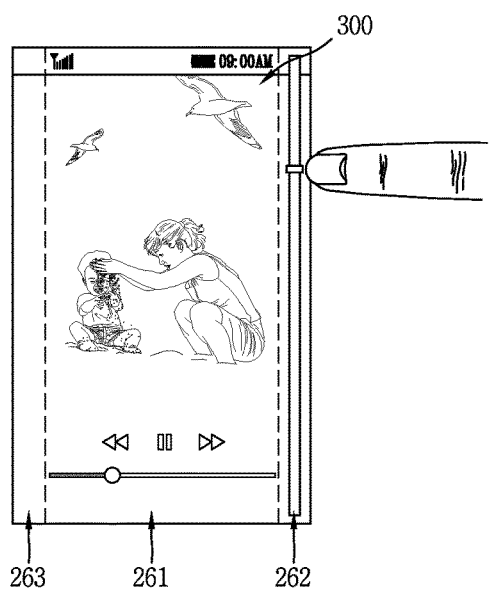
Figure 24C:
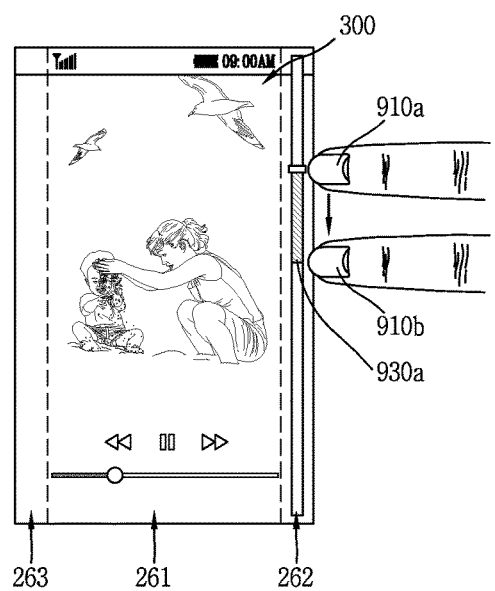

As another example, referring to FIG. 24B, a moving image play control mode may be executed in response to sensing of a touch applied to one point on the second region 262. Referring to FIG. 24C, a specific function of the control mode may be performed by an additional touch applied to the second region 262.

More specifically, referring to FIG. 24B(a), in a case where a moving image is played (or play has been completed) as a moving image play application is driven, if a touch is sensed on one point on the second region 262, the mobile terminal enters a moving image play control mode. In the control mode, the controller 180 may output control icons for controlling play of a moving image, on the display unit. The control icons may be a rewind key, a pause key, a fast-forward key, a play time indicator, etc. If a touch (e.g., short-touch) is applied to one of the control icons, a corresponding operation may be performed.

Referring to FIG. 24B(b), a progress bar 930 related to a moving image to be played may be output to the second region 262, by a touch for executing a control mode. The second region 262 is formed to be long in one direction, and the progress bar 930 is arranged in said one direction. A play time indicator may be output to the progress bar 930.

Referring to FIG. 24C, if a touch is applied to the second region 262 in the control mode, a moving image play time may be controlled. In this case, the touch applied to the second region may be a drag touch consecutive to the touch sensed on said one point. If a drag touch is applied to the second region 262 in the control mode, the play time indicator may move along an input direction of the drag touch, and a moving image may be played at a corresponding play time. More specifically, after a touch has been applied to a first point 910*a* on the second region 262, if the touched point is moved to a second point 910*b*, a play time of the moving image is changed.

The touched point may be plural. If the touched point is plural, a first touch and a second touch are applied to the second region 262 so as to execute a control mode. In this case, a drag input for moving the aforementioned play time may be a control command consecutive to at least one of the first touch and the second touch.

Although not shown, in the control mode, a volume control bar rather than the progress bar 930 may be output to the second region 262. An indicator indicating the degree of volume control may be output to the volume control bar. In this case, if a touch is applied to the second region 262 in the control mode, a volume of a moving image may be controlled. The touch applied to the second region may be a drag touch consecutive to a touch sensed on a touch point for executing the control mode. In the present invention, if a drag touch is applied to the second region 262 in the control mode, a volume of a moving image may be controlled according to an input direction of the drag touch.

Figure 25A:
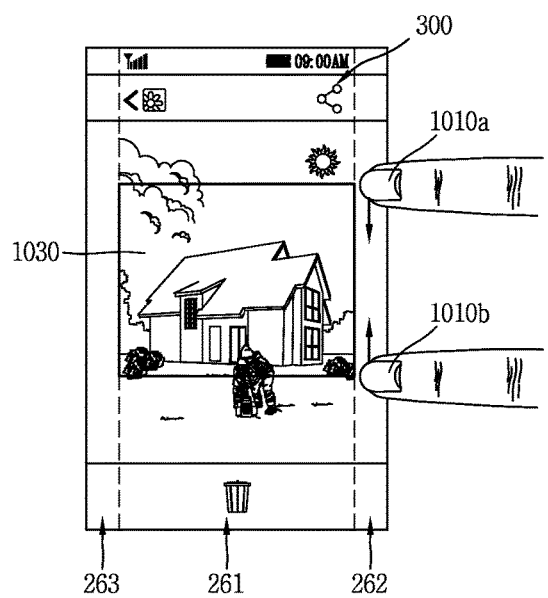
FIGS. 25(a) and 25(b) are conceptual views for explaining a method of controlling an image output function and an image edition function, using a touch applied to a side display unit.
Figure 25B:
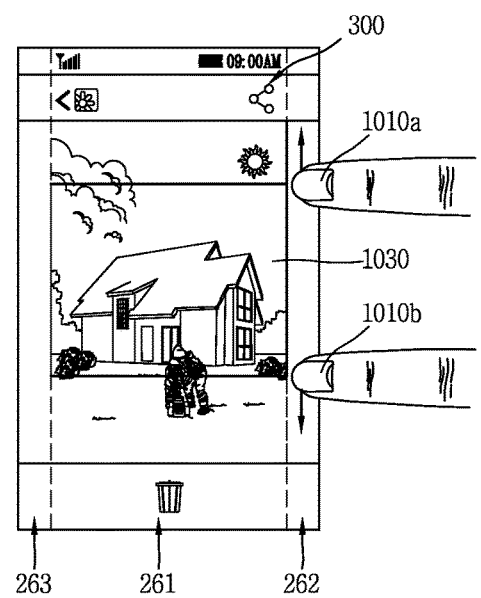

Hereinafter, a method of controlling functions related to image output and image edition using a side display unit will be explained in more detail with reference to the attached drawings. FIGS. 25(*a*) and 25(*b*) are conceptual views for explaining a method of controlling an image output function and an image edition function, using a touch applied to a side display unit.

Referring to FIG. 25, an image edition function may be controlled in response to sensing of touches applied to a first point 1010*a* and a second point 1010*b* on the second region 262.

For instance, in a state where a gallery function-related application has been performed and a specific image has been output to the display unit, a specific region may be selected from the specific image, in response to a touch applied to a side display unit.

More specifically, if touches are simultaneously applied to the first point 1010*a* and the second point 1010*b* (refer to FIG. 25(*a*)), the controller 180 determines the touches as a request for selecting at least part of an image output to the first region 261.

The controller 180 may set an editing region, based on the first point 1010*a* and the second point 1010*b* to which touches have been applied. For instance, the controller 180 sets at least part of an image output to the first region 261 as an editing region 1030, based on touches applied to the first point 1010*a* and the second point 1010*b* on the second region 262.

However, the present invention is not limited to this. That is, if touches applied two points on the third region 263 are sensed, the controller 180 may set at least part of a preview image output to the first region 261 as an editing region 1030, based on the touches. In this embodiment, a touch applied to the second region 262 may be replaced by a touch applied to the third region 263.

The controller 180 may determine a position, a size, an area, etc. of the editing region, based on at least one of a position of the first point 1010*a* and the second point 1010*b* on the second region 262, and a distance between the first point 1010*a* and the second point 1010*b*.

For instance, a size and a position of an editing region may be determined by the first point 1010*a* and the second point 1010*b*. That is, the size and the position of the editing region are determined according to a position of the first point 1010*a* and the second point 1010*b* on the second region 262. In this case, a vertical length of the editing region 1030 may correspond to an interval between points on the second region 262 where touches have been sensed (e.g., the first point 1010*a* and the second point 1010*b*), like in the aforementioned example of a capturing region. As a method of determining a size and a position of an editing region, the method of determining a size and a position of a capturing region aforementioned with reference to FIGS. 19A and 19B may be applied.

In the present invention, a graphic effect may be implemented so that information on a set editing region can be provided to a user. As a method of providing a graphic effect on such editing region, the method of providing a graphic effect on a capturing region aforementioned with reference to FIGS. 19A and 19B may be used.

Cancelling setting of an editing region may be performed by a user's intention. For instance, a control command for cancelling setting of an editing region may be applied through a touch applied to the second region 262, or a touch applied to the first region 261. The control command may be also applied through a voice, or a hardware key provided at the terminal body. Cancelling setting of an editing region may be changed by the method aforementioned with reference to FIGS. 7A(a) and (b).

As shown in FIG. 25(*b*), in a state where the editing region 1030 has been set, if an additional control command is applied to the display unit, the controller 180 may store screen information included in the editing region 1030 as a photo image. The control command may be a drag touch consecutive to at least one of touches sensed on two points (e.g., a first touch and a second touch), the drag touch applied from one of the first touch and the second touch, toward another thereof. That is, a control command for storing an image corresponding to the editing region 1030 may be a pinch-in touch consecutive to at least one of touches sensed on the first point 1010*a* and the second point 1010*b*. If the aforementioned pinch-in touch is applied to the second region 262, the controller 180 may store screen information included in the editing region 1030 in the memory as an image file format or other file format. In the above configuration, the control command is a pinch-in touch consecutive to at least one of a first touch and a second touch. However, the control command may be a pinch-in touch inconsecutive to at least one of the first touch and the second touch.

In the present invention, the additional control command is not limited to a pinch-in touch. For instance, the additional control command may be release of touches sensed on the first point 1010*a* and the second point 1010*b*.

Figure 26:
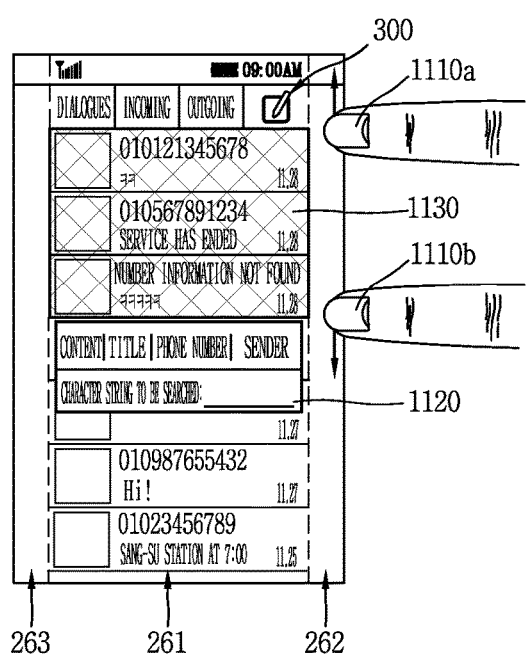
FIG. 26 is a conceptual view for explaining a method of controlling a search function, using a touch applied to a side display unit.

Hereinafter, a method of providing an information search function using a side display unit will be explained in more detail with reference to the attached drawings. FIG. 26 is a conceptual view for explaining a method of controlling a search function, using a touch applied to a side display unit.

Referring to FIG. 26, a search function may be performed in response to sensing of touches applied to two points 1110*a* and 1110*b* on the second region 262.

For instance, in a state where an application having a list output function has been executed and a list has been output, if a touch is applied to a side display unit, a specific region to be searched may be selected from the list. More specifically, if touches are simultaneously applied to the first point 1110*a* and the second point 1110*b*, the controller 180 determines the touches as a request for selecting at least part of a list output to the first region 261.

For instance, as shown in FIG. 26, in a state where an application related to message transmission/reception has been executed and a message list has been output, if touches applied to the first point 1110*a* and the second point 1110*b* on the second region 262 are sensed, the controller 180 sets at least part of messages included in the list output to the first region 261, as a searching region 1130 based on the touches.

However, the present invention is not limited to this. That is, if touches applied to two points on the third region 263 are sensed, the controller 180 may set at least part of the messages included in the list output to the first region 261, as the searching region 1130 based on the touches.

The controller 180 may determine a position, a size, etc. of the searching region 1130, based on at least one of a position of the first point 1110*a* and the second point 1110*b* on the second region 262, and a distance between the first point 1110*a* and the second point 1110*b*. As a method of determining a position and a size of the searching region 1130, the method of determining a size and a position of a capturing region aforementioned with reference to FIGS. 19A and 19B may be applied.

In the present invention, a graphic effect may be implemented so that information on a set searching region can be provided to a user. As a method of providing a graphic effect on such searching region, the method of providing a graphic effect on a capturing region aforementioned with reference to FIGS. 19A and 19B may be used.

Cancelling setting of a searching region may be performed by a user's intention. For instance, a control command for cancelling setting of a searching region may be applied through a touch applied to the second region 262, or a touch applied to the first region 261. The control command may be also applied through a voice, or a hardware key provided at the terminal body. Cancelling setting of a searching region may be changed by the method aforementioned with reference to FIGS. 7A(a) and (b).

Upon setting of the searching region 1130, the mobile terminal may enter a search mode. In this case, an input window 1120 for inputting a key word to be searched may be output to the display unit. That is, if touches applied to the first point 1110*a* and the second point 1110*b* on the second region 262 are sensed, the searching region 1130 is set and the input window 1120 is output to the display unit. Once searching for a key word input to the input window 1120 is executed, messages included in the searching region 1130 are searched.

As another example, the input window 1120 may be output to the display unit by a different method from a method of setting the searching region 1130. More specifically, the searching region 1130 is set in response to sensing of touches applied to the first point 1110*a* and the second point 1110*b* on the second region 262. In this case, an input window output icon 300 may be displayed on an execution screen of an application related to message transmission/reception, together with a message list. In a state where the searching region 1130 has been set, if a touch is applied to the input window output icon 300, the input window 1120 for inputting a key word is output. In this case, once searching for a key word input to the input window 1120 is executed, messages included in the searching region 1130 are searched.

As another example, the searching region 1130 may be set after input of a key word. More specifically, in a state where the input window output icon 300 has been output to an execution screen of an application (related to message transmission/reception), together with a message list, if the icon 300 is touched, the input window 1120 is output. Then, if a key word is input to the input window 1120, all searching conditions are satisfied. Then, touches are applied to the first point 1110*a* and the second point 1110*b* on the second region 262, the searching region 1130 is set. A control command for executing a searching function may be consecutively applied from touches applied to the first point 1110*a* and the second point 1110*b*.

For instance, the control command for performing a search function may be a drag touch consecutive to at least one of touches sensed on the first point 1110*a* and the second point 1110*b* (e.g., a first touch and a second touch), the drag touch applied from one of the first touch and the second touch, toward another thereof. That is, the additional touch (e.g., drag touch) may be a pinch-in touch consecutive to at least one of touches sensed on the first point 1110*a* and the second point 1110*b* (e.g., a first touch and a second touch).

If the aforementioned pinch-in touch is applied to the second region 262, the controller 180 may perform a search function with respect to screen information included in the searching region 1130.

So far, has been explained a method of controlling the mobile terminal in response to a user's input applied to a side display unit. However, the present invention is not limited to this. That is, the present invention can be also applied to a mobile terminal not provided with a side display unit. For instance, a touch sensor may be provided on a side surface of the mobile terminal, instead of the aforementioned side display unit. In this case, the controller may provide or control the aforementioned function, in response to a user's touch input sensed by the touch sensor provided on the side surface of the mobile terminal. That is, a touch applied to the side display unit in the aforementioned embodiment may be replaced by a touch applied to a side surface of a mobile terminal having no side display unit.

As another example, the present invention can be also applied to a mobile terminal having neither a side display unit nor a side touch sensor. For instance, a touch sensor may be disposed on part (a bezel portion) of the front case 101 (refer to FIG. 1A) which supports the touch sensor window 151*a* (refer to FIG. 1A). In this case, the controller 180 may provide or control the aforementioned function, in response to a user's touch input applied to the bezel portion on the front surface of the mobile terminal. That is, a touch applied to the side display unit in the aforementioned embodiment may be replaced by a touch applied to a bezel portion of a mobile terminal having the bezel portion on the front surface thereof.

As aforementioned, in the present invention, a specific function or an entire operation of the mobile terminal can be controlled, in response to a touch applied to a side display unit of the mobile terminal. Under such configuration, a user can apply a control command to the mobile terminal without blocking a front display unit. Thus, the user can utilize information output to the display unit more efficiently.

Further, as the front display and the side display unit operate by being interworked with each other, a new type of user's convenience can be provided.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
   a touch screen comprising a front surface and curved surface extending from the front surface, and
   a controller configured to:
      cause the touch screen to display content on the touch screen;
      receive at least one touch input to the curved surface of the touch screen while the content is displayed on the touch screen;
      capture an entire region of information displayed at the front surface of the touch screen when the at least one touch input to the curved surface corresponds to a predetermined touch input.

2. The mobile terminal of claim 1, wherein the predetermined touch input comprises a touch input to the curved surface maintained for a threshold length of time.

3. The mobile terminal of claim 1, wherein:
the controller is further configured to capture a portion of the displayed content when the at least one touch input does not correspond to the predetermined touch input;
a position of the captured portion corresponds to a position of the at least one touch input to the curved surface;
the at least one touch input comprises a first touch input and a second touch input; and
the captured portion is defined between a position on the front surface corresponding to the first touch input and a position on the front surface corresponding to the second touch input.

4. The mobile terminal of claim 3, wherein a position of the first touch input corresponds to an upper bound of the captured portion and a position of the second touch input corresponds to a lower bound of the captured portion.

5. The mobile terminal of claim 3, wherein the at least one touch input comprises a drag input and a size of the captured portion is defined by a length of the drag input.

6. The mobile terminal of claim 5, further comprising a memory, wherein the controller is further configured to cause the memory to store information associated with the captured portion.

7. The mobile terminal of claim 5, wherein the controller is further configured to capture the portion when the size of the captured portion is changed to be smaller than a threshold size in response to the drag input.

8. The mobile terminal of claim 7, wherein the controller is further configured to cause the touch screen to display a boundary indicator indicating a boundary of the portion to be captured as the drag input is dragged at the curved surface.

9. The mobile terminal of claim 3, wherein the controller is further configured to cause the touch screen to display an indicator region overlapping the displayed content and corresponding to the captured portion, wherein the indicator region is transparently displayed such that the overlapped content is visible.

10. The mobile terminal of claim 9, wherein the controller is further configured to cease display of the indicator region in response to a touch input outside of the displayed indicator region.

11. The mobile terminal of claim 9, wherein the controller is further configured to change a height of the captured portion and a height of the displayed indicator region in response to a pinch-in or pinch-out touch input to the curved surface.

12. The mobile terminal of claim 11, wherein:
the touch screen further comprises another curved surface extending from the front surface opposite the curved surface, wherein the another curved surface forms at least a portion of an edge of the mobile terminal; and
the controller is further configured to change a width of the captured portion and a width of the displayed indicator region in response to a pinch-in or pinch-out touch input to the another curved surface.

13. The mobile terminal of claim 1, further comprising a memory, wherein the content comprises text information and the controller is further configured to cause the touch screen to display a graphic user interface (GUI) screen comprising a plurality of options for storing the captured region, the plurality of options comprising storing the captured region as an image file or a text file.

14. The mobile terminal of claim 1 further comprising a memory, wherein the controller is further configured to:
cause the memory to store information associated with the captured region;
identify an application configured to perform a specific function using the stored information; and
cause the display to display an icon associated with the identified application.

15. The mobile terminal of claim 1, further comprising a memory, wherein:
the at least one touch input comprises a first touch input and a consecutive second touch input; and
the controller is further configured to:
activate a capture mode in response to the first touch input to the curved surface;
cause the memory to store the captured region in response to the second touch input to the curved surface while the first touch input is maintained; and
deactivate the capture mode when the first touch input is released prior to the second touch input.

16. A method of controlling a mobile terminal comprising a touch screen having a front surface and curved surface extending from the front surface, the method comprising:
displaying content via the touch screen;
receiving at least one touch input to the curved surface of the touch screen while the content is displayed on the touch screen; and
capturing an entire region of information displayed at the front surface of the touch screen when the at least one touch input to the curved surface corresponds to a predetermined touch input.

17. The method of claim 16, wherein:
a portion of the displayed content is captured when the at least one touch input does not correspond to the predetermined touch input;
a position of the captured portion corresponds to a position of the at least one touch input to the curved surface;
the at least one touch input comprises a first touch input and a second touch input; and
a position of the first touch input corresponds to an upper bound of the captured portion and a position of the second touch input corresponds to a lower bound of the captured portion.

18. The method of claim 17, wherein the at least one touch input comprises a drag input and a size of the captured portion is defined by a length of the drag input.

19. The method of claim 17, further comprising displaying an indicator region overlapping the displayed content and corresponding to the captured portion, wherein the indicator region is transparently displayed such that the overlapped content is visible.

* * * * *